United States Patent
Sporn et al.

(10) Patent No.: US 12,551,562 B2
(45) Date of Patent: Feb. 17, 2026

(54) METHODS AND COMPOSITIONS FOR IRREVERSIBLE ENZYME INHIBITION

(71) Applicant: TRITERPENOID THERAPEUTICS, INC., Lebanon, NH (US)

(72) Inventors: Michael B. Sporn, Tunbridge, VT (US); Xiaoli Meng, Lebanon, NH (US)

(73) Assignee: TRITERPENOID THERAPEUTICS, INC., Lebanon, NH (US)

( * ) Notice: Subject to any disclaimer, the term of this patent is extended or adjusted under 35 U.S.C. 154(b) by 1134 days.

(21) Appl. No.: 17/594,287

(22) PCT Filed: Apr. 10, 2020

(86) PCT No.: PCT/US2020/027588
§ 371 (c)(1),
(2) Date: Oct. 8, 2021

(87) PCT Pub. No.: WO2020/210573
PCT Pub. Date: Oct. 15, 2020

(65) Prior Publication Data
US 2022/0160879 A1    May 26, 2022

Related U.S. Application Data

(60) Provisional application No. 62/832,543, filed on Apr. 11, 2019.

(51) Int. Cl.
*A61K 47/54* (2017.01)
*A61P 43/00* (2006.01)
*C07J 63/00* (2006.01)

(52) U.S. Cl.
CPC .......... *A61K 47/545* (2017.08); *A61P 43/00* (2018.01); *C07J 63/008* (2013.01)

(58) Field of Classification Search
None
See application file for complete search history.

(56) References Cited

FOREIGN PATENT DOCUMENTS

| WO | 1993005789 A1 | 4/1993 |
| WO | 2005123127 A2 | 12/2005 |
| WO | 2008124660 A2 | 10/2008 |

OTHER PUBLICATIONS

Minchenko, O. H., et al. "Glucose deprivation affects the expression of LONP1 and cathepsins in IRE1 knockdown U87 glioma cells." Biotechnologia Acta 9.6 (2016): 16-27.*
Pinti, Marcello, et al. "Mitochondrial Lon protease at the crossroads of oxidative stress, ageing and cancer." Cellular and Molecular Life Sciences 72 (2015): 4807-4824.*
Cleasby et al. "Structure of the BTB Domain of Keap1 and Its Interaction with the Triterpenoid Antagonist CDDO," PLoS ONE, Jun. 4, 2014, vol. 9, No. 6, article e98896 (pp. 1-10).
Kamble et al. "In-Silico Evidence for Binding of Pentacyclic Triterpenoids to Keap1-Nrf2 Protein-Protein Binding Site," Combinatorial Chemistry & High Throughput Screening, 2017, vol. 20, No. 3, 21 pages.
Bernstein et al. "The mitochondrial ATP-dependent Lon protease: a novel target in lymphoma death mediated by the synthetic triterpenoid CDDO and its derivatives," Blood, Apr. 5, 2012, vol. 119, No. 14, pp. 3321-3329.
International Search Report and Written Opinion for International Patent Application No. PCT/US2020/027588 issued Sep. 10, 2020, 12 pages.
Cao, et al., Pharmacological Research, 100:135-147 (2015).

* cited by examiner

*Primary Examiner* — Patrick T Lewis
(74) *Attorney, Agent, or Firm* — Neal, Gerber & Eisenberg LLP

(57) ABSTRACT

The present invention relates to compounds, methods, and compositions for irreversibly inhibiting protein targets, including Keap1 and/or LONP1 protease. In certain aspects, the present invention relates to conjugates and/or cross-linked conjugates comprising a protein or a protein complex and a bifunctional triterpenoid, such as 1-[2-Cyano-3,12-dioxooleana-1,9(11)-dien-28-oyl]-4(-pyridin-2-yl)-1H-imidazole ("CDDO-2P-Im"), 1-[2-Cyano-3,12-dioxooleana-1,9(11)-dien-28-oyl]-4(-pyridin-3-yl)-1H-imidazole ("CDDO-3P-Im"), or derivatives thereof.

27 Claims, 10 Drawing Sheets

Specification includes a Sequence Listing.

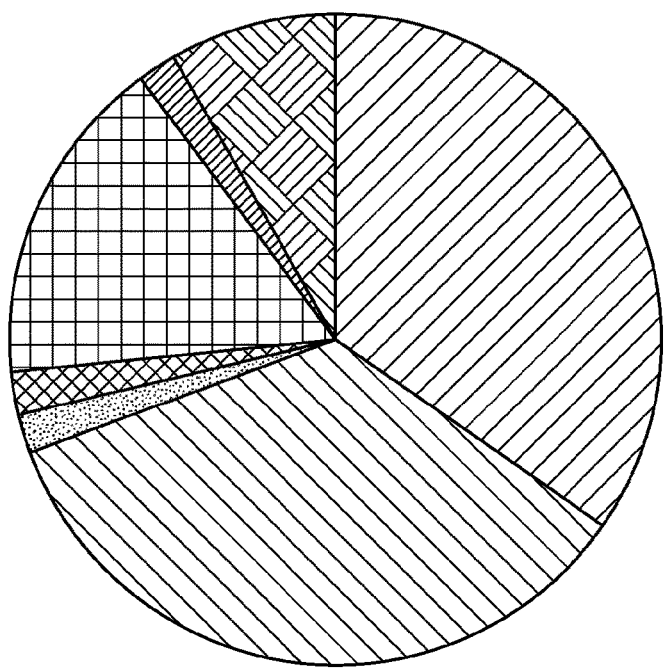
FIG. 5B
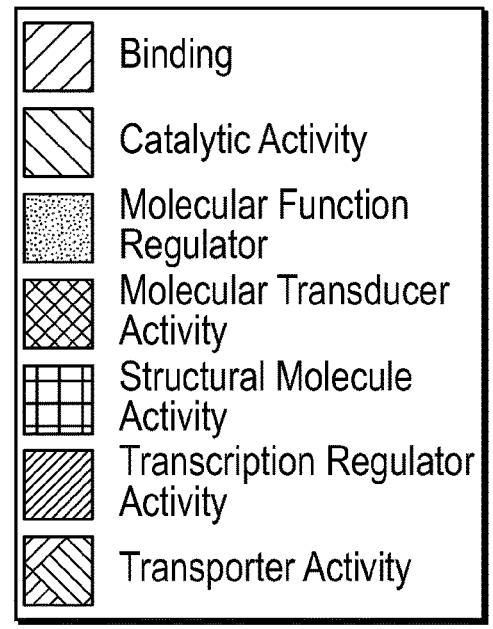
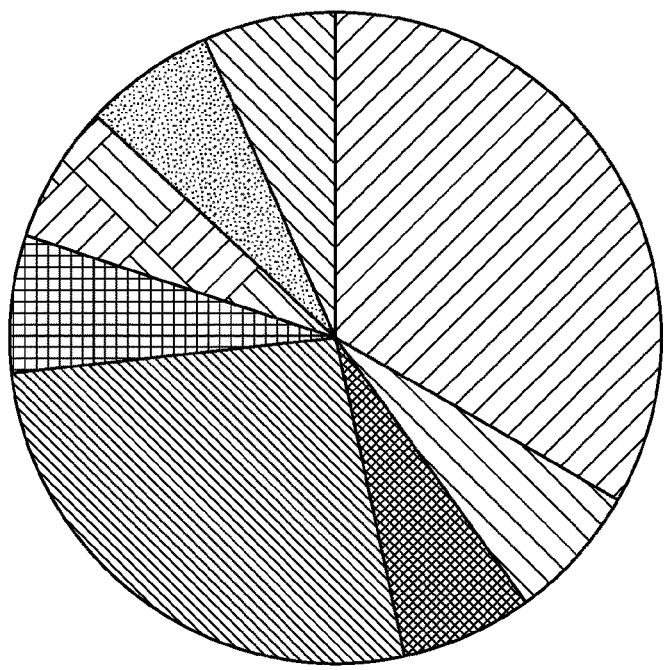
FIG. 5C
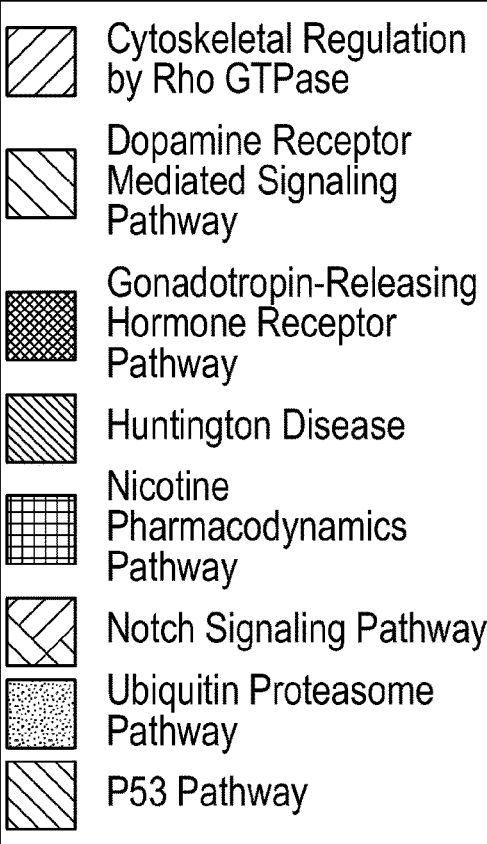

SEQUENCE LISTING

<160> NUMBER OF SEQ ID NOS: 35

<210> SEQ ID NO 1
<211> LENGTH: 208
<212> TYPE: PRT
<213> ORGANISM: homo sapiens

<400> SEQUENCE: 1

Met Pro Pro Tyr Thr Val Val Tyr Phe Pro Val Arg Gly Arg Cys Ala
1               5                   10                  15

Ala Leu Arg Met Leu Leu Ala Asp Gln Gly Gln Ser Trp Lys Glu Glu
            20                  25                  30

Val Val Thr Val Glu Thr Trp Gln Glu Ser Leu Lys Ala Ser Cys Leu
        35                  40                  45

Tyr Gly Gln Leu Pro Lys Phe Gln Asp Gly Asp Leu Thr Leu Tyr Gln
    50                  55                  60

Ser Asn Thr Ile Leu Arg His Leu Gly Arg Thr Leu Gly Leu Tyr Gly

```
                65                  70                  75                  80
Lys Asp Gln Gln Glu Ala Ala Leu Asp Met Val Asn Asp Gly Val Glu
                    85                  90                  95

Asp Leu Arg Cys Lys Tyr Ile Ser Leu Ile Tyr Thr Asn Tyr Glu Ala
                    100                 105                 110

Gly Lys Asp Asp Tyr Val Lys Ala Leu Pro Gly Gln Leu Lys Pro Phe
                    115                 120                 125

Glu Thr Leu Leu Ser Gln Asn Gln Gly Gly Lys Thr Phe Ile Val Gly
                    130                 135                 140

Asp Gln Ile Ser Phe Ala Asp Tyr Asn Leu Leu Asp Leu Leu Leu Ile
145                 150                 155                 160

His Glu Val Leu Ala Pro Gly Cys Leu Asp Ala Phe Pro Leu Leu Ser
                    165                 170                 175

Ala Tyr Val Gly Arg Leu Ser Ala Arg Pro Lys Leu Lys Ala Phe Leu
                    180                 185                 190

Ala Ser Pro Glu Tyr Val Asn Leu Pro Ile Asn Gly Asn Gly Lys Gln
                    195                 200                 205

<210> SEQ ID NO 2
<211> LENGTH: 585
<212> TYPE: PRT
<213> ORGANISM: homo sapiens

<400> SEQUENCE: 2

Asp Ala His Lys Ser Glu Val Ala His Arg Phe Lys Asp Leu Gly Glu
1               5                   10                  15

Glu Asn Phe Lys Ala Leu Val Leu Ile Ala Phe Ala Gln Tyr Leu Gln
                    20                  25                  30

Gln Cys Pro Phe Glu Asp His Val Lys Leu Val Asn Glu Val Thr Glu
                    35                  40                  45

Phe Ala Lys Thr Cys Val Ala Asp Glu Ser Ala Glu Asn Cys Asp Lys
                    50                  55                  60

Ser Leu His Thr Leu Phe Gly Asp Lys Leu Cys Thr Val Ala Thr Leu
65                  70                  75                  80

Arg Glu Thr Tyr Gly Glu Met Ala Asp Cys Cys Ala Lys Gln Glu Pro
                    85                  90                  95

Glu Arg Asn Glu Cys Phe Leu Gln His Lys Asp Asp Asn Pro Asn Leu
                    100                 105                 110

Pro Arg Leu Val Arg Pro Glu Val Asp Val Met Cys Thr Ala Phe His
                    115                 120                 125

Asp Asn Glu Glu Thr Phe Leu Lys Lys Tyr Leu Tyr Glu Ile Ala Arg
                    130                 135                 140

Arg His Pro Tyr Phe Tyr Ala Pro Glu Leu Leu Phe Phe Ala Lys Arg
145                 150                 155                 160

Tyr Lys Ala Ala Phe Thr Glu Cys Cys Gln Ala Ala Asp Lys Ala Ala
                    165                 170                 175

Cys Leu Leu Pro Lys Leu Asp Glu Leu Arg Asp Glu Gly Lys Ala Ser
                    180                 185                 190

Ser Ala Lys Gln Arg Leu Lys Cys Ala Ser Leu Gln Lys Phe Gly Glu
                    195                 200                 205

Arg Ala Phe Lys Ala Trp Ala Val Ala Arg Leu Ser Gln Arg Phe Pro
                    210                 215                 220

Lys Ala Glu Phe Ala Glu Val Ser Lys Leu Val Thr Asp Leu Thr Lys
225                 230                 235                 240
```

```
Val His Thr Glu Cys Cys His Gly Asp Leu Glu Cys Ala Asp Asp
                245                 250                 255

Arg Ala Asp Leu Ala Lys Tyr Ile Cys Glu Asn Gln Asp Ser Ile Ser
            260                 265                 270

Ser Lys Leu Lys Glu Cys Cys Glu Lys Pro Leu Leu Glu Lys Ser His
        275                 280                 285

Cys Ile Ala Glu Val Glu Asn Asp Glu Met Pro Ala Asp Leu Pro Ser
    290                 295                 300

Leu Ala Ala Asp Phe Val Glu Ser Lys Asp Val Cys Lys Asn Tyr Ala
305                 310                 315                 320

Glu Ala Lys Asp Val Phe Leu Gly Met Phe Leu Tyr Glu Tyr Ala Arg
                325                 330                 335

Arg His Pro Asp Tyr Ser Val Val Leu Leu Leu Arg Leu Ala Lys Thr
            340                 345                 350

Tyr Glu Thr Thr Leu Glu Lys Cys Cys Ala Ala Ala Asp Pro His Glu
        355                 360                 365

Cys Tyr Ala Lys Val Phe Asp Glu Phe Lys Pro Leu Val Glu Glu Pro
    370                 375                 380

Gln Asn Leu Ile Lys Gln Asn Cys Glu Leu Phe Glu Gln Leu Gly Glu
385                 390                 395                 400

Tyr Lys Phe Gln Asn Ala Leu Leu Val Arg Tyr Thr Lys Lys Val Pro
                405                 410                 415

Gln Val Ser Thr Pro Thr Leu Val Glu Val Ser Arg Asn Leu Gly Lys
            420                 425                 430

Val Gly Ser Lys Cys Cys Lys His Pro Glu Ala Lys Arg Met Pro Cys
        435                 440                 445

Ala Glu Asp Tyr Leu Ser Val Val Leu Asn Gln Leu Cys Val Leu His
    450                 455                 460

Glu Lys Thr Pro Val Ser Asp Arg Val Thr Lys Cys Cys Thr Glu Ser
465                 470                 475                 480

Leu Val Asn Arg Arg Pro Cys Phe Ser Ala Leu Glu Val Asp Glu Thr
                485                 490                 495

Tyr Val Pro Lys Glu Phe Asn Ala Glu Thr Phe Thr Phe His Ala Asp
            500                 505                 510

Ile Cys Thr Leu Ser Glu Lys Glu Arg Gln Ile Lys Lys Gln Thr Ala
        515                 520                 525

Leu Val Glu Leu Val Lys His Lys Pro Lys Ala Thr Lys Glu Gln Leu
    530                 535                 540

Lys Ala Val Met Asp Asp Phe Ala Ala Phe Val Glu Lys Cys Cys Lys
545                 550                 555                 560

Ala Asp Asp Lys Glu Thr Cys Phe Ala Glu Glu Gly Lys Lys Leu Val
                565                 570                 575

Ala Ala Ser Gln Ala Ala Leu Gly Leu
            580                 585

<210> SEQ ID NO 3
<211> LENGTH: 624
<212> TYPE: PRT
<213> ORGANISM: homo sapiens

<400> SEQUENCE: 3

Met Gln Pro Asp Pro Arg Pro Ser Gly Ala Gly Ala Cys Cys Arg Phe
1               5                   10                  15

Leu Pro Leu Gln Ser Gln Cys Pro Glu Gly Ala Gly Asp Ala Val Met
            20                  25                  30
```

```
Tyr Ala Ser Thr Glu Cys Lys Ala Glu Val Thr Pro Ser Gln His Gly
        35                  40                  45

Asn Arg Thr Phe Ser Tyr Thr Leu Glu Asp His Thr Lys Gln Ala Phe
 50                  55                  60

Gly Ile Met Asn Glu Leu Arg Leu Ser Gln Gln Leu Cys Asp Val Thr
 65                  70                  75                  80

Leu Gln Val Lys Tyr Gln Asp Ala Pro Ala Gln Phe Met Ala His
                 85                  90                  95

Lys Val Val Leu Ala Ser Ser Pro Val Phe Lys Ala Met Phe Thr
                100                 105                 110

Asn Gly Leu Arg Glu Gln Gly Met Glu Val Val Ser Ile Glu Gly Ile
                115                 120                 125

His Pro Lys Val Met Glu Arg Leu Ile Glu Phe Ala Tyr Thr Ala Ser
                130                 135                 140

Ile Ser Met Gly Glu Lys Cys Val Leu His Val Met Asn Gly Ala Val
145                 150                 155                 160

Met Tyr Gln Ile Asp Ser Val Val Arg Ala Cys Ser Asp Phe Leu Val
                165                 170                 175

Gln Gln Leu Asp Pro Ser Asn Ala Ile Gly Ile Ala Asn Phe Ala Glu
                180                 185                 190

Gln Ile Gly Cys Val Glu Leu His Gln Arg Ala Arg Glu Tyr Ile Tyr
                195                 200                 205

Met His Phe Gly Glu Val Ala Lys Gln Glu Glu Phe Phe Asn Leu Ser
                210                 215                 220

His Cys Gln Leu Val Thr Leu Ile Ser Arg Asp Asp Leu Asn Val Arg
225                 230                 235                 240

Cys Glu Ser Glu Val Phe His Ala Cys Ile Asn Trp Val Lys Tyr Asp
                245                 250                 255

Cys Glu Gln Arg Arg Phe Tyr Val Gln Ala Leu Leu Arg Ala Val Arg
                260                 265                 270

Cys His Ser Leu Thr Pro Asn Phe Leu Gln Met Gln Leu Gln Lys Cys
                275                 280                 285

Glu Ile Leu Gln Ser Asp Ser Arg Cys Lys Asp Tyr Leu Val Lys Ile
                290                 295                 300

Phe Glu Glu Leu Thr Leu His Lys Pro Thr Gln Val Met Pro Cys Arg
305                 310                 315                 320

Ala Pro Lys Val Gly Arg Leu Ile Tyr Thr Ala Gly Gly Tyr Phe Arg
                325                 330                 335

Gln Ser Leu Ser Tyr Leu Glu Ala Tyr Asn Pro Ser Asp Gly Thr Trp
                340                 345                 350

Leu Arg Leu Ala Asp Leu Gln Val Pro Arg Ser Gly Leu Ala Gly Cys
                355                 360                 365

Val Val Gly Gly Leu Leu Tyr Ala Val Gly Gly Arg Asn Asn Ser Pro
370                 375                 380

Asp Gly Asn Thr Asp Ser Ser Ala Leu Asp Cys Tyr Asn Pro Met Thr
385                 390                 395                 400

Asn Gln Trp Ser Pro Cys Ala Pro Met Ser Val Pro Arg Asn Arg Ile
                405                 410                 415

Gly Val Gly Val Ile Asp Gly His Ile Tyr Ala Val Gly Gly Ser His
                420                 425                 430

Gly Cys Ile His His Asn Ser Val Glu Arg Tyr Glu Pro Glu Arg Asp
                435                 440                 445
```

-continued

```
Glu Trp His Leu Val Ala Pro Met Leu Thr Arg Arg Ile Gly Val Gly
    450                 455                 460
Val Ala Val Leu Asn Arg Leu Leu Tyr Ala Val Gly Gly Phe Asp Gly
465                 470                 475                 480
Thr Asn Arg Leu Asn Ser Ala Glu Cys Tyr Tyr Pro Glu Arg Asn Glu
                485                 490                 495
Trp Arg Met Ile Thr Ala Met Asn Thr Ile Arg Ser Gly Ala Gly Val
            500                 505                 510
Cys Val Leu His Asn Cys Ile Tyr Ala Ala Gly Gly Tyr Asp Gly Gln
        515                 520                 525
Asp Gln Leu Asn Ser Val Glu Arg Tyr Asp Val Glu Thr Glu Thr Trp
    530                 535                 540
Thr Phe Val Ala Pro Met Lys His Arg Arg Ser Ala Leu Gly Ile Thr
545                 550                 555                 560
Val His Gln Gly Arg Ile Tyr Val Leu Gly Gly Tyr Asp Gly His Thr
                565                 570                 575
Phe Leu Asp Ser Val Glu Cys Tyr Asp Pro Asp Thr Asp Thr Trp Ser
            580                 585                 590
Glu Val Thr Arg Met Thr Ser Gly Arg Ser Gly Val Gly Val Ala Val
        595                 600                 605
Thr Met Glu Pro Cys Arg Lys Gln Ile Asp Gln Gln Asn Cys Thr Cys
    610                 615                 620

<210> SEQ ID NO 4
<211> LENGTH: 959
<212> TYPE: PRT
<213> ORGANISM: homo sapiens

<400> SEQUENCE: 4

Met Ala Ala Ser Thr Gly Tyr Val Arg Leu Trp Gly Ala Ala Arg Cys
1               5                   10                  15
Trp Val Leu Arg Arg Pro Met Leu Ala Ala Gly Gly Arg Val Pro
            20                  25                  30
Thr Ala Ala Gly Ala Trp Leu Leu Arg Gly Gln Arg Thr Cys Asp Ala
        35                  40                  45
Ser Pro Pro Trp Ala Leu Trp Gly Arg Gly Pro Ala Ile Gly Gly Gln
    50                  55                  60
Trp Arg Gly Phe Trp Glu Ala Ser Ser Arg Gly Gly Gly Ala Phe Ser
65                  70                  75                  80
Gly Gly Glu Asp Ala Ser Glu Gly Gly Ala Glu Gly Ala Gly Gly
                85                  90                  95
Ala Gly Gly Ser Ala Gly Ala Gly Glu Gly Pro Val Ile Thr Ala Leu
            100                 105                 110
Thr Pro Met Thr Ile Pro Asp Val Phe Pro His Leu Pro Leu Ile Ala
        115                 120                 125
Ile Thr Arg Asn Pro Val Phe Pro Arg Phe Ile Lys Ile Ile Glu Val
    130                 135                 140
Lys Asn Lys Lys Leu Val Glu Leu Leu Arg Arg Lys Val Arg Leu Ala
145                 150                 155                 160
Gln Pro Tyr Val Gly Val Phe Leu Lys Arg Asp Asp Ser Asn Glu Ser
                165                 170                 175
Asp Val Val Glu Ser Leu Asp Glu Ile Tyr His Thr Gly Thr Phe Ala
            180                 185                 190
Gln Ile His Glu Met Gln Asp Leu Gly Asp Lys Leu Arg Met Ile Val
        195                 200                 205
```

```
Met Gly His Arg Arg Val His Ile Ser Arg Gln Leu Glu Val Glu Pro
    210                 215                 220

Glu Glu Pro Glu Ala Glu Asn Lys His Lys Pro Arg Arg Lys Ser Lys
225                 230                 235                 240

Arg Gly Lys Lys Glu Ala Glu Asp Glu Leu Ser Ala Arg His Pro Ala
                245                 250                 255

Glu Leu Ala Met Glu Pro Thr Pro Glu Leu Pro Ala Glu Val Leu Met
            260                 265                 270

Val Glu Val Glu Asn Val Val His Glu Asp Phe Gln Val Thr Glu Glu
            275                 280                 285

Val Lys Ala Leu Thr Ala Glu Ile Val Lys Thr Ile Arg Asp Ile Ile
290                 295                 300

Ala Leu Asn Pro Leu Tyr Arg Glu Ser Val Leu Gln Met Met Gln Ala
305                 310                 315                 320

Gly Gln Arg Val Val Asp Asn Pro Ile Tyr Leu Ser Asp Met Gly Ala
                325                 330                 335

Ala Leu Thr Gly Ala Glu Ser His Glu Leu Gln Asp Val Leu Glu Glu
                340                 345                 350

Thr Asn Ile Pro Lys Arg Leu Tyr Lys Ala Leu Ser Leu Leu Lys Lys
            355                 360                 365

Glu Phe Glu Leu Ser Lys Leu Gln Gln Arg Leu Gly Arg Glu Val Glu
    370                 375                 380

Glu Lys Ile Lys Gln Thr His Arg Lys Tyr Leu Leu Gln Glu Gln Leu
385                 390                 395                 400

Lys Ile Ile Lys Lys Glu Leu Gly Leu Glu Lys Asp Asp Lys Asp Ala
                405                 410                 415

Ile Glu Glu Lys Phe Arg Glu Arg Leu Lys Glu Leu Val Val Pro Lys
                420                 425                 430

His Val Met Asp Val Val Asp Glu Glu Leu Ser Lys Leu Gly Leu Leu
            435                 440                 445

Asp Asn His Ser Ser Glu Phe Asn Val Thr Arg Asn Tyr Leu Asp Trp
            450                 455                 460

Leu Thr Ser Ile Pro Trp Gly Lys Tyr Ser Asn Glu Asn Leu Asp Leu
465                 470                 475                 480

Ala Arg Ala Gln Ala Val Leu Glu Glu Asp His Tyr Gly Met Glu Asp
                485                 490                 495

Val Lys Lys Arg Ile Leu Glu Phe Ile Ala Val Ser Gln Leu Arg Gly
                500                 505                 510

Ser Thr Gln Gly Lys Ile Leu Cys Phe Tyr Gly Pro Pro Gly Val Gly
            515                 520                 525

Lys Thr Ser Ile Ala Arg Ser Ile Ala Arg Ala Leu Asn Arg Glu Tyr
            530                 535                 540

Phe Arg Phe Ser Val Gly Gly Met Thr Asp Val Ala Glu Ile Lys Gly
545                 550                 555                 560

His Arg Arg Thr Tyr Val Gly Ala Met Pro Gly Lys Ile Ile Gln Cys
                565                 570                 575

Leu Lys Lys Thr Lys Thr Glu Asn Pro Leu Ile Leu Ile Asp Glu Val
            580                 585                 590

Asp Lys Ile Gly Arg Gly Tyr Gln Gly Asp Pro Ser Ser Ala Leu Leu
            595                 600                 605

Glu Leu Leu Asp Pro Glu Gln Asn Ala Asn Phe Leu Asp His Tyr Leu
    610                 615                 620
```

```
Asp Val Pro Val Asp Leu Ser Lys Val Leu Phe Ile Cys Thr Ala Asn
625                 630                 635                 640

Val Thr Asp Thr Ile Pro Glu Pro Leu Arg Asp Arg Met Glu Met Ile
                645                 650                 655

Asn Val Ser Gly Tyr Val Ala Gln Glu Lys Leu Ala Ile Ala Glu Arg
            660                 665                 670

Tyr Leu Val Pro Gln Ala Arg Ala Leu Cys Gly Leu Asp Glu Ser Lys
        675                 680                 685

Ala Lys Leu Ser Ser Asp Val Leu Thr Leu Leu Ile Lys Gln Tyr Cys
    690                 695                 700

Arg Glu Ser Gly Val Arg Asn Leu Gln Lys Gln Val Glu Lys Val Leu
705                 710                 715                 720

Arg Lys Ser Ala Tyr Lys Ile Val Ser Gly Glu Ala Glu Ser Val Glu
                725                 730                 735

Val Thr Pro Glu Asn Leu Gln Asp Phe Val Gly Lys Pro Val Phe Thr
            740                 745                 750

Val Glu Arg Met Tyr Asp Val Thr Pro Pro Gly Val Val Met Gly Leu
        755                 760                 765

Ala Trp Thr Ala Met Gly Gly Ser Thr Leu Phe Val Glu Thr Ser Leu
    770                 775                 780

Arg Arg Pro Gln Asp Lys Asp Ala Lys Gly Asp Lys Asp Gly Ser Leu
785                 790                 795                 800

Glu Val Thr Gly Gln Leu Gly Glu Val Met Lys Glu Ser Ala Arg Ile
                805                 810                 815

Ala Tyr Thr Phe Ala Arg Ala Phe Leu Met Gln His Ala Pro Ala Asn
            820                 825                 830

Asp Tyr Leu Val Thr Ser His Ile His Leu His Val Pro Glu Gly Ala
        835                 840                 845

Thr Pro Lys Asp Gly Pro Ser Ala Gly Cys Thr Ile Val Thr Ala Leu
    850                 855                 860

Leu Ser Leu Ala Met Gly Arg Pro Val Arg Gln Asn Leu Ala Met Thr
865                 870                 875                 880

Gly Glu Val Ser Leu Thr Gly Lys Ile Leu Pro Val Gly Gly Ile Lys
                885                 890                 895

Glu Lys Thr Ile Ala Ala Lys Arg Ala Gly Val Thr Cys Ile Val Leu
            900                 905                 910

Pro Ala Glu Asn Lys Lys Asp Phe Tyr Asp Leu Ala Ala Phe Ile Thr
        915                 920                 925

Glu Gly Leu Glu Val His Phe Val Glu His Tyr Arg Glu Ile Phe Asp
    930                 935                 940

Ile Ala Phe Pro Asp Glu Gln Ala Glu Ala Leu Ala Val Glu Arg
945                 950                 955

<210> SEQ ID NO 5
<211> LENGTH: 165
<212> TYPE: PRT
<213> ORGANISM: homo sapiens

<400> SEQUENCE: 5

Met Val Asn Pro Thr Val Phe Phe Asp Ile Ala Val Asp Gly Glu Pro
1               5                   10                  15

Leu Gly Arg Val Ser Phe Glu Leu Phe Ala Asp Lys Val Pro Lys Thr
            20                  25                  30

Ala Glu Asn Phe Arg Ala Leu Ser Thr Gly Glu Lys Gly Phe Gly Tyr
        35                  40                  45
```

```
Lys Gly Ser Cys Phe His Arg Ile Ile Pro Gly Phe Met Cys Gln Gly
         50                  55                  60

Gly Asp Phe Thr Arg His Asn Gly Thr Gly Lys Ser Ile Tyr Gly
 65                  70                  75                  80

Glu Lys Phe Glu Asp Glu Asn Phe Ile Leu Lys His Thr Gly Pro Gly
                 85                  90                  95

Ile Leu Ser Met Ala Asn Ala Gly Pro Asn Thr Asn Gly Ser Gln Phe
                100                 105                 110

Phe Ile Cys Thr Ala Lys Thr Glu Trp Leu Asp Gly Lys His Val Val
            115                 120                 125

Phe Gly Lys Val Lys Glu Gly Met Asn Ile Val Glu Ala Met Glu Arg
            130                 135                 140

Phe Gly Ser Arg Asn Gly Lys Thr Ser Lys Lys Ile Thr Ile Ala Asp
145                 150                 155                 160

Cys Gly Gln Leu Glu
                165

<210> SEQ ID NO 6
<211> LENGTH: 241
<212> TYPE: PRT
<213> ORGANISM: homo sapiens

<400> SEQUENCE: 6

Met Ala Glu Glu Gln Pro Gln Val Glu Leu Phe Val Lys Ala Gly Ser
 1               5                  10                  15

Asp Gly Ala Lys Ile Gly Asn Cys Pro Phe Ser Gln Arg Leu Phe Met
             20                  25                  30

Val Leu Trp Leu Lys Gly Val Thr Phe Asn Val Thr Thr Val Asp Thr
         35                  40                  45

Lys Arg Arg Thr Glu Thr Val Gln Lys Leu Cys Pro Gly Gly Gln Leu
 50                  55                  60

Pro Phe Leu Leu Tyr Gly Thr Glu Val His Thr Asp Thr Asn Lys Ile
 65                  70                  75                  80

Glu Glu Phe Leu Glu Ala Val Leu Cys Pro Pro Arg Tyr Pro Lys Leu
                 85                  90                  95

Ala Ala Leu Asn Pro Glu Ser Asn Thr Ala Gly Leu Asp Ile Phe Ala
                100                 105                 110

Lys Phe Ser Ala Tyr Ile Lys Asn Ser Asn Pro Ala Leu Asn Asp Asn
            115                 120                 125

Leu Glu Lys Gly Leu Leu Lys Ala Leu Lys Val Leu Asp Asn Tyr Leu
            130                 135                 140

Thr Ser Pro Leu Pro Glu Glu Val Asp Glu Thr Ser Ala Glu Asp Glu
145                 150                 155                 160

Gly Val Ser Gln Arg Lys Phe Leu Asp Gly Asn Glu Leu Thr Leu Ala
                165                 170                 175

Asp Cys Asn Leu Leu Pro Lys Leu His Ile Val Gln Val Val Cys Lys
                180                 185                 190

Lys Tyr Arg Gly Phe Thr Ile Pro Glu Ala Phe Arg Gly Val His Arg
            195                 200                 205

Tyr Leu Ser Asn Ala Tyr Ala Arg Glu Glu Phe Ala Ser Thr Cys Pro
        210                 215                 220

Asp Asp Glu Glu Ile Glu Leu Ala Tyr Glu Gln Val Ala Lys Ala Leu
225                 230                 235                 240

Lys
```

<210> SEQ ID NO 7
<211> LENGTH: 704
<212> TYPE: PRT
<213> ORGANISM: homo sapiens

<400> SEQUENCE: 7

```
Met Ala Glu Ala Ala Glu Pro Glu Gly Val Ala Pro Gly Pro Gln Gly
1               5                   10                  15

Pro Pro Glu Val Pro Ala Pro Leu Ala Glu Arg Pro Gly Glu Pro Gly
            20                  25                  30

Ala Ala Gly Gly Glu Ala Glu Gly Pro Glu Gly Ser Glu Gly Ala Glu
        35                  40                  45

Glu Ala Pro Arg Gly Ala Ala Ala Val Lys Glu Ala Gly Gly Gly Gly
    50                  55                  60

Pro Asp Arg Gly Pro Glu Ala Glu Ala Arg Gly Thr Arg Gly Ala His
65                  70                  75                  80

Gly Glu Thr Glu Ala Glu Gly Ala Pro Glu Gly Ala Glu Val Pro
                85                  90                  95

Gln Gly Gly Glu Glu Thr Ser Gly Ala Gln Gln Val Glu Gly Ala Ser
            100                 105                 110

Pro Gly Arg Gly Ala Gln Gly Glu Pro Arg Gly Glu Ala Gln Arg Glu
        115                 120                 125

Pro Glu Asp Ser Ala Ala Pro Glu Arg Gln Glu Ala Glu Gln Arg
    130                 135                 140

Pro Glu Val Pro Glu Gly Ser Ala Ser Gly Glu Ala Gly Asp Ser Val
145                 150                 155                 160

Asp Ala Glu Gly Pro Leu Gly Asp Asn Ile Glu Ala Glu Gly Pro Ala
                165                 170                 175

Gly Asp Ser Val Glu Ala Glu Gly Arg Val Gly Asp Ser Val Asp Ala
            180                 185                 190

Glu Gly Pro Ala Gly Asp Ser Val Asp Ala Glu Gly Pro Leu Gly Asp
        195                 200                 205

Asn Ile Gln Ala Glu Gly Pro Ala Gly Asp Ser Val Asp Ala Glu Gly
    210                 215                 220

Arg Val Gly Asp Ser Val Asp Ala Glu Gly Pro Ala Gly Asp Ser Val
225                 230                 235                 240

Asp Ala Glu Gly Arg Val Gly Asp Ser Val Glu Ala Gly Asp Pro Ala
                245                 250                 255

Gly Asp Gly Val Glu Ala Gly Val Pro Ala Gly Asp Ser Val Glu Ala
            260                 265                 270

Glu Gly Pro Ala Gly Asp Ser Met Asp Ala Glu Gly Pro Ala Gly Arg
        275                 280                 285

Ala Arg Arg Val Ser Gly Glu Pro Gln Gln Ser Gly Asp Gly Ser Leu
    290                 295                 300

Ser Pro Gln Ala Glu Ala Ile Glu Val Ala Ala Gly Glu Ser Ala Gly
305                 310                 315                 320

Arg Ser Pro Gly Glu Leu Ala Trp Asp Ala Ala Glu Glu Ala Glu Val
                325                 330                 335

Pro Gly Val Lys Gly Ser Glu Glu Ala Pro Gly Asp Ala Arg Ala
            340                 345                 350

Asp Ala Gly Glu Asp Arg Val Gly Asp Gly Pro Gln Gln Glu Pro Gly
        355                 360                 365

Glu Asp Glu Glu Arg Arg Glu Arg Ser Pro Glu Gly Pro Arg Glu Glu
```

```
                    370                 375                 380
Glu Ala Gly Gly Glu Glu Ser Pro Asp Ser Pro His Gly
385                 390                 395                 400

Glu Ala Ser Arg Gly Ala Ala Glu Pro Glu Ala Gln Leu Ser Asn His
                405                 410                 415

Leu Ala Glu Glu Gly Pro Ala Glu Gly Ser Gly Glu Ala Ala Arg Val
                420                 425                 430

Asn Gly Arg Arg Glu Asp Gly Glu Ala Ser Glu Pro Arg Ala Leu Gly
                435                 440                 445

Gln Glu His Asp Ile Thr Leu Phe Val Lys Val Lys Leu Thr Ala Leu
    450                 455                 460

Gly Cys Ser Arg Ile Ala Ile Lys Lys Tyr Leu Arg Ala Gly Tyr Asp
465                 470                 475                 480

Gly Glu Ser Ile Gly Asn Cys Pro Phe Ser Gln Arg Leu Phe Met Ile
                485                 490                 495

Leu Trp Leu Lys Gly Val Ile Phe Asn Val Thr Thr Val Asp Leu Lys
                500                 505                 510

Arg Lys Pro Ala Asp Leu Gln Asn Leu Ala Pro Gly Thr Asn Pro Pro
                515                 520                 525

Phe Met Thr Phe Asp Gly Glu Val Lys Thr Asp Val Asn Lys Ile Glu
                530                 535                 540

Glu Phe Leu Glu Glu Lys Leu Ala Pro Pro Arg Tyr Pro Lys Leu Gly
545                 550                 555                 560

Thr Gln His Pro Glu Ser Asn Ser Ala Gly Asn Asp Val Phe Ala Lys
                565                 570                 575

Phe Ser Ala Phe Ile Lys Asn Thr Lys Lys Asp Ala Asn Glu Ile His
                580                 585                 590

Glu Lys Asn Leu Leu Lys Ala Leu Arg Lys Leu Asp Asn Tyr Leu Asn
                595                 600                 605

Ser Pro Leu Pro Asp Glu Ile Asp Ala Tyr Ser Thr Glu Asp Val Thr
                610                 615                 620

Val Ser Gly Arg Lys Phe Leu Asp Gly Asp Glu Leu Thr Leu Ala Asp
625                 630                 635                 640

Cys Asn Leu Leu Pro Lys Leu His Ile Ile Lys Ile Val Ala Lys Lys
                645                 650                 655

Tyr Arg Asp Phe Glu Phe Pro Ser Glu Met Thr Gly Ile Trp Arg Tyr
                660                 665                 670

Leu Asn Asn Ala Tyr Ala Arg Asp Glu Phe Thr Asn Thr Cys Pro Ala
                675                 680                 685

Asp Gln Glu Ile Glu His Ala Tyr Ser Asp Val Ala Lys Arg Met Lys
                690                 695                 700

<210> SEQ ID NO 8
<211> LENGTH: 2588
<212> TYPE: PRT
<213> ORGANISM: homo sapiens

<400> SEQUENCE: 8

Met Gly Ser Pro Glu Gly Arg Phe His Phe Ala Ile Asp Arg Gly Gly
1               5                   10                  15

Thr Phe Thr Asp Val Phe Ala Gln Cys Pro Gly Gly His Val Arg Val
                20                  25                  30

Leu Lys Leu Leu Ser Glu Asp Pro Ala Asn Tyr Ala Asp Ala Pro Thr
                35                  40                  45
```

-continued

```
Glu Gly Ile Arg Arg Ile Leu Glu Gln Glu Ala Gly Met Leu Leu Pro
        50                  55                  60
Arg Asp Gln Pro Leu Asp Ser Ser His Ile Ala Ser Ile Arg Met Gly
 65                  70                  75                  80
Thr Thr Val Ala Thr Asn Ala Leu Leu Glu Arg Lys Gly Glu Arg Val
                     85                  90                  95
Ala Leu Leu Val Thr Arg Gly Phe Arg Asp Leu Leu His Ile Gly Thr
                100                 105                 110
Gln Ala Arg Gly Asp Leu Phe Asp Leu Ala Val Pro Met Pro Glu Val
            115                 120                 125
Leu Tyr Glu Glu Val Leu Glu Val Asp Glu Arg Val Val Leu His Arg
130                 135                 140
Gly Glu Ala Gly Thr Gly Thr Pro Val Lys Gly Arg Thr Gly Asp Leu
145                 150                 155                 160
Leu Glu Val Gln Gln Pro Val Asp Leu Gly Ala Leu Arg Gly Lys Leu
                165                 170                 175
Glu Gly Leu Leu Ser Arg Gly Ile Arg Ser Leu Ala Val Val Leu Met
                180                 185                 190
His Ser Tyr Thr Trp Ala Gln His Glu Gln Gln Val Gly Val Leu Ala
            195                 200                 205
Arg Glu Leu Gly Phe Thr His Val Ser Leu Ser Ser Glu Ala Met Pro
210                 215                 220
Met Val Arg Ile Val Pro Arg Gly His Thr Ala Cys Ala Asp Ala Tyr
225                 230                 235                 240
Leu Thr Pro Ala Ile Gln Arg Tyr Val Gln Gly Phe Cys Arg Gly Phe
                245                 250                 255
Gln Gly Gln Leu Lys Asp Val Gln Val Leu Phe Met Arg Ser Asp Gly
                260                 265                 270
Gly Leu Ala Pro Met Asp Thr Phe Ser Gly Ser Ser Ala Val Leu Ser
            275                 280                 285
Gly Pro Ala Gly Gly Val Val Gly Tyr Ser Ala Thr Thr Tyr Gln Gln
290                 295                 300
Glu Gly Gly Gln Pro Val Ile Gly Phe Asp Met Gly Gly Thr Ser Thr
305                 310                 315                 320
Asp Val Ser Arg Tyr Ala Gly Glu Phe Glu His Val Phe Glu Ala Ser
                325                 330                 335
Thr Ala Gly Val Thr Leu Gln Ala Pro Gln Leu Asp Ile Asn Thr Val
                340                 345                 350
Ala Ala Gly Gly Gly Ser Arg Leu Phe Phe Arg Ser Gly Leu Phe Val
            355                 360                 365
Val Gly Pro Glu Ser Ala Gly Ala His Pro Gly Pro Ala Cys Tyr Arg
370                 375                 380
Lys Gly Gly Pro Val Thr Val Thr Asp Ala Asn Leu Val Leu Gly Arg
385                 390                 395                 400
Leu Leu Pro Ala Ser Phe Pro Cys Ile Phe Gly Pro Gly Glu Asn Gln
                405                 410                 415
Pro Leu Ser Pro Glu Ala Ser Arg Lys Ala Leu Glu Ala Val Ala Thr
                420                 425                 430
Glu Val Asn Ser Phe Leu Thr Asn Gly Pro Cys Pro Ala Ser Pro Leu
            435                 440                 445
Ser Leu Glu Glu Val Ala Met Gly Phe Val Arg Val Ala Asn Glu Ala
450                 455                 460
Met Cys Arg Pro Ile Arg Ala Leu Thr Gln Ala Arg Gly His Asp Pro
```

```
            465                 470                 475                 480
        Ser Ala His Val Leu Ala Cys Phe Gly Gly Ala Gly Gly Gln His Ala
                        485                 490                 495
        Cys Ala Ile Ala Arg Ala Leu Gly Met Asp Thr Val His Ile His Arg
                        500                 505                 510
        His Ser Gly Leu Leu Ser Ala Leu Gly Leu Ala Leu Ala Asp Val Val
                        515                 520                 525
        His Glu Ala Gln Glu Pro Cys Ser Leu Leu Tyr Ala Pro Glu Thr Phe
                        530                 535                 540
        Val Gln Leu Asp Gln Arg Leu Ser Arg Leu Glu Glu Gln Cys Val Asp
        545                 550                 555                 560
        Ala Leu Gln Ala Gln Gly Phe Pro Arg Ser Gln Ile Ser Thr Glu Ser
                        565                 570                 575
        Phe Leu His Leu Arg Tyr Gln Gly Thr Asp Cys Ala Leu Met Val Ser
                        580                 585                 590
        Ala His Gln His Pro Ala Thr Ala Arg Ser Pro Arg Ala Gly Asp Phe
                        595                 600                 605
        Gly Ala Ala Phe Val Glu Arg Tyr Met Arg Glu Phe Gly Phe Val Ile
                        610                 615                 620
        Pro Glu Arg Pro Val Val Asp Asp Val Arg Val Arg Gly Thr Gly
        625                 630                 635                 640
        Arg Ser Gly Leu Arg Leu Glu Asp Ala Pro Lys Ala Gln Thr Gly Pro
                        645                 650                 655
        Pro Arg Val Asp Lys Met Thr Gln Cys Tyr Phe Glu Gly Gly Tyr Gln
                        660                 665                 670
        Glu Thr Pro Val Tyr Leu Leu Ala Glu Leu Gly Tyr Gly His Lys Leu
                        675                 680                 685
        His Gly Pro Cys Leu Ile Ile Asp Ser Asn Ser Thr Ile Leu Val Glu
                        690                 695                 700
        Pro Gly Cys Gln Ala Glu Val Thr Lys Thr Gly Asp Ile Cys Ile Ser
        705                 710                 715                 720
        Val Gly Ala Glu Val Pro Gly Thr Val Gly Pro Gln Leu Asp Pro Ile
                        725                 730                 735
        Gln Leu Ser Ile Phe Ser His Arg Phe Met Ser Ile Ala Glu Gln Met
                        740                 745                 750
        Gly Arg Ile Leu Gln Arg Thr Ala Ile Ser Thr Asn Ile Lys Glu Arg
                        755                 760                 765
        Leu Asp Phe Ser Cys Ala Leu Phe Gly Pro Asp Gly Leu Val Ser
        770                 775                 780
        Asn Ala Pro His Ile Pro Val His Leu Gly Ala Met Gln Glu Thr Val
        785                 790                 795                 800
        Gln Phe Gln Ile Gln His Leu Gly Ala Asp Leu His Pro Gly Asp Val
                        805                 810                 815
        Leu Leu Ser Asn His Pro Ser Ala Gly Gly Ser His Leu Pro Asp Leu
                        820                 825                 830
        Thr Val Ile Thr Pro Val Phe Trp Pro Gly Gln Thr Arg Pro Val Phe
                        835                 840                 845
        Tyr Val Ala Ser Arg Gly His His Ala Asp Ile Gly Gly Ile Thr Pro
                        850                 855                 860
        Gly Ser Met Pro Pro His Ser Thr Met Leu Gln Gln Glu Gly Ala Val
        865                 870                 875                 880
        Phe Leu Ser Phe Lys Leu Val Gln Gly Gly Val Phe Gln Glu Glu Ala
                        885                 890                 895
```

```
Val Thr Glu Ala Leu Arg Ala Pro Gly Lys Val Pro Asn Cys Ser Gly
            900                 905                 910

Thr Arg Asn Leu His Asp Asn Leu Ser Asp Leu Arg Ala Gln Val Ala
        915                 920                 925

Ala Asn Gln Lys Gly Ile Gln Leu Val Gly Glu Leu Ile Gly Gln Tyr
    930                 935                 940

Gly Leu Asp Val Val Gln Ala Tyr Met Gly His Ile Gln Ala Asn Ala
945                 950                 955                 960

Glu Leu Ala Val Arg Asp Met Leu Arg Ala Phe Gly Thr Ser Arg Gln
            965                 970                 975

Ala Arg Gly Leu Pro Leu Glu Val Ser Ser Glu Asp His Met Asp Asp
        980                 985                 990

Gly Ser Pro Ile Arg Leu Arg Val  Gln Ile Ser Leu Ser  Gln Gly Ser
    995                 1000                1005

Ala Val  Phe Asp Phe Ser Gly  Thr Gly Pro Glu Val  Phe Gly Asn
    1010                1015                1020

Leu Asn  Ala Pro Arg Ala Val  Thr Leu Ser Ala Leu  Ile Tyr Cys
    1025                1030                1035

Leu Arg  Cys Leu Val Gly Arg  Asp Ile Pro Leu Asn  Gln Gly Cys
    1040                1045                1050

Leu Ala  Pro Val Arg Val Val  Ile Pro Arg Gly Ser  Ile Leu Asp
    1055                1060                1065

Pro Ser  Pro Glu Ala Ala Val  Val Gly Gly Asn Val  Leu Thr Ser
    1070                1075                1080

Gln Arg  Val Val Asp Val Ile  Leu Gly Ala Phe Gly  Ala Cys Ala
    1085                1090                1095

Ala Ser  Gln Gly Cys Met Asn  Asn Val Thr Leu Gly  Asn Ala His
    1100                1105                1110

Met Gly  Tyr Tyr Glu Thr Val  Ala Gly Gly Ala Gly  Ala Gly Pro
    1115                1120                1125

Ser Trp  His Gly Arg Ser Gly  Val His Ser His Met  Thr Asn Thr
    1130                1135                1140

Arg Ile  Thr Asp Pro Glu Ile  Leu Glu Ser Arg Tyr  Pro Val Ile
    1145                1150                1155

Leu Arg  Arg Phe Glu Leu Arg  Gly Ser Gly Gly  Arg Gly Arg
    1160                1165                1170

Phe Arg  Gly Gly Asp Gly Val  Thr Arg Glu Leu Leu  Phe Arg Glu
    1175                1180                1185

Glu Ala  Leu Leu Ser Val Leu  Thr Glu Arg Arg Ala  Phe Arg Pro
    1190                1195                1200

Tyr Gly  Leu His Gly Gly Glu  Pro Gly Ala Arg Gly  Leu Asn Leu
    1205                1210                1215

Leu Ile  Arg Lys Asn Gly Arg  Thr Val Asn Leu Gly  Gly Lys Thr
    1220                1225                1230

Ser Val  Thr Val Tyr Pro Gly  Asp Val Phe Cys Leu  His Thr Pro
    1235                1240                1245

Gly Gly  Gly Gly Tyr Gly Asp  Pro Glu Asp Pro Ala  Pro Pro Pro
    1250                1255                1260

Gly Ser  Pro Pro Gln Ala Leu  Ala Phe Pro Glu His  Gly Ser Val
    1265                1270                1275

Tyr Glu  Tyr Arg Arg Ala Gln  Glu Ala Val Met Gly  Thr Gly Pro
    1280                1285                1290
```

```
Ala Gln Thr Pro Arg Ser Thr Arg Ala Gly Pro Glu Pro Ser Pro
1295                1300                1305

Ala Pro Pro Gly Pro Gly Asp Thr Gly Asp Ser Asp Val Thr Gln
1310                1315                1320

Glu Gly Ser Gly Pro Ala Gly Ile Arg Gly Gly Glu Thr Val Ile
1325                1330                1335

Arg Ala Gly Met Gly Asp Ser Pro Gly Arg Gly Ala Pro Glu Arg
1340                1345                1350

Arg His Lys Ala Gln Pro Gly Arg Ala Arg Lys Tyr Glu Trp Arg
1355                1360                1365

Pro Glu Gly Pro Thr Ser Met Gly Ser Leu Gly Gln Arg Glu Asp
1370                1375                1380

Leu Gln Asp Glu Asp Arg Asn Ser Ala Phe Thr Trp Lys Val Gln
1385                1390                1395

Ala Asn Asn Arg Ala Tyr Asn Gly Gln Phe Lys Glu Lys Val Ile
1400                1405                1410

Leu Cys Trp Gln Arg Lys Lys Tyr Lys Thr Asn Val Ile Arg Thr
1415                1420                1425

Ala Lys Tyr Asn Phe Tyr Ser Phe Leu Pro Leu Asn Leu Tyr Glu
1430                1435                1440

Gln Phe His Arg Val Ser Asn Leu Phe Phe Leu Ile Ile Ile Ile
1445                1450                1455

Leu Gln Ser Ile Pro Asp Ile Ser Thr Leu Pro Trp Phe Ser Leu
1460                1465                1470

Ser Thr Pro Met Val Cys Leu Leu Phe Ile Arg Ala Thr Arg Asp
1475                1480                1485

Leu Val Asp Asp Met Gly Arg His Lys Ser Asp Arg Ala Ile Asn
1490                1495                1500

Asn Arg Pro Cys Gln Ile Leu Met Gly Lys Ser Phe Lys Gln Lys
1505                1510                1515

Lys Trp Gln Asp Leu Cys Val Gly Asp Val Val Cys Leu Arg Lys
1520                1525                1530

Asp Asn Ile Val Pro Ala Asp Met Leu Leu Leu Ala Ser Thr Glu
1535                1540                1545

Pro Ser Ser Leu Cys Tyr Val Glu Thr Val Asp Ile Asp Gly Glu
1550                1555                1560

Thr Asn Leu Lys Phe Arg Gln Ala Leu Met Val Thr His Lys Glu
1565                1570                1575

Leu Ala Thr Ile Lys Lys Met Ala Ser Phe Gln Gly Thr Val Thr
1580                1585                1590

Cys Glu Ala Pro Asn Ser Arg Met His His Phe Val Gly Cys Leu
1595                1600                1605

Glu Trp Asn Asp Lys Lys Tyr Ser Leu Asp Ile Gly Asn Leu Leu
1610                1615                1620

Leu Arg Gly Cys Arg Ile Arg Asn Thr Asp Thr Cys Tyr Gly Leu
1625                1630                1635

Val Ile Tyr Ala Gly Phe Asp Thr Lys Ile Met Lys Asn Cys Gly
1640                1645                1650

Lys Ile His Leu Lys Arg Thr Lys Leu Asp Leu Leu Met Asn Lys
1655                1660                1665

Leu Val Val Val Ile Phe Ile Ser Val Val Leu Val Cys Leu Val
1670                1675                1680

Leu Ala Phe Gly Phe Gly Phe Ser Val Lys Glu Phe Lys Asp His
```

-continued

```
            1685                1690                1695
His Tyr Tyr Leu Ser Gly Val His Gly Ser Ser Val Ala Ala Glu
        1700                1705                1710

Ser Phe Phe Val Phe Trp Ser Phe Leu Ile Leu Leu Ser Val Thr
        1715                1720                1725

Ile Pro Met Ser Met Phe Ile Leu Ser Glu Phe Ile Tyr Leu Gly
        1730                1735                1740

Asn Ser Val Phe Ile Asp Trp Asp Val Gln Met Tyr Tyr Lys Pro
        1745                1750                1755

Gln Asp Val Pro Ala Lys Ala Arg Ser Thr Ser Leu Asn Asp His
        1760                1765                1770

Leu Gly Gln Val Glu Tyr Ile Phe Ser Asp Lys Thr Gly Thr Leu
        1775                1780                1785

Thr Gln Asn Ile Leu Thr Phe Asn Lys Cys Cys Ile Ser Gly Arg
        1790                1795                1800

Val Tyr Gly Pro Asp Ser Glu Ala Thr Thr Arg Pro Lys Glu Asn
        1805                1810                1815

Pro Tyr Leu Trp Asn Lys Phe Ala Asp Gly Lys Leu Leu Phe His
        1820                1825                1830

Asn Ala Ala Leu Leu His Leu Val Arg Thr Asn Gly Asp Glu Ala
        1835                1840                1845

Val Arg Glu Phe Trp Arg Leu Leu Ala Ile Cys His Thr Val Met
        1850                1855                1860

Val Arg Glu Ser Pro Arg Glu Arg Pro Asp Gln Leu Leu Tyr Gln
        1865                1870                1875

Ala Ala Ser Pro Asp Glu Gly Ala Leu Val Thr Ala Ala Arg Asn
        1880                1885                1890

Phe Gly Tyr Val Phe Leu Ser Arg Thr Gln Asp Thr Val Thr Ile
        1895                1900                1905

Met Glu Leu Gly Glu Glu Arg Val Tyr Gln Val Leu Ala Ile Met
        1910                1915                1920

Asp Phe Asn Ser Thr Arg Lys Arg Met Ser Val Leu Val Arg Lys
        1925                1930                1935

Pro Glu Gly Ala Ile Cys Leu Tyr Thr Lys Gly Ala Asp Thr Val
        1940                1945                1950

Ile Phe Glu Arg Leu His Arg Arg Gly Ala Met Glu Phe Ala Thr
        1955                1960                1965

Glu Glu Ala Leu Ala Ala Phe Ala Gln Glu Thr Leu Arg Thr Leu
        1970                1975                1980

Cys Leu Ala Tyr Arg Glu Val Ala Glu Asp Ile Tyr Glu Asp Trp
        1985                1990                1995

Gln Gln Arg His Gln Glu Ala Ser Leu Leu Leu Gln Asn Arg Ala
        2000                2005                2010

Gln Ala Leu Gln Gln Leu Leu Gly Ala Thr Ala Ile Glu Asp Arg
        2015                2020                2025

Leu Gln Asp Gly Val Pro Glu Thr Ile Lys Cys Leu Lys Lys Ser
        2030                2035                2040

Asn Ile Lys Ile Trp Val Leu Thr Gly Asp Lys Gln Glu Thr Ala
        2045                2050                2055

Val Asn Ile Gly Phe Ala Cys Glu Leu Leu Ser Glu Asn Met Leu
        2060                2065                2070

Ile Leu Glu Glu Lys Glu Ile Ser Arg Ile Leu Glu Thr Tyr Trp
        2075                2080                2085
```

```
Glu Asn Ser Asn Asn Leu Leu Thr Arg Glu Ser Leu Ser Gln Val
    2090                2095                2100

Lys Leu Ala Leu Val Ile Asn Gly Asp Phe Leu Asp Lys Leu Leu
    2105                2110                2115

Val Ser Leu Arg Lys Glu Pro Arg Ala Leu Ala Gln Asn Val Asn
    2120                2125                2130

Met Asp Glu Ala Trp Gln Glu Leu Gly Gln Ser Arg Arg Asp Phe
    2135                2140                2145

Leu Tyr Ala Arg Arg Leu Ser Leu Leu Cys Arg Arg Phe Gly Leu
    2150                2155                2160

Pro Leu Ala Ala Pro Pro Ala Gln Asp Ser Arg Ala Arg Arg Ser
    2165                2170                2175

Ser Glu Val Leu Gln Glu Arg Ala Phe Val Asp Leu Ala Ser Lys
    2180                2185                2190

Cys Gln Ala Val Ile Cys Cys Arg Val Thr Pro Lys Gln Lys Ala
    2195                2200                2205

Leu Ile Val Ala Leu Val Lys Lys Tyr His Gln Val Val Thr Leu
    2210                2215                2220

Ala Ile Gly Asp Gly Ala Asn Asp Ile Asn Met Ile Lys Thr Ala
    2225                2230                2235

Asp Val Gly Val Gly Leu Ala Gly Gln Glu Gly Met Gln Ala Val
    2240                2245                2250

Gln Asn Ser Asp Phe Val Leu Gly Gln Phe Cys Phe Leu Gln Arg
    2255                2260                2265

Leu Leu Leu Val His Gly Arg Trp Ser Tyr Val Arg Ile Cys Lys
    2270                2275                2280

Phe Leu Arg Tyr Phe Phe Tyr Lys Ser Met Ala Ser Met Met Val
    2285                2290                2295

Gln Val Trp Phe Ala Cys Tyr Asn Gly Phe Thr Gly Gln Pro Leu
    2300                2305                2310

Tyr Glu Gly Trp Phe Leu Ala Leu Phe Asn Leu Leu Tyr Ser Thr
    2315                2320                2325

Leu Pro Val Leu Tyr Ile Gly Leu Phe Glu Gln Asp Val Ser Ala
    2330                2335                2340

Glu Gln Ser Leu Glu Lys Pro Glu Leu Tyr Val Val Gly Gln Lys
    2345                2350                2355

Asp Glu Leu Phe Asn Tyr Trp Val Phe Val Gln Ala Ile Ala His
    2360                2365                2370

Gly Val Thr Thr Ser Leu Val Asn Phe Phe Met Thr Leu Trp Ile
    2375                2380                2385

Ser Arg Asp Thr Ala Gly Pro Ala Ser Phe Ser Asp His Gln Ser
    2390                2395                2400

Phe Ala Val Val Val Ala Leu Ser Cys Leu Leu Ser Ile Thr Met
    2405                2410                2415

Glu Val Ile Leu Ile Ile Lys Tyr Trp Thr Ala Leu Cys Val Ala
    2420                2425                2430

Thr Ile Leu Leu Ser Leu Gly Phe Tyr Ala Ile Met Thr Thr Thr
    2435                2440                2445

Thr Gln Ser Phe Trp Leu Phe Arg Val Ser Pro Thr Thr Phe Pro
    2450                2455                2460

Phe Leu Tyr Ala Asp Leu Ser Val Met Ser Ser Pro Ser Ile Leu
    2465                2470                2475
```

```
Leu Val Val Leu Ser Val Ser Ile Asn Thr Phe Pro Val Leu
    2480            2485                2490

Ala Leu Arg Val Ile Phe Pro Ala Leu Lys Glu Leu Arg Ala Lys
    2495                2500                2505

Glu Glu Lys Val Glu Glu Gly Pro Ser Glu Glu Ile Phe Thr Met
    2510                2515                2520

Glu Pro Leu Pro His Val His Arg Glu Ser Arg Ala Arg Arg Ser
    2525                2530                2535

Ser Tyr Ala Phe Ser His Arg Glu Gly Tyr Ala Asn Leu Ile Thr
    2540                2545                2550

Gln Gly Thr Ile Leu Arg Arg Gly Pro Gly Val Ser Ser Asp Ile
    2555                2560                2565

Ala Ser Glu Ser Leu Asp Pro Ser Asp Glu Glu Ala Ala Ser Ser
    2570                2575                2580

Pro Lys Glu Ser Gln
    2585

<210> SEQ ID NO 9
<211> LENGTH: 1300
<212> TYPE: PRT
<213> ORGANISM: homo sapiens

<400> SEQUENCE: 9

Met Gly Thr Gly Pro Ala Gln Thr Pro Arg Ser Thr Arg Ala Gly Pro
1               5                   10                  15

Glu Pro Ser Pro Ala Pro Pro Gly Pro Gly Asp Thr Gly Asp Ser Asp
                20                  25                  30

Val Thr Gln Glu Gly Ser Gly Pro Ala Gly Ile Arg Gly Gly Glu Thr
            35                  40                  45

Val Ile Arg Ala Gly Met Gly Asp Ser Pro Gly Arg Gly Ala Pro Glu
        50                  55                  60

Arg Arg His Lys Ala Gln Pro Gly Arg Ala Arg Lys Tyr Glu Trp Arg
65                  70                  75                  80

Pro Glu Gly Pro Thr Ser Met Gly Ser Leu Gly Gln Arg Glu Asp Leu
                85                  90                  95

Gln Asp Glu Asp Arg Asn Ser Ala Phe Thr Trp Lys Val Gln Ala Asn
                100                 105                 110

Asn Arg Ala Tyr Asn Gly Gln Phe Lys Glu Lys Val Ile Leu Cys Trp
            115                 120                 125

Gln Arg Lys Lys Tyr Lys Thr Asn Val Ile Arg Thr Ala Lys Tyr Asn
        130                 135                 140

Phe Tyr Ser Phe Leu Pro Leu Asn Leu Tyr Glu Gln Phe His Arg Val
145                 150                 155                 160

Ser Asn Leu Phe Phe Leu Ile Ile Ile Leu Gln Ser Ile Pro Asp
                165                 170                 175

Ile Ser Thr Leu Pro Trp Phe Ser Leu Ser Thr Pro Met Val Cys Leu
                180                 185                 190

Leu Phe Ile Arg Ala Thr Arg Asp Leu Val Asp Asp Met Gly Arg His
            195                 200                 205

Lys Ser Asp Arg Ala Ile Asn Asn Arg Pro Cys Gln Ile Leu Met Gly
        210                 215                 220

Lys Ser Phe Lys Gln Lys Lys Trp Gln Asp Leu Cys Val Gly Asp Val
225                 230                 235                 240

Val Cys Leu Arg Lys Asp Asn Ile Val Pro Ala Asp Met Leu Leu Leu
                245                 250                 255
```

```
Ala Ser Thr Glu Pro Ser Ser Leu Cys Tyr Val Thr Val Asp Ile
            260                 265                 270

Asp Gly Glu Thr Asn Leu Lys Phe Arg Gln Ala Leu Met Val Thr His
            275                 280                 285

Lys Glu Leu Ala Thr Ile Lys Lys Met Ala Ser Phe Gln Gly Thr Val
            290                 295                 300

Thr Cys Glu Ala Pro Asn Ser Arg Met His His Phe Val Gly Cys Leu
305                 310                 315                 320

Glu Trp Asn Asp Lys Lys Tyr Ser Leu Asp Ile Gly Asn Leu Leu Leu
                325                 330                 335

Arg Gly Cys Arg Ile Arg Asn Thr Asp Thr Cys Tyr Gly Leu Val Ile
                340                 345                 350

Tyr Ala Gly Phe Asp Thr Lys Ile Met Lys Asn Cys Gly Lys Ile His
                355                 360                 365

Leu Lys Arg Thr Lys Leu Asp Leu Leu Met Asn Lys Leu Val Val Val
            370                 375                 380

Ile Phe Ile Ser Val Val Leu Val Cys Leu Val Leu Ala Phe Gly Phe
385                 390                 395                 400

Gly Phe Ser Val Lys Glu Phe Lys Asp His His Tyr Tyr Leu Ser Gly
                405                 410                 415

Val His Gly Ser Ser Val Ala Ala Glu Ser Phe Phe Val Phe Trp Ser
                420                 425                 430

Phe Leu Ile Leu Leu Ser Val Thr Ile Pro Met Ser Met Phe Ile Leu
            435                 440                 445

Ser Glu Phe Ile Tyr Leu Gly Asn Ser Val Phe Ile Asp Trp Asp Val
            450                 455                 460

Gln Met Tyr Tyr Lys Pro Gln Asp Val Pro Ala Lys Ala Arg Ser Thr
465                 470                 475                 480

Ser Leu Asn Asp His Leu Gly Gln Val Glu Tyr Ile Phe Ser Asp Lys
                485                 490                 495

Thr Gly Thr Leu Thr Gln Asn Ile Leu Thr Phe Asn Lys Cys Cys Ile
            500                 505                 510

Ser Gly Arg Val Tyr Gly Pro Asp Ser Glu Ala Thr Thr Arg Pro Lys
            515                 520                 525

Glu Asn Pro Tyr Leu Trp Asn Lys Phe Ala Asp Gly Lys Leu Leu Phe
            530                 535                 540

His Asn Ala Ala Leu Leu His Leu Val Arg Thr Asn Gly Asp Glu Ala
545                 550                 555                 560

Val Arg Glu Phe Trp Arg Leu Leu Ala Ile Cys His Thr Val Met Val
                565                 570                 575

Arg Glu Ser Pro Arg Glu Arg Pro Asp Gln Leu Leu Tyr Gln Ala Ala
            580                 585                 590

Ser Pro Asp Glu Gly Ala Leu Val Thr Ala Ala Arg Asn Phe Gly Tyr
            595                 600                 605

Val Phe Leu Ser Arg Thr Gln Asp Thr Val Thr Ile Met Glu Leu Gly
            610                 615                 620

Glu Glu Arg Val Tyr Gln Val Leu Ala Ile Met Asp Phe Asn Ser Thr
625                 630                 635                 640

Arg Lys Arg Met Ser Val Leu Val Arg Lys Pro Glu Gly Ala Ile Cys
                645                 650                 655

Leu Tyr Thr Lys Gly Ala Asp Thr Val Ile Phe Glu Arg Leu His Arg
            660                 665                 670
```

```
                    -continued

Arg Gly Ala Met Glu Phe Ala Thr Glu Glu Ala Leu Ala Phe Ala
        675                 680                 685

Gln Glu Thr Leu Arg Thr Leu Cys Leu Ala Tyr Arg Glu Val Ala Glu
    690                 695                 700

Asp Ile Tyr Glu Asp Trp Gln Gln Arg His Gln Glu Ala Ser Leu Leu
705                 710                 715                 720

Leu Gln Asn Arg Ala Gln Ala Leu Gln Gln Leu Leu Gly Ala Thr Ala
                725                 730                 735

Ile Glu Asp Arg Leu Gln Asp Gly Val Pro Glu Thr Ile Lys Cys Leu
            740                 745                 750

Lys Lys Ser Asn Ile Lys Ile Trp Val Leu Thr Gly Asp Lys Gln Glu
        755                 760                 765

Thr Ala Val Asn Ile Gly Phe Ala Cys Glu Leu Leu Ser Glu Asn Met
    770                 775                 780

Leu Ile Leu Glu Glu Lys Glu Ile Ser Arg Ile Leu Glu Thr Tyr Trp
785                 790                 795                 800

Glu Asn Ser Asn Asn Leu Leu Thr Arg Glu Ser Leu Ser Gln Val Lys
                805                 810                 815

Leu Ala Leu Val Ile Asn Gly Asp Phe Leu Asp Lys Leu Leu Val Ser
            820                 825                 830

Leu Arg Lys Glu Pro Arg Ala Leu Ala Gln Asn Val Asn Met Asp Glu
        835                 840                 845

Ala Trp Gln Glu Leu Gly Gln Ser Arg Arg Asp Phe Leu Tyr Ala Arg
    850                 855                 860

Arg Leu Ser Leu Leu Cys Arg Arg Phe Gly Leu Pro Leu Ala Ala Pro
865                 870                 875                 880

Pro Ala Gln Asp Ser Arg Ala Arg Ser Ser Glu Val Leu Gln Glu
                885                 890                 895

Arg Ala Phe Val Asp Leu Ala Ser Lys Cys Gln Ala Val Ile Cys Cys
            900                 905                 910

Arg Val Thr Pro Lys Gln Lys Ala Leu Ile Val Ala Leu Val Lys Lys
        915                 920                 925

Tyr His Gln Val Val Thr Leu Ala Ile Gly Asp Gly Ala Asn Asp Ile
    930                 935                 940

Asn Met Ile Lys Thr Ala Asp Val Gly Val Gly Leu Ala Gly Gln Glu
945                 950                 955                 960

Gly Met Gln Ala Val Gln Asn Ser Asp Phe Val Leu Gly Gln Phe Cys
                965                 970                 975

Phe Leu Gln Arg Leu Leu Leu Val His Gly Arg Trp Ser Tyr Val Arg
            980                 985                 990

Ile Cys Lys Phe Leu Arg Tyr Phe Phe Tyr Lys Ser Met Ala Ser Met
        995                 1000                1005

Met Val Gln Val Trp Phe Ala Cys Tyr Asn Gly Phe Thr Gly Gln
    1010                1015                1020

Pro Leu Tyr Glu Gly Trp Phe Leu Ala Leu Phe Asn Leu Leu Tyr
    1025                1030                1035

Ser Thr Leu Pro Val Leu Tyr Ile Gly Leu Phe Glu Gln Asp Val
    1040                1045                1050

Ser Ala Glu Gln Ser Leu Glu Lys Pro Glu Leu Tyr Val Val Gly
    1055                1060                1065

Gln Lys Asp Glu Leu Phe Asn Tyr Trp Val Phe Val Gln Ala Ile
    1070                1075                1080

Ala His Gly Val Thr Thr Ser Leu Val Asn Phe Phe Met Thr Leu
```

```
            1085                1090                1095

Trp Ile Ser Arg Asp Thr Ala Gly Pro Ala Ser Phe Ser Asp His
        1100                1105                1110

Gln Ser Phe Ala Val Val Ala Leu Ser Cys Leu Leu Ser Ile
        1115                1120                1125

Thr Met Glu Val Ile Leu Ile Lys Tyr Trp Thr Ala Leu Cys
        1130                1135                1140

Val Ala Thr Ile Leu Leu Ser Leu Gly Phe Tyr Ala Ile Met Thr
        1145                1150                1155

Thr Thr Thr Gln Ser Phe Trp Leu Phe Arg Val Ser Pro Thr Thr
        1160                1165                1170

Phe Pro Phe Leu Tyr Ala Asp Leu Ser Val Met Ser Ser Pro Ser
        1175                1180                1185

Ile Leu Leu Val Val Leu Leu Ser Val Ser Ile Asn Thr Phe Pro
        1190                1195                1200

Val Leu Ala Leu Arg Val Ile Phe Pro Ala Leu Lys Glu Leu Arg
        1205                1210                1215

Ala Lys Glu Glu Lys Val Glu Glu Gly Pro Ser Glu Glu Ile Phe
        1220                1225                1230

Thr Met Glu Pro Leu Pro His Val His Arg Glu Ser Arg Ala Arg
        1235                1240                1245

Arg Ser Ser Tyr Ala Phe Ser His Arg Glu Gly Tyr Ala Asn Leu
        1250                1255                1260

Ile Thr Gln Gly Thr Ile Leu Arg Arg Gly Pro Gly Val Ser Ser
        1265                1270                1275

Asp Ile Ala Ser Glu Ser Leu Asp Pro Ser Asp Glu Glu Ala Ala
        1280                1285                1290

Ser Ser Pro Lys Glu Ser Gln
        1295                1300

<210> SEQ ID NO 10
<211> LENGTH: 1023
<212> TYPE: PRT
<213> ORGANISM: homo sapiens

<400> SEQUENCE: 10

Met Gly Lys Gly Val Gly Arg Asp Lys Tyr Glu Pro Ala Ala Val Ser
1               5                   10                  15

Glu Gln Gly Asp Lys Lys Gly Lys Gly Lys Lys Asp Arg Asp Met
                20                  25                  30

Asp Glu Leu Lys Lys Glu Val Ser Met Asp Asp His Lys Leu Ser Leu
            35                  40                  45

Asp Glu Leu His Arg Lys Tyr Gly Thr Asp Leu Ser Arg Gly Leu Thr
        50                  55                  60

Ser Ala Arg Ala Ala Glu Ile Leu Ala Arg Asp Gly Pro Asn Ala Leu
65                  70                  75                  80

Thr Pro Pro Pro Thr Thr Pro Glu Trp Ile Lys Phe Cys Arg Gln Leu
                85                  90                  95

Phe Gly Gly Phe Ser Met Leu Leu Trp Ile Gly Ala Ile Leu Cys Phe
                100                 105                 110

Leu Ala Tyr Ser Ile Gln Ala Ala Thr Glu Glu Glu Pro Gln Asn Asp
            115                 120                 125

Asn Leu Tyr Leu Gly Val Val Leu Ser Ala Val Val Ile Ile Thr Gly
        130                 135                 140
```

```
Cys Phe Ser Tyr Tyr Gln Glu Ala Lys Ser Ser Lys Ile Met Glu Ser
145                 150                 155                 160

Phe Lys Asn Met Val Pro Gln Gln Ala Leu Val Ile Arg Asn Gly Glu
            165                 170                 175

Lys Met Ser Ile Asn Ala Glu Glu Val Val Gly Asp Leu Val Glu
        180                 185                 190

Val Lys Gly Gly Asp Arg Ile Pro Ala Asp Leu Arg Ile Ile Ser Ala
    195                 200                 205

Asn Gly Cys Lys Val Asp Asn Ser Ser Leu Thr Gly Glu Ser Glu Pro
    210                 215                 220

Gln Thr Arg Ser Pro Asp Phe Thr Asn Glu Asn Pro Leu Glu Thr Arg
225                 230                 235                 240

Asn Ile Ala Phe Phe Ser Thr Asn Cys Val Glu Gly Thr Ala Arg Gly
            245                 250                 255

Ile Val Val Tyr Thr Gly Asp Arg Thr Val Met Gly Arg Ile Ala Thr
            260                 265                 270

Leu Ala Ser Gly Leu Glu Gly Gly Gln Thr Pro Ile Ala Ala Glu Ile
        275                 280                 285

Glu His Phe Ile His Ile Ile Thr Gly Val Ala Val Phe Leu Gly Val
    290                 295                 300

Ser Phe Phe Ile Leu Ser Leu Ile Leu Glu Tyr Thr Trp Leu Glu Ala
305                 310                 315                 320

Val Ile Phe Leu Ile Gly Ile Ile Val Ala Asn Val Pro Glu Gly Leu
                325                 330                 335

Leu Ala Thr Val Thr Val Cys Leu Thr Leu Thr Ala Lys Arg Met Ala
            340                 345                 350

Arg Lys Asn Cys Leu Val Lys Asn Leu Glu Ala Val Glu Thr Leu Gly
        355                 360                 365

Ser Thr Ser Thr Ile Cys Ser Asp Lys Thr Gly Thr Leu Thr Gln Asn
    370                 375                 380

Arg Met Thr Val Ala His Met Trp Phe Asp Asn Gln Ile His Glu Ala
385                 390                 395                 400

Asp Thr Thr Glu Asn Gln Ser Gly Val Ser Phe Asp Lys Thr Ser Ala
            405                 410                 415

Thr Trp Leu Ala Leu Ser Arg Ile Ala Gly Leu Cys Asn Arg Ala Val
        420                 425                 430

Phe Gln Ala Asn Gln Glu Asn Leu Pro Ile Leu Lys Arg Ala Val Ala
    435                 440                 445

Gly Asp Ala Ser Glu Ser Ala Leu Leu Lys Cys Ile Glu Leu Cys Cys
    450                 455                 460

Gly Ser Val Lys Glu Met Arg Glu Arg Tyr Ala Lys Ile Val Glu Ile
465                 470                 475                 480

Pro Phe Asn Ser Thr Asn Lys Tyr Gln Leu Ser Ile His Lys Asn Pro
            485                 490                 495

Asn Thr Ser Glu Pro Gln His Leu Leu Val Met Lys Gly Ala Pro Glu
            500                 505                 510

Arg Ile Leu Asp Arg Cys Ser Ser Ile Leu Leu His Gly Lys Glu Gln
            515                 520                 525

Pro Leu Asp Glu Glu Leu Lys Asp Ala Phe Gln Asn Ala Tyr Leu Glu
    530                 535                 540

Leu Gly Gly Leu Gly Glu Arg Val Leu Gly Phe Cys His Leu Phe Leu
545                 550                 555                 560

Pro Asp Glu Gln Phe Pro Glu Gly Phe Gln Phe Asp Thr Asp Asp Val
```

```
                565                 570                 575
Asn Phe Pro Ile Asp Asn Leu Cys Phe Val Gly Leu Ile Ser Met Ile
            580                 585                 590
Asp Pro Pro Arg Ala Val Pro Asp Ala Val Gly Lys Cys Arg Ser
            595                 600             605
Ala Gly Ile Lys Val Ile Met Val Thr Gly Asp His Pro Ile Thr Ala
        610                 615                 620
Lys Ala Ile Ala Lys Gly Val Gly Ile Ile Ser Glu Gly Asn Glu Thr
625                 630                 635                 640
Val Glu Asp Ile Ala Ala Arg Leu Asn Ile Pro Val Ser Gln Val Asn
                645                 650                 655
Pro Arg Asp Ala Lys Ala Cys Val Val His Gly Ser Asp Leu Lys Asp
            660                 665                 670
Met Thr Ser Glu Gln Leu Asp Asp Ile Leu Lys Tyr His Thr Glu Ile
            675                 680                 685
Val Phe Ala Arg Thr Ser Pro Gln Gln Lys Leu Ile Ile Val Glu Gly
        690                 695                 700
Cys Gln Arg Gln Gly Ala Ile Val Ala Val Thr Gly Asp Gly Val Asn
705                 710                 715                 720
Asp Ser Pro Ala Leu Lys Lys Ala Asp Ile Gly Val Ala Met Gly Ile
                725                 730                 735
Ala Gly Ser Asp Val Ser Lys Gln Ala Ala Asp Met Ile Leu Leu Asp
            740                 745                 750
Asp Asn Phe Ala Ser Ile Val Thr Gly Val Glu Glu Gly Arg Leu Ile
            755                 760                 765
Phe Asp Asn Leu Lys Lys Ser Ile Ala Tyr Thr Leu Thr Ser Asn Ile
        770                 775                 780
Pro Glu Ile Thr Pro Phe Leu Ile Phe Ile Ile Ala Asn Ile Pro Leu
785                 790                 795                 800
Pro Leu Gly Thr Val Thr Ile Leu Cys Ile Asp Leu Gly Thr Asp Met
                805                 810                 815
Val Pro Ala Ile Ser Leu Ala Tyr Glu Gln Ala Glu Ser Asp Ile Met
            820                 825                 830
Lys Arg Gln Pro Arg Asn Pro Lys Thr Asp Lys Leu Val Asn Glu Arg
            835                 840                 845
Leu Ile Ser Met Ala Tyr Gly Gln Ile Gly Met Ile Gln Ala Leu Gly
        850                 855                 860
Gly Phe Phe Thr Tyr Phe Val Ile Leu Ala Glu Asn Gly Phe Leu Pro
865                 870                 875                 880
Ile His Leu Leu Gly Leu Arg Val Asp Trp Asp Asp Arg Trp Ile Asn
                885                 890                 895
Asp Val Glu Asp Ser Tyr Gly Gln Gln Trp Thr Tyr Glu Gln Arg Lys
            900                 905                 910
Ile Val Glu Phe Thr Cys His Thr Ala Phe Phe Val Ser Ile Val Val
            915                 920                 925
Val Gln Trp Ala Asp Leu Val Ile Cys Lys Thr Arg Arg Asn Ser Val
        930                 935                 940
Phe Gln Gln Gly Met Lys Asn Lys Ile Leu Ile Phe Gly Leu Phe Glu
945                 950                 955                 960
Glu Thr Ala Leu Ala Ala Phe Leu Ser Tyr Cys Pro Gly Met Gly Val
                965                 970                 975
Ala Leu Arg Met Tyr Pro Leu Lys Pro Thr Trp Trp Phe Cys Ala Phe
            980                 985                 990
```

Pro Tyr Ser Leu Leu Ile Phe Val Tyr Asp Glu Val Arg Lys Leu Ile
                995                 1000                1005

Ile Arg Arg Arg Pro Gly Gly Trp Val Glu Lys Glu Thr Tyr Tyr
       1010                1015                1020

<210> SEQ ID NO 11
<211> LENGTH: 444
<212> TYPE: PRT
<213> ORGANISM: homo sapiens

<400> SEQUENCE: 11

Met Arg Glu Ile Val His Ile Gln Ala Gly Gln Cys Gly Asn Gln Ile
1               5                   10                  15

Gly Ala Lys Phe Trp Glu Val Ile Ser Asp Glu His Gly Ile Asp Pro
            20                  25                  30

Thr Gly Thr Tyr His Gly Asp Ser Asp Leu Gln Leu Asp Arg Ile Ser
        35                  40                  45

Val Tyr Tyr Asn Glu Ala Thr Gly Gly Lys Tyr Val Pro Arg Ala Ile
    50                  55                  60

Leu Val Asp Leu Glu Pro Gly Thr Met Asp Ser Val Arg Ser Gly Pro
65                  70                  75                  80

Phe Gly Gln Ile Phe Arg Pro Asp Asn Phe Val Phe Gly Gln Ser Gly
                85                  90                  95

Ala Gly Asn Asn Trp Ala Lys Gly His Tyr Thr Glu Gly Ala Glu Leu
            100                 105                 110

Val Asp Ser Val Leu Asp Val Val Arg Lys Glu Ala Glu Ser Cys Asp
        115                 120                 125

Cys Leu Gln Gly Phe Gln Leu Thr His Ser Leu Gly Gly Gly Thr Gly
    130                 135                 140

Ser Gly Met Gly Thr Leu Leu Ile Ser Lys Ile Arg Glu Glu Tyr Pro
145                 150                 155                 160

Asp Arg Ile Met Asn Thr Phe Ser Val Val Pro Ser Pro Lys Val Ser
                165                 170                 175

Asp Thr Val Val Glu Pro Tyr Asn Ala Thr Leu Ser Val His Gln Leu
            180                 185                 190

Val Glu Asn Thr Asp Glu Thr Tyr Cys Ile Asp Asn Glu Ala Leu Tyr
        195                 200                 205

Asp Ile Cys Phe Arg Thr Leu Lys Leu Thr Thr Pro Thr Tyr Gly Asp
    210                 215                 220

Leu Asn His Leu Val Ser Ala Thr Met Ser Gly Val Thr Thr Cys Leu
225                 230                 235                 240

Arg Phe Pro Gly Gln Leu Asn Ala Asp Leu Arg Lys Leu Ala Val Asn
                245                 250                 255

Met Val Pro Phe Pro Arg Leu His Phe Phe Met Pro Gly Phe Ala Pro
            260                 265                 270

Leu Thr Ser Arg Gly Ser Gln Gln Tyr Arg Ala Leu Thr Val Pro Glu
        275                 280                 285

Leu Thr Gln Gln Val Phe Asp Ala Lys Asn Met Met Ala Ala Cys Asp
    290                 295                 300

Pro Arg His Gly Arg Tyr Leu Thr Val Ala Ala Val Phe Arg Gly Arg
305                 310                 315                 320

Met Ser Met Lys Glu Val Asp Glu Gln Met Leu Asn Val Gln Asn Lys
                325                 330                 335

Asn Ser Ser Tyr Phe Val Glu Trp Ile Pro Asn Asn Val Lys Thr Ala

```
                    340                 345                 350
Val Cys Asp Ile Pro Pro Arg Gly Leu Lys Met Ala Val Thr Phe Ile
                355                 360                 365
Gly Asn Ser Thr Ala Ile Gln Glu Leu Phe Lys Arg Ile Ser Glu Gln
            370                 375                 380
Phe Thr Ala Met Phe Arg Arg Lys Ala Phe Leu His Trp Tyr Thr Gly
385                 390                 395                 400
Glu Gly Met Asp Glu Met Glu Phe Thr Glu Ala Glu Ser Asn Met Asn
                405                 410                 415
Asp Leu Val Ser Glu Tyr Gln Gln Tyr Gln Asp Ala Thr Ala Glu Glu
            420                 425                 430
Glu Glu Asp Phe Gly Glu Glu Ala Glu Glu Glu Ala
        435                 440

<210> SEQ ID NO 12
<211> LENGTH: 140
<212> TYPE: PRT
<213> ORGANISM: homo sapiens

<400> SEQUENCE: 12

Met Ala Gly Trp Asn Ala Tyr Ile Asp Asn Leu Met Ala Asp Gly Thr
1               5                   10                  15
Cys Gln Asp Ala Ala Ile Val Gly Tyr Lys Asp Ser Pro Ser Val Trp
            20                  25                  30
Ala Ala Val Pro Gly Lys Thr Phe Val Asn Ile Thr Pro Ala Glu Val
        35                  40                  45
Gly Val Leu Val Gly Lys Asp Arg Ser Ser Phe Tyr Val Asn Gly Leu
    50                  55                  60
Thr Leu Gly Gly Gln Lys Cys Ser Val Ile Arg Asp Ser Leu Leu Gln
65                  70                  75                  80
Asp Gly Glu Phe Ser Met Asp Leu Arg Thr Lys Ser Thr Gly Gly Ala
                85                  90                  95
Pro Thr Phe Asn Val Thr Val Thr Lys Thr Asp Lys Thr Leu Val Leu
            100                 105                 110
Leu Met Gly Lys Glu Gly Val His Gly Gly Leu Ile Asn Lys Lys Cys
        115                 120                 125
Tyr Glu Met Ala Ser His Leu Arg Arg Ser Gln Tyr
    130                 135                 140

<210> SEQ ID NO 13
<211> LENGTH: 295
<212> TYPE: PRT
<213> ORGANISM: homo sapiens

<400> SEQUENCE: 13

Met Ser Gly Ala Leu Asp Val Leu Gln Met Lys Glu Glu Asp Val Leu
1               5                   10                  15
Lys Phe Leu Ala Ala Gly Thr His Leu Gly Gly Thr Asn Leu Asp Phe
            20                  25                  30
Gln Met Glu Gln Tyr Ile Tyr Lys Arg Lys Ser Asp Gly Ile Tyr Ile
        35                  40                  45
Ile Asn Leu Lys Arg Thr Trp Glu Lys Leu Leu Leu Ala Ala Arg Ala
    50                  55                  60
Ile Val Ala Ile Glu Asn Pro Ala Asp Val Ser Val Ile Ser Ser Arg
65                  70                  75                  80
Asn Thr Gly Gln Arg Ala Val Leu Lys Phe Ala Ala Ala Thr Gly Ala
```

```
                  85                  90                  95
Thr Pro Ile Ala Gly Arg Phe Thr Pro Gly Thr Phe Thr Asn Gln Ile
                100                 105                 110
Gln Ala Ala Phe Arg Glu Pro Arg Leu Leu Val Val Thr Asp Pro Arg
                115                 120                 125
Ala Asp His Gln Pro Leu Thr Glu Ala Ser Tyr Val Asn Leu Pro Thr
130                 135                 140
Ile Ala Leu Cys Asn Thr Asp Ser Pro Leu Arg Tyr Val Asp Ile Ala
145                 150                 155                 160
Ile Pro Cys Asn Asn Lys Gly Ala His Ser Val Gly Leu Met Trp Trp
                165                 170                 175
Met Leu Ala Arg Glu Val Leu Arg Met Arg Gly Thr Ile Ser Arg Glu
                180                 185                 190
His Pro Trp Glu Val Met Pro Asp Leu Tyr Phe Tyr Arg Asp Pro Glu
                195                 200                 205
Glu Ile Glu Lys Glu Glu Gln Ala Ala Ala Glu Lys Ala Val Thr Lys
                210                 215                 220
Glu Glu Phe Gln Gly Glu Trp Thr Ala Pro Ala Pro Glu Phe Thr Ala
225                 230                 235                 240
Thr Gln Pro Glu Val Ala Asp Trp Ser Glu Gly Val Gln Val Pro Ser
                245                 250                 255
Val Pro Ile Gln Gln Phe Pro Thr Glu Asp Trp Ser Ala Gln Pro Ala
                260                 265                 270
Thr Glu Asp Trp Ser Ala Ala Pro Thr Ala Gln Ala Thr Glu Trp Val
                275                 280                 285
Gly Ala Thr Thr Asp Trp Ser
                290                 295

<210> SEQ ID NO 14
<211> LENGTH: 135
<212> TYPE: PRT
<213> ORGANISM: homo sapiens

<400> SEQUENCE: 14

Met Ala Cys Gly Leu Val Ala Ser Asn Leu Asn Leu Lys Pro Gly Glu
1               5                   10                  15
Cys Leu Arg Val Arg Gly Glu Val Ala Pro Asp Ala Lys Ser Phe Val
                20                  25                  30
Leu Asn Leu Gly Lys Asp Ser Asn Asn Leu Cys Leu His Phe Asn Pro
            35                  40                  45
Arg Phe Asn Ala His Gly Asp Ala Asn Thr Ile Val Cys Asn Ser Lys
        50                  55                  60
Asp Gly Gly Ala Trp Gly Thr Glu Gln Arg Glu Ala Val Phe Pro Phe
65                  70                  75                  80
Gln Pro Gly Ser Val Ala Glu Val Cys Ile Thr Phe Asp Gln Ala Asn
                85                  90                  95
Leu Thr Val Lys Leu Pro Asp Gly Tyr Glu Phe Lys Phe Pro Asn Arg
                100                 105                 110
Leu Asn Leu Glu Ala Ile Asn Tyr Met Ala Ala Asp Gly Asp Phe Lys
            115                 120                 125
Ile Lys Cys Val Ala Phe Asp
        130                 135

<210> SEQ ID NO 15
<211> LENGTH: 215
```

```
<212> TYPE: PRT
<213> ORGANISM: homo sapiens

<400> SEQUENCE: 15

Met Gly Lys Gly Asp Pro Lys Lys Pro Arg Gly Lys Met Ser Ser Tyr
1               5                   10                  15

Ala Phe Phe Val Gln Thr Cys Arg Glu Glu His Lys Lys Lys His Pro
            20                  25                  30

Asp Ala Ser Val Asn Phe Ser Glu Phe Ser Lys Lys Cys Ser Glu Arg
        35                  40                  45

Trp Lys Thr Met Ser Ala Lys Glu Lys Gly Lys Phe Glu Asp Met Ala
    50                  55                  60

Lys Ala Asp Lys Ala Arg Tyr Glu Arg Glu Met Lys Thr Tyr Ile Pro
65                  70                  75                  80

Pro Lys Gly Glu Thr Lys Lys Lys Phe Lys Asp Pro Asn Ala Pro Lys
                85                  90                  95

Arg Pro Pro Ser Ala Phe Phe Leu Phe Cys Ser Glu Tyr Arg Pro Lys
            100                 105                 110

Ile Lys Gly Glu His Pro Gly Leu Ser Ile Gly Asp Val Ala Lys Lys
        115                 120                 125

Leu Gly Glu Met Trp Asn Asn Thr Ala Ala Asp Asp Lys Gln Pro Tyr
    130                 135                 140

Glu Lys Lys Ala Ala Lys Leu Lys Glu Lys Tyr Glu Lys Asp Ile Ala
145                 150                 155                 160

Ala Tyr Arg Ala Lys Gly Lys Pro Asp Ala Ala Lys Lys Gly Val Val
                165                 170                 175

Lys Ala Glu Lys Ser Lys Lys Lys Lys Glu Glu Glu Asp Glu Glu
            180                 185                 190

Asp Glu Glu Asp Glu Glu Glu Glu Asp Glu Glu Asp Glu Asp Glu
        195                 200                 205

Glu Glu Asp Asp Asp Asp Glu
    210                 215

<210> SEQ ID NO 16
<211> LENGTH: 372
<212> TYPE: PRT
<213> ORGANISM: homo sapiens

<400> SEQUENCE: 16

Met Ser Lys Ser Glu Ser Pro Lys Glu Pro Glu Gln Leu Arg Lys Leu
1               5                   10                  15

Phe Ile Gly Gly Leu Ser Phe Glu Thr Thr Asp Glu Ser Leu Arg Ser
            20                  25                  30

His Phe Glu Gln Trp Gly Thr Leu Thr Asp Cys Val Val Met Arg Asp
        35                  40                  45

Pro Asn Thr Lys Arg Ser Arg Gly Phe Gly Phe Val Thr Tyr Ala Thr
    50                  55                  60

Val Glu Glu Val Asp Ala Ala Met Asn Ala Arg Pro His Lys Val Asp
65                  70                  75                  80

Gly Arg Val Val Glu Pro Lys Arg Ala Val Ser Arg Glu Asp Ser Gln
                85                  90                  95

Arg Pro Gly Ala His Leu Thr Val Lys Lys Ile Phe Val Gly Gly Ile
            100                 105                 110

Lys Glu Asp Thr Glu Glu His His Leu Arg Asp Tyr Phe Glu Gln Tyr
        115                 120                 125
```

```
Gly Lys Ile Glu Val Ile Glu Ile Met Thr Asp Arg Gly Ser Gly Lys
    130                 135                 140

Lys Arg Gly Phe Ala Phe Val Thr Phe Asp Asp His Asp Ser Val Asp
145                 150                 155                 160

Lys Ile Val Ile Gln Lys Tyr His Thr Val Asn Gly His Asn Cys Glu
                165                 170                 175

Val Arg Lys Ala Leu Ser Lys Gln Glu Met Ala Ser Ala Ser Ser Ser
            180                 185                 190

Gln Arg Gly Arg Ser Gly Ser Gly Asn Phe Gly Gly Arg Gly Gly
        195                 200                 205

Gly Phe Gly Gly Asn Asp Asn Phe Gly Arg Gly Gly Asn Phe Ser Gly
    210                 215                 220

Arg Gly Gly Phe Gly Gly Ser Arg Gly Gly Gly Tyr Gly Gly Ser
225                 230                 235                 240

Gly Asp Gly Tyr Asn Gly Phe Gly Asn Asp Gly Gly Tyr Gly Gly
                245                 250                 255

Gly Pro Gly Tyr Ser Gly Gly Ser Arg Gly Tyr Gly Ser Gly Gly Gln
            260                 265                 270

Gly Tyr Gly Asn Gln Gly Ser Gly Tyr Gly Gly Ser Gly Ser Tyr Asp
        275                 280                 285

Ser Tyr Asn Asn Gly Gly Gly Gly Gly Phe Gly Gly Gly Ser Gly Ser
    290                 295                 300

Asn Phe Gly Gly Gly Gly Ser Tyr Asn Asp Phe Gly Asn Tyr Asn Asn
305                 310                 315                 320

Gln Ser Ser Asn Phe Gly Pro Met Lys Gly Gly Asn Phe Gly Gly Arg
                325                 330                 335

Ser Ser Gly Pro Tyr Gly Gly Gly Gly Gln Tyr Phe Ala Lys Pro Arg
            340                 345                 350

Asn Gln Gly Gly Tyr Gly Gly Ser Ser Ser Ser Ser Ser Tyr Gly Ser
        355                 360                 365

Gly Arg Arg Phe
    370

<210> SEQ ID NO 17
<211> LENGTH: 1058
<212> TYPE: PRT
<213> ORGANISM: homo sapiens

<400> SEQUENCE: 17

Met Ser Ser Ser Pro Leu Ser Lys Lys Arg Arg Val Ser Gly Pro Asp
1               5                   10                  15

Pro Lys Pro Gly Ser Asn Cys Ser Pro Ala Gln Ser Val Leu Ser Glu
            20                  25                  30

Val Pro Ser Val Pro Thr Asn Gly Met Ala Lys Asn Gly Ser Glu Ala
        35                  40                  45

Asp Ile Asp Glu Gly Leu Tyr Ser Arg Gln Leu Tyr Val Leu Gly His
    50                  55                  60

Glu Ala Met Lys Arg Leu Gln Thr Ser Ser Val Leu Val Ser Gly Leu
65                  70                  75                  80

Arg Gly Leu Gly Val Glu Ile Ala Lys Asn Ile Ile Leu Gly Gly Val
                85                  90                  95

Lys Ala Val Thr Leu His Asp Gln Gly Thr Ala Gln Trp Ala Asp Leu
            100                 105                 110

Ser Ser Gln Phe Tyr Leu Arg Glu Glu Asp Ile Gly Lys Asn Arg Ala
        115                 120                 125
```

```
Glu Val Ser Gln Pro Arg Leu Ala Glu Leu Asn Ser Tyr Val Pro Val
    130                 135                 140

Thr Ala Tyr Thr Gly Pro Leu Val Glu Asp Phe Leu Ser Gly Phe Gln
145                 150                 155                 160

Val Val Val Leu Thr Asn Thr Pro Leu Glu Asp Gln Leu Arg Val Gly
                165                 170                 175

Glu Phe Cys His Asn Arg Gly Ile Lys Leu Val Val Ala Asp Thr Arg
            180                 185                 190

Gly Leu Phe Gly Gln Leu Phe Cys Asp Phe Gly Glu Glu Met Ile Leu
        195                 200                 205

Thr Asp Ser Asn Gly Glu Gln Pro Leu Ser Ala Met Val Ser Met Val
210                 215                 220

Thr Lys Asp Asn Pro Gly Val Val Thr Cys Leu Asp Glu Ala Arg His
225                 230                 235                 240

Gly Phe Glu Ser Gly Asp Phe Val Ser Phe Ser Glu Val Gln Gly Met
                245                 250                 255

Val Glu Leu Asn Gly Asn Gln Pro Met Glu Ile Lys Val Leu Gly Pro
                260                 265                 270

Tyr Thr Phe Ser Ile Cys Asp Thr Ser Asn Phe Ser Asp Tyr Ile Arg
            275                 280                 285

Gly Gly Ile Val Ser Gln Val Lys Val Pro Lys Lys Ile Ser Phe Lys
        290                 295                 300

Ser Leu Val Ala Ser Leu Ala Glu Pro Asp Phe Val Thr Asp Phe
305                 310                 315                 320

Ala Lys Phe Ser Arg Pro Ala Gln Leu His Ile Gly Phe Gln Ala Leu
                325                 330                 335

His Gln Phe Cys Ala Gln His Gly Arg Pro Arg Pro Arg Asn Glu
                340                 345                 350

Glu Asp Ala Ala Glu Leu Val Ala Leu Ala Gln Ala Val Asn Ala Arg
            355                 360                 365

Ala Leu Pro Ala Val Gln Gln Asn Asn Leu Asp Glu Asp Leu Ile Arg
        370                 375                 380

Lys Leu Ala Tyr Val Ala Ala Gly Asp Leu Ala Pro Ile Asn Ala Phe
385                 390                 395                 400

Ile Gly Gly Leu Ala Ala Gln Glu Val Met Lys Ala Cys Ser Gly Lys
                405                 410                 415

Phe Met Pro Ile Met Gln Trp Leu Tyr Phe Asp Ala Leu Glu Cys Leu
                420                 425                 430

Pro Glu Asp Lys Glu Val Leu Thr Glu Asp Lys Cys Leu Gln Arg Gln
            435                 440                 445

Asn Arg Tyr Asp Gly Gln Val Ala Val Phe Gly Ser Asp Leu Gln Glu
        450                 455                 460

Lys Leu Gly Lys Gln Lys Tyr Phe Leu Val Gly Ala Gly Ala Ile Gly
465                 470                 475                 480

Cys Glu Leu Leu Lys Asn Phe Ala Met Ile Gly Leu Gly Cys Gly Glu
                485                 490                 495

Gly Gly Glu Ile Ile Val Thr Asp Met Asp Thr Ile Glu Lys Ser Asn
            500                 505                 510

Leu Asn Arg Gln Phe Leu Phe Arg Pro Trp Asp Val Thr Lys Leu Lys
        515                 520                 525

Ser Asp Thr Ala Ala Ala Ala Val Arg Gln Met Asn Pro His Ile Arg
530                 535                 540
```

-continued

```
Val Thr Ser His Gln Asn Arg Val Gly Pro Asp Thr Glu Arg Ile Tyr
545                 550                 555                 560

Asp Asp Asp Phe Phe Gln Asn Leu Asp Gly Val Ala Asn Ala Leu Asp
                565                 570                 575

Asn Val Asp Ala Arg Met Tyr Met Asp Arg Arg Cys Val Tyr Tyr Arg
            580                 585                 590

Lys Pro Leu Leu Glu Ser Gly Thr Leu Gly Thr Lys Gly Asn Val Gln
        595                 600                 605

Val Val Ile Pro Phe Leu Thr Glu Ser Tyr Ser Ser Gln Asp Pro
    610                 615                 620

Pro Glu Lys Ser Ile Pro Ile Cys Thr Leu Lys Asn Phe Pro Asn Ala
625                 630                 635                 640

Ile Glu His Thr Leu Gln Trp Ala Arg Asp Glu Phe Glu Gly Leu Phe
                645                 650                 655

Lys Gln Pro Ala Glu Asn Val Asn Gln Tyr Leu Thr Asp Pro Lys Phe
                660                 665                 670

Val Glu Arg Thr Leu Arg Leu Ala Gly Thr Gln Pro Leu Glu Val Leu
            675                 680                 685

Glu Ala Val Gln Arg Ser Leu Val Leu Gln Arg Pro Gln Thr Trp Ala
690                 695                 700

Asp Cys Val Thr Trp Ala Cys His His Trp His Thr Gln Tyr Ser Asn
705                 710                 715                 720

Asn Ile Arg Gln Leu Leu His Asn Phe Pro Pro Asp Gln Leu Thr Ser
                725                 730                 735

Ser Gly Ala Pro Phe Trp Ser Gly Pro Lys Arg Cys Pro His Pro Leu
            740                 745                 750

Thr Phe Asp Val Asn Asn Pro Leu His Leu Asp Tyr Val Met Ala Ala
        755                 760                 765

Ala Asn Leu Phe Ala Gln Thr Tyr Gly Leu Thr Gly Ser Gln Asp Arg
    770                 775                 780

Ala Ala Val Ala Thr Phe Leu Gln Ser Val Gln Val Pro Glu Phe Thr
785                 790                 795                 800

Pro Lys Ser Gly Val Lys Ile His Val Ser Asp Gln Glu Leu Gln Ser
                805                 810                 815

Ala Asn Ala Ser Val Asp Asp Ser Arg Leu Glu Glu Leu Lys Ala Thr
                820                 825                 830

Leu Pro Ser Pro Asp Lys Leu Pro Gly Phe Lys Met Tyr Pro Ile Asp
            835                 840                 845

Phe Glu Lys Asp Asp Asp Ser Asn Phe His Met Asp Phe Ile Val Ala
850                 855                 860

Ala Ser Asn Leu Arg Ala Glu Asn Tyr Asp Ile Pro Ser Ala Asp Arg
865                 870                 875                 880

His Lys Ser Lys Leu Ile Ala Gly Lys Ile Ile Pro Ala Ile Ala Thr
                885                 890                 895

Thr Thr Ala Ala Val Val Gly Leu Val Cys Leu Glu Leu Tyr Lys Val
            900                 905                 910

Val Gln Gly His Arg Gln Leu Asp Ser Tyr Lys Asn Gly Phe Leu Asn
        915                 920                 925

Leu Ala Leu Pro Phe Phe Gly Phe Ser Glu Pro Leu Ala Ala Pro Arg
    930                 935                 940

His Gln Tyr Tyr Asn Gln Glu Trp Thr Leu Trp Asp Arg Phe Glu Val
945                 950                 955                 960

Gln Gly Leu Gln Pro Asn Gly Glu Glu Met Thr Leu Lys Gln Phe Leu
```

-continued

```
                965                 970                 975
Asp Tyr Phe Lys Thr Glu His Lys Leu Glu Ile Thr Met Leu Ser Gln
            980                 985                 990

Gly Val Ser Met Leu Tyr Ser Phe Phe Met Pro Ala Ala Lys Leu Lys
            995                 1000                1005

Glu Arg Leu Asp Gln Pro Met Thr Glu Ile Val Ser Arg Val Ser
    1010                1015                1020

Lys Arg Lys Leu Gly Arg His Val Arg Ala Leu Val Leu Glu Leu
    1025                1030                1035

Cys Cys Asn Asp Glu Ser Gly Glu Asp Val Glu Val Pro Tyr Val
    1040                1045                1050

Arg Tyr Thr Ile Arg
    1055

<210> SEQ ID NO 18
<211> LENGTH: 166
<212> TYPE: PRT
<213> ORGANISM: homo sapiens

<400> SEQUENCE: 18

Met Ala Ser Gly Val Ala Val Ser Asp Gly Val Ile Lys Val Phe Asn
1               5                   10                  15

Asp Met Lys Val Arg Lys Ser Ser Thr Pro Glu Glu Val Lys Lys Arg
            20                  25                  30

Lys Lys Ala Val Leu Phe Cys Leu Ser Glu Asp Lys Lys Asn Ile Ile
        35                  40                  45

Leu Glu Glu Gly Lys Glu Ile Leu Val Gly Asp Val Gly Gln Thr Val
    50                  55                  60

Asp Asp Pro Tyr Ala Thr Phe Val Lys Met Leu Pro Asp Lys Asp Cys
65                  70                  75                  80

Arg Tyr Ala Leu Tyr Asp Ala Thr Tyr Glu Thr Lys Glu Ser Lys Lys
                85                  90                  95

Glu Asp Leu Val Phe Ile Phe Trp Ala Pro Glu Ser Ala Pro Leu Lys
            100                 105                 110

Ser Lys Met Ile Tyr Ala Ser Ser Lys Asp Ala Ile Lys Lys Lys Leu
        115                 120                 125

Thr Gly Ile Lys His Glu Leu Gln Ala Asn Cys Tyr Glu Glu Val Lys
    130                 135                 140

Asp Arg Cys Thr Leu Ala Glu Lys Leu Gly Gly Ser Ala Val Ile Ser
145                 150                 155                 160

Leu Glu Gly Lys Pro Leu
                165

<210> SEQ ID NO 19
<211> LENGTH: 461
<212> TYPE: PRT
<213> ORGANISM: homo sapiens

<400> SEQUENCE: 19

Met Ser Arg Gln Val Val Arg Ser Ser Lys Phe Arg His Val Phe Gly
1               5                   10                  15

Gln Pro Ala Lys Ala Asp Gln Cys Tyr Glu Asp Val Arg Val Ser Gln
            20                  25                  30

Thr Thr Trp Asp Ser Gly Phe Cys Ala Val Asn Pro Lys Phe Val Ala
        35                  40                  45

Leu Ile Cys Glu Ala Ser Gly Gly Gly Ala Phe Leu Val Leu Pro Leu
```

```
            50                  55                  60
Gly Lys Thr Gly Arg Val Asp Lys Asn Ala Pro Thr Val Cys Gly His
 65                  70                  75                  80

Thr Ala Pro Val Leu Asp Ile Ala Trp Cys Pro His Asn Asp Asn Val
                 85                  90                  95

Ile Ala Ser Gly Ser Glu Asp Cys Thr Val Met Val Trp Glu Ile Pro
                100                 105                 110

Asp Gly Gly Leu Met Leu Pro Leu Arg Glu Pro Val Val Thr Leu Glu
            115                 120                 125

Gly His Thr Lys Arg Val Gly Ile Val Ala Trp His Thr Thr Ala Gln
            130                 135                 140

Asn Val Leu Leu Ser Ala Gly Cys Asp Asn Val Ile Met Val Trp Asp
145                 150                 155                 160

Val Gly Thr Gly Ala Ala Met Leu Thr Leu Gly Pro Glu Val His Pro
                165                 170                 175

Asp Thr Ile Tyr Ser Val Asp Trp Ser Arg Asp Gly Gly Leu Ile Cys
                180                 185                 190

Thr Ser Cys Arg Asp Lys Arg Val Arg Ile Ile Glu Pro Arg Lys Gly
                195                 200                 205

Thr Val Val Ala Glu Lys Asp Arg Pro His Glu Gly Thr Arg Pro Val
210                 215                 220

Arg Ala Val Phe Val Ser Glu Gly Lys Ile Leu Thr Thr Gly Phe Ser
225                 230                 235                 240

Arg Met Ser Glu Arg Gln Val Ala Leu Trp Asp Thr Lys His Leu Glu
                245                 250                 255

Glu Pro Leu Ser Leu Gln Glu Leu Asp Thr Ser Ser Gly Val Leu Leu
                260                 265                 270

Pro Phe Phe Asp Pro Asp Thr Asn Ile Val Tyr Leu Cys Gly Lys Gly
                275                 280                 285

Asp Ser Ser Ile Arg Tyr Phe Glu Ile Thr Ser Glu Ala Pro Phe Leu
            290                 295                 300

His Tyr Leu Ser Met Phe Ser Ser Lys Glu Ser Gln Arg Gly Met Gly
305                 310                 315                 320

Tyr Met Pro Lys Arg Gly Leu Glu Val Asn Lys Cys Glu Ile Ala Arg
                325                 330                 335

Phe Tyr Lys Leu His Glu Arg Arg Cys Glu Pro Ile Ala Met Thr Val
                340                 345                 350

Pro Arg Lys Ser Asp Leu Phe Gln Glu Asp Leu Tyr Pro Pro Thr Ala
            355                 360                 365

Gly Pro Asp Pro Ala Leu Thr Ala Glu Glu Trp Leu Gly Gly Arg Asp
370                 375                 380

Ala Gly Pro Leu Leu Ile Ser Leu Lys Asp Gly Tyr Val Pro Pro Lys
385                 390                 395                 400

Ser Arg Glu Leu Arg Val Asn Arg Gly Leu Asp Thr Gly Arg Arg
                405                 410                 415

Ala Ala Pro Glu Ala Ser Gly Thr Pro Ser Ser Asp Ala Val Ser Arg
                420                 425                 430

Leu Glu Glu Glu Met Arg Lys Leu Gln Ala Thr Val Gln Glu Leu Gln
                435                 440                 445

Lys Arg Leu Asp Arg Leu Glu Glu Thr Val Gln Ala Lys
450                 455                 460

<210> SEQ ID NO 20
```

```
<211> LENGTH: 847
<212> TYPE: PRT
<213> ORGANISM: homo sapiens

<400> SEQUENCE: 20

Met Ser Lys Ser Phe Gln Gln Ser Ser Leu Ser Arg Asp Ser Gln Gly
1               5                   10                  15

His Gly Arg Asp Leu Ser Ala Ala Gly Ile Gly Leu Leu Ala Ala Ala
            20                  25                  30

Thr Gln Ser Leu Ser Met Pro Ala Ser Leu Gly Arg Met Asn Gln Gly
        35                  40                  45

Thr Ala Arg Leu Ala Ser Leu Met Asn Leu Gly Met Ser Ser Ser Leu
50                  55                  60

Asn Gln Gln Gly Ala His Ser Ala Leu Ser Ser Ala Ser Thr Ser Ser
65                  70                  75                  80

His Asn Leu Gln Ser Ile Phe Asn Ile Gly Ser Arg Gly Pro Leu Pro
                85                  90                  95

Leu Ser Ser Gln His Arg Gly Asp Ala Asp Gln Ala Ser Asn Ile Leu
            100                 105                 110

Ala Ser Phe Gly Leu Ser Ala Arg Asp Leu Asp Glu Leu Ser Arg Tyr
        115                 120                 125

Pro Glu Asp Lys Ile Thr Pro Glu Asn Leu Pro Gln Ile Leu Leu Gln
130                 135                 140

Leu Lys Arg Arg Arg Thr Glu Glu Gly Pro Thr Leu Ser Tyr Gly Arg
145                 150                 155                 160

Asp Gly Arg Ser Ala Thr Arg Glu Pro Pro Tyr Arg Val Pro Arg Asp
                165                 170                 175

Asp Trp Glu Glu Lys Arg His Phe Arg Arg Asp Ser Phe Asp Asp Arg
            180                 185                 190

Gly Pro Ser Leu Asn Pro Val Leu Asp Tyr Asp His Gly Ser Arg Ser
        195                 200                 205

Gln Glu Ser Gly Tyr Tyr Asp Arg Met Asp Tyr Glu Asp Asp Arg Leu
210                 215                 220

Arg Asp Gly Glu Arg Cys Arg Asp Asp Ser Phe Phe Gly Glu Thr Ser
225                 230                 235                 240

His Asn Tyr His Lys Phe Asp Ser Glu Tyr Glu Arg Met Gly Arg Gly
                245                 250                 255

Pro Gly Pro Leu Gln Glu Arg Ser Leu Phe Glu Lys Lys Arg Gly Ala
            260                 265                 270

Pro Pro Ser Ser Asn Ile Glu Asp Phe His Gly Leu Leu Pro Lys Gly
        275                 280                 285

Tyr Pro His Leu Cys Ser Ile Cys Asp Leu Pro Val His Ser Asn Lys
290                 295                 300

Glu Trp Ser Gln His Ile Asn Gly Ala Ser His Ser Arg Arg Cys Gln
305                 310                 315                 320

Leu Leu Leu Glu Ile Tyr Pro Glu Trp Asn Pro Asp Asn Asp Thr Gly
                325                 330                 335

His Thr Met Gly Asp Pro Phe Met Leu Gln Gln Ser Thr Asn Pro Ala
            340                 345                 350

Pro Gly Ile Leu Gly Pro Pro Pro Ser Phe His Leu Gly Gly Pro
        355                 360                 365

Ala Val Gly Pro Arg Gly Asn Leu Gly Ala Gly Asn Gly Asn Leu Gln
370                 375                 380

Gly Pro Arg His Met Gln Lys Gly Arg Val Glu Thr Ser Arg Val Val
```

-continued

```
            385                 390                 395                 400
       His Ile Met Asp Phe Gln Arg Gly Lys Asn Leu Arg Tyr Gln Leu Leu
                           405                 410                 415

Gln Leu Val Glu Pro Phe Gly Val Ile Ser Asn His Leu Ile Leu Asn
                           420                 425                 430

Lys Ile Asn Glu Ala Phe Ile Glu Met Ala Thr Thr Glu Asp Ala Gln
                           435                 440                 445

Ala Ala Val Asp Tyr Tyr Thr Thr Pro Ala Leu Val Phe Gly Lys
           450                 455                 460

Pro Val Arg Val His Leu Ser Gln Lys Tyr Lys Arg Ile Lys Pro
       465                 470                 475                 480

Glu Gly Lys Pro Asp Gln Lys Phe Asp Gln Lys Gln Glu Leu Gly Arg
                           485                 490                 495

Val Ile His Leu Ser Asn Leu Pro His Ser Gly Tyr Ser Asp Ser Ala
                           500                 505                 510

Val Leu Lys Leu Ala Glu Pro Tyr Gly Lys Ile Lys Asn Tyr Ile Leu
                           515                 520                 525

Met Arg Met Lys Ser Gln Ala Phe Ile Glu Met Glu Thr Arg Glu Asp
                           530                 535                 540

Ala Met Ala Met Val Asp His Cys Leu Lys Lys Ala Leu Trp Phe Gln
       545                 550                 555                 560

Gly Arg Cys Val Lys Val Asp Leu Ser Glu Lys Tyr Lys Lys Leu Val
                           565                 570                 575

Leu Arg Ile Pro Asn Arg Gly Ile Asp Leu Leu Lys Lys Asp Lys Ser
                           580                 585                 590

Arg Lys Arg Ser Tyr Ser Pro Asp Gly Lys Glu Ser Pro Ser Asp Lys
                           595                 600                 605

Lys Ser Lys Thr Asp Gly Ser Gln Lys Thr Glu Ser Ser Thr Glu Gly
                           610                 615                 620

Lys Glu Gln Glu Glu Lys Ser Gly Glu Asp Gly Glu Lys Asp Thr Lys
       625                 630                 635                 640

Asp Asp Gln Thr Glu Gln Glu Pro Asn Met Leu Leu Glu Ser Glu Asp
                           645                 650                 655

Glu Leu Leu Val Asp Glu Glu Ala Ala Leu Leu Glu Ser Gly
                           660                 665                 670

Ser Ser Val Gly Asp Glu Thr Asp Leu Ala Asn Leu Gly Asp Val Ala
                           675                 680                 685

Ser Asp Gly Lys Lys Glu Pro Ser Asp Lys Ala Val Lys Lys Asp Gly
                           690                 695                 700

Ser Ala Ser Ala Ala Lys Lys Leu Lys Lys Val Asp Lys Ile
       705                 710                 715                 720

Glu Glu Leu Asp Gln Glu Asn Glu Ala Ala Leu Glu Asn Gly Ile Lys
                           725                 730                 735

Asn Glu Glu Asn Thr Glu Pro Gly Ala Glu Ser Ser Glu Asn Ala Asp
                           740                 745                 750

Asp Pro Asn Lys Asp Thr Ser Glu Asn Ala Asp Gly Gln Ser Asp Glu
                           755                 760                 765

Asn Lys Asp Asp Tyr Thr Ile Pro Asp Glu Tyr Arg Ile Gly Pro Tyr
                           770                 775                 780

Gln Pro Asn Val Pro Val Gly Ile Asp Tyr Val Ile Pro Lys Thr Gly
       785                 790                 795                 800

Phe Tyr Cys Lys Leu Cys Ser Leu Phe Tyr Thr Asn Glu Glu Val Ala
                           805                 810                 815
```

```
Lys Asn Thr His Cys Ser Ser Leu Pro His Tyr Gln Lys Leu Lys Lys
            820                 825                 830

Phe Leu Asn Lys Leu Ala Glu Glu Arg Arg Gln Lys Lys Glu Thr
        835                 840                 845

<210> SEQ ID NO 21
<211> LENGTH: 204
<212> TYPE: PRT
<213> ORGANISM: homo sapiens

<400> SEQUENCE: 21

Met Thr Glu Trp Glu Thr Ala Ala Pro Ala Val Ala Glu Thr Pro Asp
1               5                   10                  15

Ile Lys Leu Phe Gly Lys Trp Ser Thr Asp Asp Val Gln Ile Asn Asp
            20                  25                  30

Ile Ser Leu Gln Asp Tyr Ile Ala Val Lys Glu Lys Tyr Ala Lys Tyr
        35                  40                  45

Leu Pro His Ser Ala Gly Arg Tyr Ala Ala Lys Arg Phe Arg Lys Ala
    50                  55                  60

Gln Cys Pro Ile Val Glu Arg Leu Thr Asn Ser Met Met Met His Gly
65                  70                  75                  80

Arg Asn Asn Gly Lys Lys Leu Met Thr Val Arg Ile Val Lys His Ala
                85                  90                  95

Phe Glu Ile Ile His Leu Leu Thr Gly Glu Asn Pro Leu Gln Val Leu
            100                 105                 110

Val Asn Ala Ile Ile Asn Ser Gly Pro Arg Glu Asp Ser Thr Arg Ile
        115                 120                 125

Gly Arg Ala Gly Thr Val Arg Arg Gln Ala Val Asp Val Ser Pro Leu
    130                 135                 140

Arg Arg Val Asn Gln Ala Ile Trp Leu Leu Cys Thr Gly Ala Arg Glu
145                 150                 155                 160

Ala Ala Phe Arg Asn Ile Lys Thr Ile Ala Glu Cys Leu Ala Asp Glu
                165                 170                 175

Leu Ile Asn Ala Ala Lys Gly Ser Ser Asn Ser Tyr Ala Ile Lys Lys
            180                 185                 190

Lys Asp Glu Leu Glu Arg Val Ala Lys Ser Asn Arg
        195                 200

<210> SEQ ID NO 22
<211> LENGTH: 923
<212> TYPE: PRT
<213> ORGANISM: homo sapiens

<400> SEQUENCE: 22

Met Asp Ser Ile Gly Ser Ser Gly Leu Arg Gln Gly Glu Glu Thr Leu
1               5                   10                  15

Ser Cys Ser Glu Glu Gly Leu Pro Gly Pro Ser Asp Ser Ser Glu Leu
            20                  25                  30

Val Gln Glu Cys Leu Gln Gln Phe Lys Val Thr Arg Ala Gln Leu Gln
        35                  40                  45

Gln Ile Gln Ala Ser Leu Leu Gly Ser Met Glu Gln Ala Leu Arg Gly
    50                  55                  60

Gln Ala Ser Pro Ala Pro Ala Val Arg Met Leu Pro Thr Tyr Val Gly
65                  70                  75                  80

Ser Thr Pro His Gly Thr Glu Gln Gly Asp Phe Val Val Leu Glu Leu
                85                  90                  95
```

-continued

```
Gly Ala Thr Gly Ala Ser Leu Arg Val Leu Trp Val Thr Leu Thr Gly
            100                 105                 110

Ile Glu Gly His Arg Val Glu Pro Arg Ser Gln Glu Phe Val Ile Pro
        115                 120                 125

Gln Glu Val Met Leu Gly Ala Gly Gln Gln Leu Phe Asp Phe Ala Ala
130                 135                 140

His Cys Leu Ser Glu Phe Leu Asp Ala Gln Pro Val Asn Lys Gln Gly
145                 150                 155                 160

Leu Gln Leu Gly Phe Ser Phe Ser Phe Pro Cys His Gln Thr Gly Leu
                165                 170                 175

Asp Arg Ser Thr Leu Ile Ser Trp Thr Lys Gly Phe Arg Cys Ser Gly
            180                 185                 190

Val Glu Gly Gln Asp Val Val Gln Leu Leu Arg Asp Ala Ile Arg Arg
        195                 200                 205

Gln Gly Ala Tyr Asn Ile Asp Val Val Ala Val Val Asn Asp Thr Val
210                 215                 220

Gly Thr Met Met Gly Cys Glu Pro Gly Val Arg Pro Cys Glu Val Gly
225                 230                 235                 240

Leu Val Val Asp Thr Gly Thr Asn Ala Cys Tyr Met Glu Glu Ala Arg
                245                 250                 255

His Val Ala Val Leu Asp Glu Asp Arg Gly Arg Val Cys Val Ser Val
            260                 265                 270

Glu Trp Gly Ser Phe Ser Asp Asp Gly Ala Leu Gly Pro Val Leu Thr
        275                 280                 285

Thr Phe Asp His Thr Leu Asp His Glu Ser Leu Asn Pro Gly Ala Gln
290                 295                 300

Arg Phe Glu Lys Met Ile Gly Gly Leu Tyr Leu Gly Glu Leu Val Arg
305                 310                 315                 320

Leu Val Leu Ala His Leu Ala Arg Cys Gly Val Leu Phe Gly Gly Cys
                325                 330                 335

Thr Ser Pro Ala Leu Leu Ser Gln Gly Ser Ile Leu Leu Glu His Val
            340                 345                 350

Ala Glu Met Glu Asp Pro Ser Thr Gly Ala Ala Arg Val His Ala Ile
        355                 360                 365

Leu Gln Asp Leu Gly Leu Ser Pro Gly Ala Ser Asp Val Glu Leu Val
370                 375                 380

Gln His Val Cys Ala Ala Val Cys Thr Arg Ala Ala Gln Leu Cys Ala
385                 390                 395                 400

Ala Ala Leu Ala Ala Val Leu Ser Cys Leu Gln His Ser Arg Glu Gln
                405                 410                 415

Gln Thr Leu Gln Val Ala Val Ala Thr Gly Gly Arg Val Cys Glu Arg
            420                 425                 430

His Pro Arg Phe Cys Ser Val Leu Gln Gly Thr Val Met Leu Leu Ala
        435                 440                 445

Pro Glu Cys Asp Val Ser Leu Ile Pro Ser Val Asp Gly Gly Gly Arg
450                 455                 460

Gly Val Ala Met Val Thr Ala Val Ala Ala Arg Leu Ala Ala His Arg
465                 470                 475                 480

Arg Leu Leu Glu Glu Thr Leu Ala Pro Phe Arg Leu Asn His Asp Gln
                485                 490                 495

Leu Ala Ala Val Gln Ala Gln Met Arg Lys Ala Met Ala Lys Gly Leu
            500                 505                 510
```

```
Arg Gly Glu Ala Ser Ser Leu Arg Met Leu Pro Thr Phe Val Arg Ala
            515                 520                 525

Thr Pro Asp Gly Ser Glu Arg Gly Asp Phe Leu Ala Leu Asp Leu Gly
530                 535                 540

Gly Thr Asn Phe Arg Val Leu Leu Val Arg Val Thr Thr Gly Val Gln
545                 550                 555                 560

Ile Thr Ser Glu Ile Tyr Ser Ile Pro Glu Thr Val Ala Gln Gly Ser
            565                 570                 575

Gly Gln Gln Leu Phe Asp His Ile Val Asp Cys Ile Val Asp Phe Gln
            580                 585                 590

Gln Lys Gln Gly Leu Ser Gly Gln Ser Leu Pro Leu Gly Phe Thr Phe
    595                 600                 605

Ser Phe Pro Cys Arg Gln Leu Gly Leu Asp Gln Gly Ile Leu Leu Asn
    610                 615                 620

Trp Thr Lys Gly Phe Lys Ala Ser Asp Cys Glu Gly Gln Asp Val Val
625                 630                 635                 640

Ser Leu Leu Arg Glu Ala Ile Thr Arg Arg Gln Ala Val Glu Leu Asn
                645                 650                 655

Val Val Ala Ile Val Asn Asp Thr Val Gly Thr Met Met Ser Cys Gly
                660                 665                 670

Tyr Glu Asp Pro Arg Cys Glu Ile Gly Leu Ile Val Gly Thr Gly Thr
            675                 680                 685

Asn Ala Cys Tyr Met Glu Glu Leu Arg Asn Val Ala Gly Val Pro Gly
            690                 695                 700

Asp Ser Gly Arg Met Cys Ile Asn Met Glu Trp Gly Ala Phe Gly Asp
705                 710                 715                 720

Asp Gly Ser Leu Ala Met Leu Ser Thr Arg Phe Asp Ala Ser Val Asp
                725                 730                 735

Gln Ala Ser Ile Asn Pro Gly Lys Gln Arg Phe Glu Lys Met Ile Ser
                740                 745                 750

Gly Met Tyr Leu Gly Glu Ile Val Arg His Ile Leu Leu His Leu Thr
            755                 760                 765

Ser Leu Gly Val Leu Phe Arg Gly Gln Gln Ile Gln Arg Leu Gln Thr
770                 775                 780

Arg Asp Ile Phe Lys Thr Lys Phe Leu Ser Glu Ile Glu Ser Asp Ser
785                 790                 795                 800

Leu Ala Leu Arg Gln Val Arg Ala Ile Leu Glu Asp Leu Gly Leu Pro
                805                 810                 815

Leu Thr Ser Asp Asp Ala Leu Met Val Leu Glu Val Cys Gln Ala Val
                820                 825                 830

Ser Gln Arg Ala Ala Gln Leu Cys Gly Ala Gly Val Ala Ala Val Val
            835                 840                 845

Glu Lys Ile Arg Glu Asn Arg Gly Leu Glu Glu Leu Ala Val Ser Val
850                 855                 860

Gly Val Asp Gly Thr Leu Tyr Lys Leu His Pro Arg Phe Ser Ser Leu
865                 870                 875                 880

Val Ala Ala Thr Val Arg Glu Leu Ala Pro Arg Cys Val Val Thr Phe
                885                 890                 895

Leu Gln Ser Glu Asp Gly Ser Gly Lys Gly Ala Ala Leu Val Thr Ala
            900                 905                 910

Val Ala Cys Arg Leu Ala Gln Leu Thr Arg Val
            915                 920
```

```
<210> SEQ ID NO 23
<211> LENGTH: 528
<212> TYPE: PRT
<213> ORGANISM: homo sapiens

<400> SEQUENCE: 23
```

| | | | | | | | | | | | | | | | |
|---|---|---|---|---|---|---|---|---|---|---|---|---|---|---|---|
| Met | Gly | Asp | Ala | Pro | Ser | Pro | Glu | Glu | Lys | Leu | His | Leu | Ile | Thr | Arg |
| 1 | | | | 5 | | | | | 10 | | | | | 15 | |
| Asn | Leu | Gln | Glu | Val | Leu | Gly | Glu | Lys | Leu | Lys | Glu | Ile | Leu | Lys | |
| | | | 20 | | | | | 25 | | | | | 30 | | |
| Glu | Arg | Glu | Leu | Lys | Ile | Tyr | Trp | Gly | Thr | Ala | Thr | Thr | Gly | Lys | Pro |
| | | 35 | | | | | 40 | | | | | 45 | | | |
| His | Val | Ala | Tyr | Phe | Val | Pro | Met | Ser | Lys | Ile | Ala | Asp | Phe | Leu | Lys |
| | 50 | | | | | 55 | | | | | 60 | | | | |
| Ala | Gly | Cys | Glu | Val | Thr | Ile | Leu | Phe | Ala | Asp | Leu | His | Ala | Tyr | Leu |
| 65 | | | | | 70 | | | | | 75 | | | | | 80 |
| Asp | Asn | Met | Lys | Ala | Pro | Trp | Glu | Leu | Leu | Glu | Leu | Arg | Val | Ser | Tyr |
| | | | | 85 | | | | | 90 | | | | | 95 | |
| Tyr | Glu | Asn | Val | Ile | Lys | Ala | Met | Leu | Glu | Ser | Ile | Gly | Val | Pro | Leu |
| | | | 100 | | | | | 105 | | | | | 110 | | |
| Glu | Lys | Leu | Lys | Phe | Ile | Lys | Gly | Thr | Asp | Tyr | Gln | Leu | Ser | Lys | Glu |
| | | 115 | | | | | 120 | | | | | 125 | | | |
| Tyr | Thr | Leu | Asp | Val | Tyr | Arg | Leu | Ser | Ser | Val | Val | Thr | Gln | His | Asp |
| | 130 | | | | | 135 | | | | | 140 | | | | |
| Ser | Lys | Lys | Ala | Gly | Ala | Glu | Val | Val | Lys | Gln | Val | Glu | His | Pro | Leu |
| 145 | | | | | 150 | | | | | 155 | | | | | 160 |
| Leu | Ser | Gly | Leu | Leu | Tyr | Pro | Gly | Leu | Gln | Ala | Leu | Asp | Glu | Glu | Tyr |
| | | | | 165 | | | | | 170 | | | | | 175 | |
| Leu | Lys | Val | Asp | Ala | Gln | Phe | Gly | Gly | Ile | Asp | Gln | Arg | Lys | Ile | Phe |
| | | | 180 | | | | | 185 | | | | | 190 | | |
| Thr | Phe | Ala | Glu | Lys | Tyr | Leu | Pro | Ala | Leu | Gly | Tyr | Ser | Lys | Arg | Val |
| | | 195 | | | | | 200 | | | | | 205 | | | |
| His | Leu | Met | Asn | Pro | Met | Val | Pro | Gly | Leu | Thr | Gly | Ser | Lys | Met | Ser |
| | 210 | | | | | 215 | | | | | 220 | | | | |
| Ser | Ser | Glu | Glu | Glu | Ser | Lys | Ile | Asp | Leu | Leu | Asp | Arg | Lys | Glu | Asp |
| 225 | | | | | 230 | | | | | 235 | | | | | 240 |
| Val | Lys | Lys | Lys | Leu | Lys | Lys | Ala | Phe | Cys | Glu | Pro | Gly | Asn | Val | Glu |
| | | | | 245 | | | | | 250 | | | | | 255 | |
| Asn | Asn | Gly | Val | Leu | Ser | Phe | Ile | Lys | His | Val | Leu | Phe | Pro | Leu | Lys |
| | | | 260 | | | | | 265 | | | | | 270 | | |
| Ser | Glu | Phe | Val | Ile | Leu | Arg | Asp | Glu | Lys | Trp | Gly | Gly | Asn | Lys | Thr |
| | | 275 | | | | | 280 | | | | | 285 | | | |
| Tyr | Thr | Ala | Tyr | Val | Asp | Leu | Glu | Lys | Asp | Phe | Ala | Ala | Glu | Val | Val |
| | 290 | | | | | 295 | | | | | 300 | | | | |
| His | Pro | Gly | Asp | Leu | Lys | Asn | Ser | Val | Glu | Val | Ala | Leu | Asn | Lys | Leu |
| 305 | | | | | 310 | | | | | 315 | | | | | 320 |
| Leu | Asp | Pro | Ile | Arg | Glu | Lys | Phe | Asn | Thr | Pro | Ala | Leu | Lys | Lys | Leu |
| | | | | 325 | | | | | 330 | | | | | 335 | |
| Ala | Ser | Ala | Ala | Tyr | Pro | Asp | Pro | Ser | Lys | Gln | Lys | Pro | Met | Ala | Lys |
| | | | 340 | | | | | 345 | | | | | 350 | | |
| Gly | Pro | Ala | Lys | Asn | Ser | Glu | Pro | Glu | Glu | Val | Ile | Pro | Ser | Arg | Leu |
| | | 355 | | | | | 360 | | | | | 365 | | | |
| Asp | Ile | Arg | Val | Gly | Lys | Ile | Ile | Thr | Val | Glu | Lys | His | Pro | Asp | Ala |
| | 370 | | | | | 375 | | | | | 380 | | | | |

```
Asp Ser Leu Tyr Val Glu Lys Ile Asp Val Gly Glu Ala Glu Pro Arg
385                 390                 395                 400

Thr Val Val Ser Gly Leu Val Gln Phe Val Pro Lys Glu Glu Leu Gln
            405                 410                 415

Asp Arg Leu Val Val Val Leu Cys Asn Leu Lys Pro Gln Lys Met Arg
        420                 425                 430

Gly Val Glu Ser Gln Gly Met Leu Leu Cys Ala Ser Ile Glu Gly Ile
    435                 440                 445

Asn Arg Gln Val Glu Pro Leu Asp Pro Ala Gly Ser Ala Pro Gly
450                 455                 460

Glu His Val Phe Val Lys Gly Tyr Glu Lys Gly Gln Pro Asp Glu Glu
465                 470                 475                 480

Leu Lys Pro Lys Lys Val Phe Glu Lys Leu Gln Ala Asp Phe Lys
                485                 490                 495

Ile Ser Glu Glu Cys Ile Ala Gln Trp Lys Gln Thr Asn Phe Met Thr
                500                 505                 510

Lys Leu Gly Ser Ile Ser Cys Lys Ser Leu Lys Gly Gly Asn Ile Ser
            515                 520                 525

<210> SEQ ID NO 24
<211> LENGTH: 463
<212> TYPE: PRT
<213> ORGANISM: homo sapiens

<400> SEQUENCE: 24

Met Glu Thr Glu Gln Pro Glu Glu Thr Phe Pro Asn Thr Glu Thr Asn
1               5                   10                  15

Gly Glu Phe Gly Lys Arg Pro Ala Glu Asp Met Glu Glu Glu Gln Ala
            20                  25                  30

Phe Lys Arg Ser Arg Asn Thr Asp Glu Met Val Glu Leu Arg Ile Leu
        35                  40                  45

Leu Gln Ser Lys Asn Ala Gly Ala Val Ile Gly Lys Gly Gly Lys Asn
    50                  55                  60

Ile Lys Ala Leu Arg Thr Asp Tyr Asn Ala Ser Val Ser Val Pro Asp
65                  70                  75                  80

Ser Ser Gly Pro Glu Arg Ile Leu Ser Ile Ser Ala Asp Ile Glu Thr
                85                  90                  95

Ile Gly Glu Ile Leu Lys Lys Ile Ile Pro Thr Leu Glu Glu Gly Leu
            100                 105                 110

Gln Leu Pro Ser Pro Thr Ala Thr Ser Gln Leu Pro Leu Glu Ser Asp
        115                 120                 125

Ala Val Glu Cys Leu Asn Tyr Gln His Tyr Lys Gly Ser Asp Phe Asp
    130                 135                 140

Cys Glu Leu Arg Leu Leu Ile His Gln Ser Leu Ala Gly Gly Ile Ile
145                 150                 155                 160

Gly Val Lys Gly Ala Lys Ile Lys Glu Leu Arg Glu Asn Thr Gln Thr
                165                 170                 175

Thr Ile Lys Leu Phe Gln Glu Cys Cys Pro His Ser Thr Asp Arg Val
            180                 185                 190

Val Leu Ile Gly Gly Lys Pro Asp Arg Val Val Glu Cys Ile Lys Ile
        195                 200                 205

Ile Leu Asp Leu Ile Ser Glu Ser Pro Ile Lys Gly Arg Ala Gln Pro
    210                 215                 220

Tyr Asp Pro Asn Phe Tyr Asp Glu Thr Tyr Asp Tyr Gly Gly Phe Thr
225                 230                 235                 240
```

Met Met Phe Asp Asp Arg Arg Gly Arg Pro Val Gly Phe Pro Met Arg
                245                 250                 255

Gly Arg Gly Gly Phe Asp Arg Met Pro Pro Gly Arg Gly Arg Pro
            260                 265                 270

Met Pro Pro Ser Arg Arg Asp Tyr Asp Asp Met Ser Pro Arg Arg Gly
            275                 280                 285

Pro Pro Pro Pro Pro Gly Arg Gly Arg Gly Gly Ser Arg Ala
        290                 295                 300

Arg Asn Leu Pro Leu Pro Pro Pro Pro Arg Gly Gly Asp Leu
305                 310                 315                 320

Met Ala Tyr Asp Arg Arg Gly Arg Pro Gly Asp Arg Tyr Asp Gly Met
                325                 330                 335

Val Gly Phe Ser Ala Asp Glu Thr Trp Asp Ser Ala Ile Asp Thr Trp
            340                 345                 350

Ser Pro Ser Glu Trp Gln Met Ala Tyr Glu Pro Gln Gly Gly Ser Gly
            355                 360                 365

Tyr Asp Tyr Ser Tyr Ala Gly Gly Arg Gly Ser Tyr Gly Asp Leu Gly
            370                 375                 380

Gly Pro Ile Ile Thr Thr Gln Val Thr Ile Pro Lys Asp Leu Ala Gly
385                 390                 395                 400

Ser Ile Ile Gly Lys Gly Gly Gln Arg Ile Lys Gln Ile Arg His Glu
                405                 410                 415

Ser Gly Ala Ser Ile Lys Ile Asp Glu Pro Leu Glu Gly Ser Glu Asp
                420                 425                 430

Arg Ile Ile Thr Ile Thr Gly Thr Gln Asp Gln Ile Gln Asn Ala Gln
                435                 440                 445

Tyr Leu Leu Gln Asn Ser Val Lys Gln Tyr Ser Gly Lys Phe Phe
    450                 455                 460

<210> SEQ ID NO 25
<211> LENGTH: 83
<212> TYPE: PRT
<213> ORGANISM: homo sapiens

<400> SEQUENCE: 25

Met Gln Asn Asp Ala Gly Glu Phe Val Asp Leu Tyr Val Pro Arg Lys
1               5                   10                  15

Cys Ser Ala Ser Asn Arg Ile Ile Gly Ala Lys Asp His Ala Ser Ile
                20                  25                  30

Gln Met Asn Val Ala Glu Val Asp Lys Val Thr Gly Arg Phe Asn Gly
            35                  40                  45

Gln Phe Lys Thr Tyr Ala Ile Cys Gly Ala Ile Arg Arg Met Gly Glu
        50                  55                  60

Ser Asp Asp Ser Ile Leu Arg Leu Ala Lys Ala Asp Gly Ile Val Ser
65                  70                  75                  80

Lys Asn Phe

<210> SEQ ID NO 26
<211> LENGTH: 451
<212> TYPE: PRT
<213> ORGANISM: homo sapiens

<400> SEQUENCE: 26

Met Arg Glu Cys Ile Ser Ile His Val Gly Gln Ala Gly Val Gln Ile
1               5                   10                  15

-continued

Gly Asn Ala Cys Trp Glu Leu Tyr Cys Leu Glu His Gly Ile Gln Pro
            20                  25                  30

Asp Gly Gln Met Pro Ser Asp Lys Thr Ile Gly Gly Asp Asp Ser
        35                  40                  45

Phe Asn Thr Phe Phe Ser Glu Thr Gly Ala Gly Lys His Val Pro Arg
 50                  55                  60

Ala Val Phe Val Asp Leu Glu Pro Thr Val Ile Asp Glu Val Arg Thr
 65                  70                  75                  80

Gly Thr Tyr Arg Gln Leu Phe His Pro Glu Gln Leu Ile Thr Gly Lys
                85                  90                  95

Glu Asp Ala Ala Asn Asn Tyr Ala Arg Gly His Tyr Thr Ile Gly Lys
            100                 105                 110

Glu Ile Ile Asp Leu Val Leu Asp Arg Ile Arg Lys Leu Ala Asp Gln
        115                 120                 125

Cys Thr Gly Leu Gln Gly Phe Leu Val Phe His Ser Phe Gly Gly Gly
 130                 135                 140

Thr Gly Ser Gly Phe Thr Ser Leu Leu Met Glu Arg Leu Ser Val Asp
145                 150                 155                 160

Tyr Gly Lys Lys Ser Lys Leu Glu Phe Ser Ile Tyr Pro Ala Pro Gln
                165                 170                 175

Val Ser Thr Ala Val Val Glu Pro Tyr Asn Ser Ile Leu Thr Thr His
            180                 185                 190

Thr Thr Leu Glu His Ser Asp Cys Ala Phe Met Val Asp Asn Glu Ala
        195                 200                 205

Ile Tyr Asp Ile Cys Arg Arg Asn Leu Asp Ile Glu Arg Pro Thr Tyr
 210                 215                 220

Thr Asn Leu Asn Arg Leu Ile Ser Gln Ile Val Ser Ser Ile Thr Ala
225                 230                 235                 240

Ser Leu Arg Phe Asp Gly Ala Leu Asn Val Asp Leu Thr Glu Phe Gln
                245                 250                 255

Thr Asn Leu Val Pro Tyr Pro Arg Ile His Phe Pro Leu Ala Thr Tyr
            260                 265                 270

Ala Pro Val Ile Ser Ala Glu Lys Ala Tyr His Glu Gln Leu Ser Val
        275                 280                 285

Ala Glu Ile Thr Asn Ala Cys Phe Glu Pro Ala Asn Gln Met Val Lys
 290                 295                 300

Cys Asp Pro Arg His Gly Lys Tyr Met Ala Cys Cys Leu Leu Tyr Arg
305                 310                 315                 320

Gly Asp Val Val Pro Lys Asp Val Asn Ala Ala Ile Ala Thr Ile Lys
                325                 330                 335

Thr Lys Arg Ser Ile Gln Phe Val Asp Trp Cys Pro Thr Gly Phe Lys
            340                 345                 350

Val Gly Ile Asn Tyr Gln Pro Pro Thr Val Val Pro Gly Gly Asp Leu
        355                 360                 365

Ala Lys Val Gln Arg Ala Val Cys Met Leu Ser Asn Thr Thr Ala Ile
 370                 375                 380

Ala Glu Ala Trp Ala Arg Leu Asp His Lys Phe Asp Leu Met Tyr Ala
385                 390                 395                 400

Lys Arg Ala Phe Val His Trp Tyr Val Gly Glu Gly Met Glu Glu Gly
                405                 410                 415

Glu Phe Ser Glu Ala Arg Glu Asp Met Ala Ala Leu Glu Lys Asp Tyr
            420                 425                 430

Glu Glu Val Gly Val Asp Ser Val Glu Gly Glu Gly Glu Glu Glu Gly

```
            435                 440                 445

Glu Glu Tyr
    450

<210> SEQ ID NO 27
<211> LENGTH: 164
<212> TYPE: PRT
<213> ORGANISM: homo sapiens

<400> SEQUENCE: 27

Met His Arg Asp Ser Cys Pro Leu Asp Cys Lys Val Tyr Val Gly Asn
1               5                   10                  15

Leu Gly Asn Asn Gly Asn Lys Thr Glu Leu Glu Arg Ala Phe Gly Tyr
            20                  25                  30

Tyr Gly Pro Leu Arg Ser Val Trp Val Ala Arg Asn Pro Pro Gly Phe
        35                  40                  45

Ala Phe Val Glu Phe Glu Asp Pro Arg Asp Ala Ala Asp Ala Val Arg
    50                  55                  60

Glu Leu Asp Gly Arg Thr Leu Cys Gly Cys Arg Val Arg Val Glu Leu
65                  70                  75                  80

Ser Asn Gly Glu Lys Arg Ser Arg Asn Arg Gly Pro Pro Pro Ser Trp
                85                  90                  95

Gly Arg Arg Pro Arg Asp Asp Tyr Arg Arg Ser Pro Pro Pro Arg
            100                 105                 110

Arg Arg Ser Pro Arg Arg Arg Ser Phe Ser Arg Ser Arg Ser Arg Ser
            115                 120                 125

Leu Ser Arg Asp Arg Arg Glu Arg Ser Leu Ser Arg Glu Arg Asn
        130                 135                 140

His Lys Pro Ser Arg Ser Phe Ser Arg Ser Arg Ser Arg Ser Arg Ser
145                 150                 155                 160

Asn Glu Arg Lys

<210> SEQ ID NO 28
<211> LENGTH: 825
<212> TYPE: PRT
<213> ORGANISM: homo sapiens

<400> SEQUENCE: 28

Met Ser Ser Ser Pro Val Asn Val Lys Lys Leu Lys Val Ser Glu Leu
1               5                   10                  15

Lys Glu Glu Leu Lys Lys Arg Arg Leu Ser Asp Lys Gly Leu Lys Ala
            20                  25                  30

Glu Leu Met Glu Arg Leu Gln Ala Ala Leu Asp Asp Glu Glu Ala Gly
        35                  40                  45

Gly Arg Pro Ala Met Glu Pro Gly Asn Gly Ser Leu Asp Leu Gly Gly
    50                  55                  60

Asp Ser Ala Gly Arg Ser Gly Ala Gly Leu Glu Gln Glu Ala Ala Ala
65                  70                  75                  80

Gly Gly Asp Glu Glu Glu Glu Glu Glu Glu Glu Glu Glu Glu Gly Ile
                85                  90                  95

Ser Ala Leu Asp Gly Asp Gln Met Glu Leu Gly Glu Glu Asn Gly Ala
            100                 105                 110

Ala Gly Ala Ala Asp Ser Gly Pro Met Glu Glu Glu Ala Ala Ser
        115                 120                 125

Glu Asp Glu Asn Gly Asp Asp Gln Gly Phe Gln Glu Gly Glu Asp Glu
        130                 135                 140
```

-continued

```
Leu Gly Asp Glu Glu Gly Ala Gly Asp Glu Asn Gly His Gly Glu
145                 150                 155                 160

Gln Gln Pro Gln Pro Pro Ala Thr Gln Gln Gln Pro Gln Gln Gln
            165                 170                 175

Arg Gly Ala Ala Lys Glu Ala Ala Gly Lys Ser Ser Gly Pro Thr Ser
            180                 185                 190

Leu Phe Ala Val Thr Val Ala Pro Pro Gly Ala Arg Gln Gly Gln Gln
            195                 200                 205

Gln Ala Gly Gly Lys Lys Lys Ala Glu Gly Gly Gly Gly Gly Arg
    210                 215                 220

Pro Gly Ala Pro Ala Ala Gly Asp Gly Lys Thr Glu Gln Lys Gly Gly
225                 230                 235                 240

Asp Lys Lys Arg Gly Val Lys Arg Pro Arg Glu Asp His Gly Arg Gly
                245                 250                 255

Tyr Phe Glu Tyr Ile Glu Glu Asn Lys Tyr Ser Arg Ala Lys Ser Pro
                260                 265                 270

Gln Pro Pro Val Glu Glu Glu Asp Glu His Phe Asp Asp Thr Val Val
            275                 280                 285

Cys Leu Asp Thr Tyr Asn Cys Asp Leu His Phe Lys Ile Ser Arg Asp
            290                 295                 300

Arg Leu Ser Ala Ser Ser Leu Thr Met Glu Ser Phe Ala Phe Leu Trp
305                 310                 315                 320

Ala Gly Gly Arg Ala Ser Tyr Gly Val Ser Lys Gly Lys Val Cys Phe
                325                 330                 335

Glu Met Lys Val Thr Glu Lys Ile Pro Val Arg His Leu Tyr Thr Lys
                340                 345                 350

Asp Ile Asp Ile His Glu Val Arg Ile Gly Trp Ser Leu Thr Thr Ser
            355                 360                 365

Gly Met Leu Leu Gly Glu Glu Glu Phe Ser Tyr Gly Tyr Ser Leu Lys
370                 375                 380

Gly Ile Lys Thr Cys Asn Cys Glu Thr Glu Asp Tyr Gly Glu Lys Phe
385                 390                 395                 400

Asp Glu Asn Asp Val Ile Thr Cys Phe Ala Asn Phe Glu Ser Asp Glu
                405                 410                 415

Val Glu Leu Ser Tyr Ala Lys Asn Gly Gln Asp Leu Gly Val Ala Phe
                420                 425                 430

Lys Ile Ser Lys Glu Val Leu Ala Gly Arg Pro Leu Phe Pro His Val
            435                 440                 445

Leu Cys His Asn Cys Ala Val Glu Phe Asn Phe Gly Gln Lys Glu Lys
            450                 455                 460

Pro Tyr Phe Pro Ile Pro Glu Glu Tyr Thr Phe Ile Gln Asn Val Pro
465                 470                 475                 480

Leu Glu Asp Arg Val Arg Gly Pro Lys Gly Pro Glu Glu Lys Lys Asp
                485                 490                 495

Cys Glu Val Val Met Met Ile Gly Leu Pro Gly Ala Gly Lys Thr Thr
                500                 505                 510

Trp Val Thr Lys His Ala Ala Glu Asn Pro Gly Lys Tyr Asn Ile Leu
            515                 520                 525

Gly Thr Asn Thr Ile Met Asp Lys Met Met Val Ala Gly Phe Lys Lys
        530                 535                 540

Gln Met Ala Asp Thr Gly Lys Leu Asn Thr Leu Leu Gln Arg Ala Pro
545                 550                 555                 560
```

Gln Cys Leu Gly Lys Phe Ile Glu Ile Ala Arg Lys Lys Arg Asn
                565                 570                 575

Phe Ile Leu Asp Gln Thr Asn Val Ser Ala Ala Ala Gln Arg Arg Lys
            580                 585                 590

Met Cys Leu Phe Ala Gly Phe Gln Arg Lys Ala Val Val Val Cys Pro
            595                 600                 605

Lys Asp Glu Asp Tyr Lys Gln Arg Thr Gln Lys Lys Ala Glu Val Glu
            610                 615                 620

Gly Lys Asp Leu Pro Glu His Ala Val Leu Lys Met Lys Gly Asn Phe
625                 630                 635                 640

Thr Leu Pro Glu Val Ala Glu Cys Phe Asp Glu Ile Thr Tyr Val Glu
                645                 650                 655

Leu Gln Lys Glu Glu Ala Gln Lys Leu Leu Glu Gln Tyr Lys Glu Glu
                660                 665                 670

Ser Lys Lys Ala Leu Pro Pro Glu Lys Lys Gln Asn Thr Gly Ser Lys
            675                 680                 685

Lys Ser Asn Lys Asn Lys Ser Gly Lys Asn Gln Phe Asn Arg Gly Gly
            690                 695                 700

Gly His Arg Gly Arg Gly Gly Phe Asn Met Arg Gly Gly Asn Phe Arg
705                 710                 715                 720

Gly Gly Ala Pro Gly Asn Arg Gly Gly Tyr Asn Arg Arg Gly Asn Met
                725                 730                 735

Pro Gln Arg Gly Gly Gly Gly Ser Gly Gly Ile Gly Tyr Pro
            740                 745                 750

Tyr Pro Arg Ala Pro Val Phe Pro Gly Arg Gly Ser Tyr Ser Asn Arg
            755                 760                 765

Gly Asn Tyr Asn Arg Gly Gly Met Pro Asn Arg Gly Asn Tyr Asn Gln
770                 775                 780

Asn Phe Arg Gly Arg Gly Asn Asn Arg Gly Tyr Lys Asn Gln Ser Gln
785                 790                 795                 800

Gly Tyr Asn Gln Trp Gln Gln Gly Gln Phe Trp Gly Gln Lys Pro Trp
                805                 810                 815

Ser Gln His Tyr His Gln Gly Tyr Tyr
            820                 825

<210> SEQ ID NO 29
<211> LENGTH: 199
<212> TYPE: PRT
<213> ORGANISM: homo sapiens

<400> SEQUENCE: 29

Met Ser Ser Gly Asn Ala Lys Ile Gly His Pro Ala Pro Asn Phe Lys
1               5                   10                  15

Ala Thr Ala Val Met Pro Asp Gly Gln Phe Lys Asp Ile Ser Leu Ser
            20                  25                  30

Asp Tyr Lys Gly Lys Tyr Val Val Phe Phe Phe Tyr Pro Leu Asp Phe
            35                  40                  45

Thr Phe Val Cys Pro Thr Glu Ile Ile Ala Phe Ser Asp Arg Ala Glu
        50                  55                  60

Glu Phe Lys Lys Leu Asn Cys Gln Val Ile Gly Ala Ser Val Asp Ser
65                  70                  75                  80

His Phe Cys His Leu Ala Trp Val Asn Thr Pro Lys Lys Gln Gly Gly
                85                  90                  95

Leu Gly Pro Met Asn Ile Pro Leu Val Ser Asp Pro Lys Arg Thr Ile
            100                 105                 110

Ala Gln Asp Tyr Gly Val Leu Lys Ala Asp Glu Gly Ile Ser Phe Arg
            115                 120                 125

Gly Leu Phe Ile Ile Asp Asp Lys Gly Ile Leu Arg Gln Ile Thr Val
        130                 135                 140

Asn Asp Leu Pro Val Gly Arg Ser Val Asp Glu Thr Leu Arg Leu Val
145                 150                 155                 160

Gln Ala Phe Gln Phe Thr Asp Lys His Gly Glu Val Cys Pro Ala Gly
                165                 170                 175

Trp Lys Pro Gly Ser Asp Thr Ile Lys Pro Asp Val Gln Lys Ser Lys
            180                 185                 190

Glu Tyr Phe Ser Lys Gln Lys
            195

<210> SEQ ID NO 30
<211> LENGTH: 2813
<212> TYPE: PRT
<213> ORGANISM: homo sapiens

<400> SEQUENCE: 30

Met Lys Leu Asn Pro Gln Gln Ala Pro Leu Tyr Gly Asp Cys Val Val
1               5                   10                  15

Thr Val Leu Leu Ala Glu Glu Asp Lys Ala Glu Asp Val Val Phe
            20                  25                  30

Tyr Leu Val Phe Leu Gly Ser Thr Leu Arg His Cys Thr Ser Thr Arg
        35                  40                  45

Lys Val Ser Ser Asp Thr Leu Glu Thr Ile Ala Pro Gly His Asp Cys
50                  55                  60

Cys Glu Thr Val Lys Val Gln Leu Cys Ala Ser Lys Glu Gly Leu Pro
65                  70                  75                  80

Val Phe Val Val Ala Glu Asp Phe His Phe Val Gln Asp Glu Ala
                85                  90                  95

Tyr Asp Ala Ala Gln Phe Leu Ala Thr Ser Ala Gly Asn Gln Gln Ala
            100                 105                 110

Leu Asn Phe Thr Arg Phe Leu Asp Gln Ser Gly Pro Pro Ser Gly Asp
            115                 120                 125

Val Asn Ser Leu Asp Lys Lys Leu Val Leu Ala Phe Arg His Leu Lys
        130                 135                 140

Leu Pro Thr Glu Trp Asn Val Leu Gly Thr Asp Gln Ser Leu His Asp
145                 150                 155                 160

Ala Gly Pro Arg Glu Thr Leu Met His Phe Ala Val Arg Leu Gly Leu
                165                 170                 175

Leu Arg Leu Thr Trp Phe Leu Leu Gln Lys Pro Gly Gly Arg Gly Ala
            180                 185                 190

Leu Ser Ile His Asn Gln Glu Gly Ala Thr Pro Val Ser Leu Ala Leu
        195                 200                 205

Glu Arg Gly Tyr His Lys Leu His Gln Leu Leu Thr Glu Glu Asn Ala
    210                 215                 220

Gly Glu Pro Asp Ser Trp Ser Ser Leu Ser Tyr Glu Ile Pro Tyr Gly
225                 230                 235                 240

Asp Cys Ser Val Arg His His Arg Glu Leu Asp Ile Tyr Thr Leu Thr
                245                 250                 255

Ser Glu Ser Asp Ser His His Glu His Pro Phe Pro Gly Asp Gly Cys
            260                 265                 270

Thr Gly Pro Ile Phe Lys Leu Met Asn Ile Gln Gln Gln Leu Met Lys

-continued

```
                275                 280                 285
Thr Asn Leu Lys Gln Met Asp Ser Leu Met Pro Leu Met Met Thr Ala
290                 295                 300
Gln Asp Pro Ser Ser Ala Pro Glu Thr Asp Gly Gln Phe Leu Pro Cys
305                 310                 315                 320
Ala Pro Glu Pro Thr Asp Pro Gln Arg Leu Ser Ser Ser Glu Glu Thr
                325                 330                 335
Glu Ser Thr Gln Cys Cys Pro Gly Ser Pro Val Ala Gln Thr Glu Ser
                340                 345                 350
Pro Cys Asp Leu Ser Ser Ile Val Glu Glu Asn Thr Asp Arg Ser
                355                 360                 365
Cys Arg Lys Lys Asn Lys Gly Val Glu Arg Lys Gly Glu Glu Val Glu
370                 375                 380
Pro Ala Pro Ile Val Asp Ser Gly Thr Val Ser Asp Gln Asp Ser Cys
385                 390                 395                 400
Leu Gln Ser Leu Pro Asp Cys Gly Val Lys Gly Thr Glu Gly Leu Ser
                405                 410                 415
Ser Cys Gly Asn Arg Asn Glu Glu Thr Gly Thr Lys Ser Ser Gly Met
                420                 425                 430
Pro Thr Asp Gln Glu Ser Leu Ser Ser Gly Asp Ala Val Leu Gln Arg
                435                 440                 445
Asp Leu Val Met Glu Pro Gly Thr Ala Gln Tyr Ser Ser Gly Gly Glu
450                 455                 460
Leu Gly Gly Ile Ser Thr Thr Asn Val Ser Thr Pro Asp Thr Ala Gly
465                 470                 475                 480
Glu Met Glu His Gly Leu Met Asn Pro Asp Ala Thr Val Trp Lys Asn
                485                 490                 495
Val Leu Gln Gly Gly Glu Ser Thr Lys Glu Arg Phe Glu Asn Ser Asn
                500                 505                 510
Ile Gly Thr Ala Gly Ala Ser Asp Val His Val Thr Ser Lys Pro Val
                515                 520                 525
Asp Lys Ile Ser Val Pro Asn Cys Ala Pro Ala Ala Ser Ser Leu Asp
530                 535                 540
Gly Asn Lys Pro Ala Glu Ser Ser Leu Ala Phe Ser Asn Glu Glu Thr
545                 550                 555                 560
Ser Thr Glu Lys Thr Ala Glu Thr Glu Thr Ser Arg Ser Arg Glu Glu
                565                 570                 575
Ser Ala Asp Ala Pro Val Asp Gln Asn Ser Val Val Ile Pro Ala Ala
                580                 585                 590
Ala Lys Asp Lys Ile Ser Asp Gly Leu Glu Pro Tyr Thr Leu Leu Ala
                595                 600                 605
Ala Gly Ile Gly Glu Ala Met Ser Pro Ser Asp Leu Ala Leu Leu Gly
                610                 615                 620
Leu Glu Glu Asp Val Met Pro His Gln Asn Ser Glu Thr Asn Ser Ser
625                 630                 635                 640
His Ala Gln Ser Gln Lys Gly Lys Ser Ser Pro Ile Cys Ser Thr Thr
                645                 650                 655
Gly Asp Asp Lys Leu Cys Ala Ser Ala Cys Gln Gln Asn Thr Val
                660                 665                 670
Thr Ser Ser Gly Asp Leu Val Ala Lys Leu Cys Asp Asn Ile Val Ser
                675                 680                 685
Glu Ser Glu Ser Thr Thr Ala Arg Gln Pro Ser Ser Gln Asp Pro Pro
690                 695                 700
```

-continued

```
Asp Ala Ser His Cys Glu Asp Pro Gln Ala His Thr Val Thr Ser Asp
705                 710                 715                 720

Pro Val Arg Asp Thr Gln Glu Arg Ala Asp Phe Cys Pro Phe Lys Val
            725                 730                 735

Val Asp Asn Lys Gly Gln Arg Lys Asp Val Lys Leu Asp Lys Pro Leu
        740                 745                 750

Thr Asn Met Leu Glu Val Val Ser His Pro His Pro Val Val Pro Lys
    755                 760                 765

Met Glu Lys Glu Leu Val Pro Asp Gln Ala Val Ile Ser Asp Ser Thr
770                 775                 780

Phe Ser Leu Ala Asn Ser Pro Gly Ser Glu Ser Val Thr Lys Asp Asp
785                 790                 795                 800

Ala Leu Ser Phe Val Pro Ser Gln Lys Glu Lys Gly Thr Ala Thr Pro
                805                 810                 815

Glu Leu His Thr Ala Thr Asp Tyr Arg Asp Gly Pro Asp Gly Asn Ser
            820                 825                 830

Asn Glu Pro Asp Thr Arg Pro Leu Glu Asp Arg Ala Val Gly Leu Ser
        835                 840                 845

Thr Ser Ser Thr Ala Ala Glu Leu Gln His Gly Met Gly Asn Thr Ser
    850                 855                 860

Leu Thr Gly Leu Gly Gly Glu His Glu Gly Pro Ala Pro Ala Ile
865                 870                 875                 880

Pro Glu Ala Leu Asn Ile Lys Gly Asn Thr Asp Ser Ser Leu Gln Ser
                885                 890                 895

Val Gly Lys Ala Thr Leu Ala Leu Asp Ser Val Leu Thr Glu Glu Gly
            900                 905                 910

Lys Leu Leu Val Val Ser Glu Ser Ser Ala Ala Gln Glu Gln Asp Lys
        915                 920                 925

Asp Lys Ala Val Thr Cys Ser Ser Ile Lys Glu Asn Ala Leu Ser Ser
    930                 935                 940

Gly Thr Leu Gln Glu Glu Gln Arg Thr Pro Pro Gly Gln Asp Thr
945                 950                 955                 960

Gln Gln Phe His Glu Lys Ser Ile Ser Ala Asp Cys Ala Lys Asp Lys
                965                 970                 975

Ala Leu Gln Leu Ser Asn Ser Pro Gly Ala Ser Ala Phe Leu Lys
            980                 985                 990

Ala Glu Thr Glu His Asn Lys Glu Val Ala Pro Gln Val Ser Leu Leu
        995                 1000                1005

Thr Gln Gly Gly Ala Ala Gln Ser Leu Val Pro Pro Gly Ala Ser
    1010                1015                1020

Leu Ala Thr Glu Ser Arg Gln Glu Ala Leu Gly Ala Glu His Asn
    1025                1030                1035

Ser Ser Ala Leu Leu Pro Cys Leu Leu Pro Asp Gly Ser Asp Gly
    1040                1045                1050

Ser Asp Ala Leu Asn Cys Ser Gln Pro Ser Pro Leu Asp Val Gly
    1055                1060                1065

Val Lys Asn Thr Gln Ser Gln Gly Lys Thr Ser Ala Cys Glu Val
    1070                1075                1080

Ser Gly Asp Val Thr Val Asp Val Thr Gly Val Asn Ala Leu Gln
    1085                1090                1095

Gly Met Ala Glu Pro Arg Arg Glu Asn Ile Ser His Asn Thr Gln
    1100                1105                1110
```

-continued

```
Asp Ile Leu Ile Pro Asn Val Leu Leu Ser Gln Glu Lys Asn Ala
    1115                1120                1125

Val Leu Gly Leu Pro Val Ala Leu Gln Asp Lys Ala Val Thr Asp
    1130                1135                1140

Pro Gln Gly Val Gly Thr Pro Glu Met Ile Pro Leu Asp Trp Glu
    1145                1150                1155

Lys Gly Lys Leu Glu Gly Ala Asp His Ser Cys Thr Met Gly Asp
    1160                1165                1170

Ala Glu Glu Ala Gln Ile Asp Asp Glu Ala His Pro Val Leu Leu
    1175                1180                1185

Gln Pro Val Ala Lys Glu Leu Pro Thr Asp Met Glu Leu Ser Ala
    1190                1195                1200

His Asp Asp Gly Ala Pro Ala Gly Val Arg Glu Val Met Arg Ala
    1205                1210                1215

Pro Pro Ser Gly Arg Glu Arg Ser Thr Pro Ser Leu Pro Cys Met
    1220                1225                1230

Val Ser Ala Gln Asp Ala Pro Leu Pro Lys Gly Ala Asp Leu Ile
    1235                1240                1245

Glu Glu Ala Ala Ser Arg Ile Val Asp Ala Val Ile Glu Gln Val
    1250                1255                1260

Lys Ala Ala Gly Ala Leu Leu Thr Glu Gly Glu Ala Cys His Met
    1265                1270                1275

Ser Leu Ser Ser Pro Glu Leu Gly Pro Leu Thr Lys Gly Leu Glu
    1280                1285                1290

Ser Ala Phe Thr Glu Lys Val Ser Thr Phe Pro Pro Gly Glu Ser
    1295                1300                1305

Leu Pro Met Gly Ser Thr Pro Glu Glu Ala Thr Gly Ser Leu Ala
    1310                1315                1320

Gly Cys Phe Ala Gly Arg Glu Glu Pro Glu Lys Ile Ile Leu Pro
    1325                1330                1335

Val Gln Gly Pro Glu Pro Ala Ala Glu Met Pro Asp Val Lys Ala
    1340                1345                1350

Glu Asp Glu Val Asp Phe Arg Ala Ser Ser Ile Ser Glu Glu Val
    1355                1360                1365

Ala Val Gly Ser Ile Ala Ala Thr Leu Lys Met Lys Gln Gly Pro
    1370                1375                1380

Met Thr Gln Ala Ile Asn Arg Glu Asn Trp Cys Thr Ile Glu Pro
    1385                1390                1395

Cys Pro Asp Ala Ala Ser Leu Leu Ala Ser Lys Gln Ser Pro Glu
    1400                1405                1410

Cys Glu Asn Phe Leu Asp Val Gly Leu Gly Arg Glu Cys Thr Ser
    1415                1420                1425

Lys Gln Gly Val Leu Lys Arg Glu Ser Gly Ser Asp Ser Asp Leu
    1430                1435                1440

Phe His Ser Pro Ser Asp Asp Met Asp Ser Ile Ile Phe Pro Lys
    1445                1450                1455

Pro Glu Glu Glu His Leu Ala Cys Asp Ile Thr Gly Ser Ser Ser
    1460                1465                1470

Ser Thr Asp Asp Thr Ala Ser Leu Asp Arg His Ser Ser His Gly
    1475                1480                1485

Ser Asp Val Ser Leu Ser Gln Ile Leu Lys Pro Asn Arg Ser Arg
    1490                1495                1500

Asp Arg Gln Ser Leu Asp Gly Phe Tyr Ser His Gly Met Gly Ala
```

```
                1505                1510                1515

Glu Gly Arg Glu Ser Glu Ser Glu Pro Ala Asp Pro Gly Asp Val
    1520                1525                1530

Glu Glu Glu Glu Met Asp Ser Ile Thr Glu Val Pro Ala Asn Cys
    1535                1540                1545

Ser Val Leu Arg Ser Ser Met Arg Ser Leu Ser Pro Phe Arg Arg
    1550                1555                1560

His Ser Trp Gly Pro Gly Lys Asn Ala Ala Ser Asp Ala Glu Met
    1565                1570                1575

Asn His Arg Ser Ser Met Arg Val Leu Gly Asp Val Val Arg Arg
    1580                1585                1590

Pro Pro Ile His Arg Arg Ser Phe Ser Leu Glu Gly Leu Thr Gly
    1595                1600                1605

Gly Ala Gly Val Gly Asn Lys Pro Ser Ser Ser Leu Glu Val Ser
    1610                1615                1620

Ser Ala Asn Ala Glu Glu Leu Arg His Pro Phe Ser Gly Glu Glu
    1625                1630                1635

Arg Val Asp Ser Leu Val Ser Leu Ser Glu Glu Asp Leu Glu Ser
    1640                1645                1650

Asp Gln Arg Glu His Arg Met Phe Asp Gln Gln Ile Cys His Arg
    1655                1660                1665

Ser Lys Gln Gln Gly Phe Asn Tyr Cys Thr Ser Ala Ile Ser Ser
    1670                1675                1680

Pro Leu Thr Lys Ser Ile Ser Leu Met Thr Ile Ser His Pro Gly
    1685                1690                1695

Leu Asp Asn Ser Arg Pro Phe His Ser Thr Phe His Asn Thr Ser
    1700                1705                1710

Ala Asn Leu Thr Glu Ser Ile Thr Glu Glu Asn Tyr Asn Phe Leu
    1715                1720                1725

Pro His Ser Pro Ser Lys Lys Asp Ser Glu Trp Lys Ser Gly Thr
    1730                1735                1740

Lys Val Ser Arg Thr Phe Ser Tyr Ile Lys Asn Lys Met Ser Ser
    1745                1750                1755

Ser Lys Lys Ser Lys Glu Lys Glu Lys Glu Lys Asp Lys Ile Lys
    1760                1765                1770

Glu Lys Glu Lys Asp Ser Lys Asp Lys Glu Lys Asp Lys Lys Thr
    1775                1780                1785

Val Asn Gly His Thr Phe Ser Ser Ile Pro Val Val Gly Pro Ile
    1790                1795                1800

Ser Cys Ser Gln Cys Met Lys Pro Phe Thr Asn Lys Asp Ala Tyr
    1805                1810                1815

Thr Cys Ala Asn Cys Ser Ala Phe Val His Lys Gly Cys Arg Glu
    1820                1825                1830

Ser Leu Ala Ser Cys Ala Lys Val Lys Met Lys Gln Pro Lys Gly
    1835                1840                1845

Ser Leu Gln Ala His Asp Thr Ser Ser Leu Pro Thr Val Ile Met
    1850                1855                1860

Arg Asn Lys Pro Ser Gln Pro Lys Glu Arg Pro Arg Ser Ala Val
    1865                1870                1875

Leu Leu Val Asp Glu Thr Ala Thr Thr Pro Ile Phe Ala Asn Arg
    1880                1885                1890

Arg Ser Gln Gln Ser Val Ser Leu Ser Lys Ser Val Ser Ile Gln
    1895                1900                1905
```

```
Asn Ile Thr Gly Val Gly Asn Asp Glu Asn Met Ser Asn Thr Trp
1910            1915                1920

Lys Phe Leu Ser His Ser Thr Asp Ser Leu Asn Lys Ile Ser Lys
1925            1930                1935

Val Asn Glu Ser Thr Glu Ser Leu Thr Asp Glu Gly Val Gly Thr
1940            1945                1950

Asp Met Asn Glu Gly Gln Leu Leu Gly Asp Phe Glu Ile Glu Ser
1955            1960                1965

Lys Gln Leu Glu Ala Glu Ser Trp Ser Arg Ile Ile Asp Ser Lys
1970            1975                1980

Phe Leu Lys Gln Gln Lys Lys Asp Val Val Lys Arg Gln Glu Val
1985            1990                1995

Ile Tyr Glu Leu Met Gln Thr Glu Phe His His Val Arg Thr Leu
2000            2005                2010

Lys Ile Met Ser Gly Val Tyr Ser Gln Gly Met Met Ala Asp Leu
2015            2020                2025

Leu Phe Glu Gln Gln Met Val Glu Lys Leu Phe Pro Cys Leu Asp
2030            2035                2040

Glu Leu Ile Ser Ile His Ser Gln Phe Phe Gln Arg Ile Leu Glu
2045            2050                2055

Arg Lys Lys Glu Ser Leu Val Asp Lys Ser Glu Lys Asn Phe Leu
2060            2065                2070

Ile Lys Arg Ile Gly Asp Val Leu Val Asn Gln Phe Ser Gly Glu
2075            2080                2085

Asn Ala Glu Arg Leu Lys Lys Thr Tyr Gly Lys Phe Cys Gly Gln
2090            2095                2100

His Asn Gln Ser Val Asn Tyr Phe Lys Asp Leu Tyr Ala Lys Asp
2105            2110                2115

Lys Arg Phe Gln Ala Phe Val Lys Lys Lys Met Ser Ser Ser Val
2120            2125                2130

Val Arg Arg Leu Gly Ile Pro Glu Cys Ile Leu Leu Val Thr Gln
2135            2140                2145

Arg Ile Thr Lys Tyr Pro Val Leu Phe Gln Arg Ile Leu Gln Cys
2150            2155                2160

Thr Lys Asp Asn Glu Val Glu Gln Glu Asp Leu Ala Gln Ser Leu
2165            2170                2175

Ser Leu Val Lys Asp Val Ile Gly Ala Val Asp Ser Lys Val Ala
2180            2185                2190

Ser Tyr Glu Lys Lys Val Arg Leu Asn Glu Ile Tyr Thr Lys Thr
2195            2200                2205

Asp Ser Lys Ser Ile Met Arg Met Lys Ser Gly Gln Met Phe Ala
2210            2215                2220

Lys Glu Asp Leu Lys Arg Lys Lys Leu Val Arg Asp Gly Ser Val
2225            2230                2235

Phe Leu Lys Asn Ala Ala Gly Arg Leu Lys Glu Val Gln Ala Val
2240            2245                2250

Leu Leu Thr Asp Ile Leu Val Phe Leu Gln Glu Lys Asp Gln Lys
2255            2260                2265

Tyr Ile Phe Ala Ser Leu Asp Gln Lys Ser Thr Val Ile Ser Leu
2270            2275                2280

Lys Lys Leu Ile Val Arg Glu Val Ala His Glu Glu Lys Gly Leu
2285            2290                2295
```

```
Phe Leu Ile Ser Met Gly Met Thr Asp Pro Glu Met Val Glu Val
    2300            2305            2310

His Ala Ser Ser Lys Glu Glu Arg Asn Ser Trp Ile Gln Ile Ile
    2315            2320            2325

Gln Asp Thr Ile Asn Thr Leu Asn Arg Asp Glu Asp Glu Gly Ile
    2330            2335            2340

Pro Ser Glu Asn Glu Glu Glu Lys Lys Met Leu Asp Thr Arg Ala
    2345            2350            2355

Arg Glu Leu Lys Glu Gln Leu His Gln Lys Asp Gln Lys Ile Leu
    2360            2365            2370

Leu Leu Leu Glu Glu Lys Glu Met Ile Phe Arg Asp Met Ala Glu
    2375            2380            2385

Cys Ser Thr Pro Leu Pro Glu Asp Cys Ser Pro Thr His Ser Pro
    2390            2395            2400

Arg Val Leu Phe Arg Ser Asn Thr Glu Glu Ala Leu Lys Gly Gly
    2405            2410            2415

Pro Leu Met Lys Ser Ala Ile Asn Glu Val Glu Ile Leu Gln Gly
    2420            2425            2430

Leu Val Ser Gly Asn Leu Gly Gly Thr Leu Gly Pro Thr Val Ser
    2435            2440            2445

Ser Pro Ile Glu Gln Asp Val Val Gly Pro Val Ser Leu Pro Arg
    2450            2455            2460

Arg Ala Glu Thr Phe Gly Gly Phe Asp Ser His Gln Met Asn Ala
    2465            2470            2475

Ser Lys Gly Gly Glu Lys Glu Glu Gly Asp Asp Gly Gln Asp Leu
    2480            2485            2490

Arg Arg Thr Glu Ser Asp Ser Gly Leu Lys Lys Gly Gly Asn Ala
    2495            2500            2505

Asn Leu Val Phe Met Leu Lys Arg Asn Ser Glu Gln Val Val Gln
    2510            2515            2520

Ser Val Val His Leu Tyr Glu Leu Leu Ser Ala Leu Gln Gly Val
    2525            2530            2535

Val Leu Gln Gln Asp Ser Tyr Ile Glu Asp Gln Lys Leu Val Leu
    2540            2545            2550

Ser Glu Arg Ala Leu Thr Arg Ser Leu Ser Arg Pro Ser Ser Leu
    2555            2560            2565

Ile Glu Gln Glu Lys Gln Arg Ser Leu Glu Lys Gln Arg Gln Asp
    2570            2575            2580

Leu Ala Asn Leu Gln Lys Gln Gln Ala Gln Tyr Leu Glu Glu Lys
    2585            2590            2595

Arg Arg Arg Glu Arg Glu Trp Glu Ala Arg Glu Arg Glu Leu Arg
    2600            2605            2610

Glu Arg Glu Ala Leu Leu Ala Gln Arg Glu Glu Val Gln Gln
    2615            2620            2625

Gly Gln Gln Asp Leu Glu Lys Glu Arg Glu Glu Leu Gln Gln Lys
    2630            2635            2640

Lys Gly Thr Tyr Gln Tyr Asp Leu Glu Arg Leu Arg Ala Ala Gln
    2645            2650            2655

Lys Gln Leu Glu Arg Glu Gln Glu Gln Leu Arg Arg Glu Ala Glu
    2660            2665            2670

Arg Leu Ser Gln Arg Gln Thr Glu Arg Asp Leu Cys Gln Val Ser
    2675            2680            2685

His Pro His Thr Lys Leu Met Arg Ile Pro Ser Phe Phe Pro Ser
```

-continued

```
                  2690                2695                2700

Pro Glu Glu Pro Pro Ser Pro Ser Ala Pro Ser Ile Ala Lys Ser
    2705                2710                2715

Gly Ser Leu Asp Ser Glu Leu Ser Val Ser Pro Lys Arg Asn Ser
    2720                2725                2730

Ile Ser Arg Thr His Lys Asp Lys Gly Pro Phe His Ile Leu Ser
    2735                2740                2745

Ser Thr Ser Gln Thr Asn Lys Gly Pro Glu Gly Gln Ser Gln Ala
    2750                2755                2760

Pro Ala Ser Thr Ser Ala Ser Thr Arg Leu Phe Gly Leu Thr Lys
    2765                2770                2775

Pro Lys Glu Lys Lys Glu Lys Lys Lys Asn Lys Thr Ser Arg
    2780                2785                2790

Ser Gln Pro Gly Asp Gly Pro Ala Ser Glu Val Ser Ala Glu Gly
    2795                2800                2805

Glu Glu Ile Phe Cys
    2810

<210> SEQ ID NO 31
<211> LENGTH: 356
<212> TYPE: PRT
<213> ORGANISM: homo sapiens

<400> SEQUENCE: 31

Met Asp Ala Gly Val Thr Glu Ser Gly Leu Asn Val Thr Leu Thr Ile
1               5                   10                  15

Arg Leu Leu Met His Gly Lys Glu Val Gly Ser Ile Ile Gly Lys Lys
            20                  25                  30

Gly Glu Ser Val Lys Arg Ile Arg Glu Glu Ser Gly Ala Arg Ile Asn
        35                  40                  45

Ile Ser Glu Gly Asn Cys Pro Glu Arg Ile Ile Thr Leu Thr Gly Pro
    50                  55                  60

Thr Asn Ala Ile Phe Lys Ala Phe Ala Met Ile Ile Asp Lys Leu Glu
65                  70                  75                  80

Glu Asp Ile Asn Ser Ser Met Thr Asn Ser Thr Ala Ala Ser Arg Pro
                85                  90                  95

Pro Val Thr Leu Arg Leu Val Val Pro Ala Thr Gln Cys Gly Ser Leu
            100                 105                 110

Ile Gly Lys Gly Gly Cys Lys Ile Lys Glu Ile Arg Glu Ser Thr Gly
        115                 120                 125

Ala Gln Val Gln Val Ala Gly Asp Met Leu Pro Asn Ser Thr Glu Arg
    130                 135                 140

Ala Ile Thr Ile Ala Gly Val Pro Gln Ser Val Thr Glu Cys Val Lys
145                 150                 155                 160

Gln Ile Cys Leu Val Met Leu Glu Thr Leu Ser Gln Ser Pro Gln Gly
                165                 170                 175

Arg Val Met Thr Ile Pro Tyr Gln Pro Met Pro Ala Ser Ser Pro Val
            180                 185                 190

Ile Cys Ala Gly Gly Gln Asp Arg Cys Ser Asp Ala Ala Gly Tyr Pro
        195                 200                 205

His Ala Thr His Asp Leu Glu Gly Pro Pro Leu Asp Ala Tyr Ser Ile
    210                 215                 220

Gln Gly Gln His Thr Ile Ser Pro Leu Asp Leu Ala Lys Leu Asn Gln
225                 230                 235                 240
```

```
Val Ala Arg Gln Gln Ser His Phe Ala Met Met His Gly Gly Thr Gly
                245                 250                 255

Phe Ala Gly Ile Asp Ser Ser Ser Pro Glu Val Lys Gly Tyr Trp Ala
            260                 265                 270

Ser Leu Asp Ala Ser Thr Gln Thr Thr His Glu Leu Thr Ile Pro Asn
        275                 280                 285

Asn Leu Ile Gly Cys Ile Ile Gly Arg Gln Gly Ala Asn Ile Asn Glu
    290                 295                 300

Ile Arg Gln Met Ser Gly Ala Gln Ile Lys Ile Ala Asn Pro Val Glu
305                 310                 315                 320

Gly Ser Ser Gly Arg Gln Val Thr Ile Thr Gly Ser Ala Ala Ser Ile
                325                 330                 335

Ser Leu Ala Gln Tyr Leu Ile Asn Ala Arg Leu Ser Ser Glu Lys Gly
                340                 345                 350

Met Gly Cys Ser
            355

<210> SEQ ID NO 32
<211> LENGTH: 270
<212> TYPE: PRT
<213> ORGANISM: homo sapiens

<400> SEQUENCE: 32

Pro Trp Ser Glu Cys Ser Ala Thr Cys Ala Gly Gly Val Gln Arg Gln
1               5                   10                  15

Glu Val Val Cys Lys Arg Leu Asp Asp Asn Ser Ile Val Gln Asn Asn
                20                  25                  30

Tyr Cys Asp Pro Asp Ser Lys Pro Pro Glu Asn Gln Arg Ala Cys Asn
            35                  40                  45

Thr Glu Pro Cys Pro Pro Glu Trp Phe Ile Gly Asp Trp Leu Glu Cys
        50                  55                  60

Ser Lys Thr Cys Asp Gly Gly Met Arg Thr Arg Ala Val Leu Cys Ile
65                  70                  75                  80

Arg Lys Ile Gly Pro Ser Glu Glu Thr Leu Asp Tyr Ser Gly Cys
                85                  90                  95

Leu Thr His Arg Pro Val Glu Lys Glu Pro Cys Asn Asn Gln Ser Cys
                100                 105                 110

Pro Pro Gln Trp Val Ala Leu Asp Trp Ser Glu Cys Thr Pro Lys Cys
            115                 120                 125

Gly Pro Gly Phe Lys His Arg Ile Val Leu Cys Lys Ser Ser Asp Leu
        130                 135                 140

Ser Lys Thr Phe Pro Ala Ala Gln Cys Pro Glu Glu Ser Lys Pro Pro
145                 150                 155                 160

Val Arg Ile Arg Cys Ser Leu Gly Arg Cys Pro Pro Arg Trp Val
                165                 170                 175

Thr Gly Asp Trp Gly Gln Cys Ser Ala Gln Cys Gly Leu Gly Gln Gln
            180                 185                 190

Met Arg Thr Val Gln Cys Leu Ser Tyr Thr Gly Gln Ala Ser Ser Asp
        195                 200                 205

Cys Leu Glu Thr Val Arg Pro Pro Ser Met Gln Gln Cys Glu Ser Lys
    210                 215                 220

Cys Asp Ser Thr Pro Ile Ser Asn Thr Glu Glu Cys Lys Asp Val Asn
225                 230                 235                 240

Lys Val Ala Tyr Cys Pro Leu Val Leu Lys Phe Lys Phe Cys Ser Arg
                245                 250                 255
```

Ala Tyr Phe Arg Gln Met Cys Cys Lys Thr Cys Gln Gly His
         260                 265                 270

<210> SEQ ID NO 33
<211> LENGTH: 1560
<212> TYPE: PRT
<213> ORGANISM: homo sapiens

<400> SEQUENCE: 33

Met Gln Pro Gly Ser Ala Pro Pro Gly Arg Met Asp Pro Ser Ala
1               5                   10                  15

Pro Gln Pro Arg Ala Glu Thr Ser Gly Lys Asp Ile Trp His Pro Gly
            20                  25                  30

Glu Arg Cys Leu Ala Pro Ser Pro Asp Asn Gly Lys Leu Cys Glu Ala
            35                  40                  45

Ser Ile Lys Ser Ile Thr Val Asp Glu Asn Gly Lys Ser Phe Ala Val
        50                  55                  60

Val Leu Tyr Ala Asp Phe Gln Glu Arg Lys Ile Pro Leu Lys Gln Leu
65              70                  75                  80

Gln Glu Val Lys Phe Val Lys Asp Cys Pro Arg Asn Leu Ile Phe Asp
                85                  90                  95

Asp Glu Asp Leu Glu Lys Pro Tyr Phe Pro Asn Arg Lys Phe Pro Ser
            100                 105                 110

Ser Ser Val Ala Phe Lys Leu Ser Asp Asn Gly Asp Ser Ile Pro Tyr
        115                 120                 125

Thr Ile Asn Arg Tyr Leu Arg Asp Tyr Gln Arg Glu Gly Thr Arg Phe
130             135                 140

Leu Tyr Gly His Tyr Ile His Gly Gly Cys Ile Leu Gly Asp Asp
145             150                 155                 160

Met Gly Leu Gly Lys Thr Val Gln Val Ile Ser Phe Leu Ala Ala Val
                165                 170                 175

Leu His Lys Lys Gly Thr Arg Glu Asp Ile Glu Asn Asn Met Pro Glu
            180                 185                 190

Phe Leu Leu Arg Ser Met Lys Lys Glu Pro Leu Ser Ser Thr Ala Lys
        195                 200                 205

Lys Met Phe Leu Ile Val Ala Pro Leu Ser Val Leu Tyr Asn Trp Lys
    210                 215                 220

Asp Glu Leu Asp Thr Trp Gly Tyr Phe Arg Val Thr Val Leu His Gly
225                 230                 235                 240

Asn Arg Lys Asp Asn Glu Leu Ile Arg Val Lys Gln Arg Lys Cys Glu
                245                 250                 255

Ile Ala Leu Thr Thr Tyr Glu Thr Leu Arg Leu Cys Leu Asp Glu Leu
            260                 265                 270

Asn Ser Leu Glu Trp Ser Ala Val Ile Val Asp Glu Ala His Arg Ile
        275                 280                 285

Lys Asn Pro Lys Ala Arg Val Thr Glu Val Met Lys Ala Leu Lys Cys
    290                 295                 300

Asn Val Arg Ile Gly Leu Thr Gly Thr Ile Leu Gln Asn Asn Met Lys
305                 310                 315                 320

Glu Leu Trp Cys Val Met Asp Trp Ala Val Pro Gly Leu Leu Gly Ser
                325                 330                 335

Gly Thr Tyr Phe Lys Lys Gln Phe Ser Asp Pro Val Glu His Gly Gln
            340                 345                 350

Arg His Thr Ala Thr Lys Arg Glu Leu Ala Thr Gly Arg Lys Ala Met

```
                355                 360                 365
Gln Arg Leu Ala Lys Lys Met Ser Gly Trp Phe Leu Arg Arg Thr Lys
    370                 375                 380
Thr Leu Ile Lys Asp Gln Leu Pro Lys Lys Glu Asp Arg Met Val Tyr
385                 390                 395                 400
Cys Ser Leu Thr Asp Phe Gln Lys Ala Val Tyr Gln Thr Val Leu Glu
                405                 410                 415
Thr Glu Asp Val Thr Leu Ile Leu Gln Ser Ser Glu Pro Cys Thr Cys
                420                 425                 430
Arg Ser Gly Gln Lys Arg Arg Asn Cys Cys Tyr Lys Thr Asn Ser His
            435                 440                 445
Gly Glu Thr Val Lys Thr Leu Tyr Leu Ser Tyr Leu Thr Val Leu Gln
            450                 455                 460
Lys Val Ala Asn His Val Ala Leu Leu Gln Ala Ala Ser Thr Ser Lys
465                 470                 475                 480
Gln Gln Glu Thr Leu Ile Lys Arg Ile Cys Asp Gln Val Phe Ser Arg
                485                 490                 495
Phe Pro Asp Phe Val Gln Lys Ser Lys Asp Ala Ala Phe Glu Thr Leu
                500                 505                 510
Ser Asp Pro Lys Tyr Ser Gly Lys Met Lys Val Leu Gln Gln Leu Leu
            515                 520                 525
Asn His Cys Arg Lys Asn Arg Asp Lys Val Leu Leu Phe Ser Phe Ser
        530                 535                 540
Thr Lys Leu Leu Asp Val Leu Gln Gln Tyr Cys Met Ala Ser Gly Leu
545                 550                 555                 560
Asp Tyr Arg Arg Leu Asp Gly Ser Thr Lys Ser Glu Glu Arg Leu Lys
                565                 570                 575
Ile Val Lys Glu Phe Asn Ser Thr Gln Asp Val Asn Ile Cys Leu Val
                580                 585                 590
Ser Thr Met Ala Gly Gly Leu Gly Leu Asn Phe Val Gly Ala Asn Val
        595                 600                 605
Val Val Leu Phe Asp Pro Thr Trp Asn Pro Ala Asn Asp Leu Gln Ala
    610                 615                 620
Ile Asp Arg Ala Tyr Arg Ile Gly Gln Cys Arg Asp Val Lys Val Leu
625                 630                 635                 640
Arg Leu Ile Ser Leu Gly Thr Val Glu Glu Ile Met Tyr Leu Arg Gln
                645                 650                 655
Ile Tyr Lys Gln Gln Leu His Cys Val Val Gly Ser Glu Asn Ala
                660                 665                 670
Lys Arg Tyr Phe Glu Ala Val Gln Gly Ser Lys Glu His Gln Gly Glu
            675                 680                 685
Leu Phe Gly Ile His Asn Leu Phe Lys Phe Arg Ser Gln Gly Ser Cys
            690                 695                 700
Leu Thr Lys Asp Ile Leu Glu Arg Glu Gly Gln Val Glu Ala Gly Ile
705                 710                 715                 720
Met Thr Ala Thr Thr Trp Leu Lys Glu Gly Pro Pro Ala His Lys Leu
                725                 730                 735
Glu Met Pro Arg Gln Pro Asp Cys Gln Glu Cys Arg Gly Thr Glu Gln
            740                 745                 750
Ala Ala Glu Pro Leu Ala Lys Glu Ala Cys Asp Leu Cys Ser Asp Phe
            755                 760                 765
Ser Asp Glu Glu Pro Val Gly Ala Thr Gly Ile Lys Thr Ala Lys Asn
        770                 775                 780
```

-continued

```
Lys Ala Pro Asp Ser Ser Lys Ala Ser Ser Pro Gly Gln Leu Thr
785                 790                 795                 800

Leu Leu Gln Cys Gly Phe Ser Lys Leu Leu Glu Thr Lys Cys Lys Ala
            805                 810                 815

Val Glu Asp Ser Asp Gly Asn Thr Ala Ser Asp Glu Ser Ser Asp
            820                 825                 830

Glu Gln Pro Thr Cys Leu Ser Thr Glu Ala Lys Asp Ala Gly Cys Glu
            835                 840                 845

Lys Asn Gln Asp Ser Leu Gly Thr Ser Lys His Gln Lys Leu Asp Asn
850                 855                 860

Ile Leu Asn Pro Lys Glu Lys His Ile Phe Tyr Lys Ser Glu Lys Ile
865                 870                 875                 880

Leu Glu Gln Asn Ile Ser Ser Lys Ser Asp Glu Lys Ile Lys Asn
            885                 890                 895

Thr Asp Lys His Cys Ile Leu Gln Asn Val Thr Glu Ser Glu Asp Ser
            900                 905                 910

Asp Val Ile Cys Pro Thr Gln Tyr Thr Thr Glu Arg Phe Pro Asp Asn
            915                 920                 925

Ser Ile Arg Phe Lys Pro Pro Leu Glu Gly Ser Glu Asp Ser Glu Thr
            930                 935                 940

Glu His Thr Val Lys Thr Arg Asn Asn Asp Asn Ser Arg Asn Thr Asp
945                 950                 955                 960

Asp Lys Arg Asn Gly Ile Ile Ser Lys Lys Leu Ser Pro Glu Asn Thr
                965                 970                 975

Thr Leu Lys Ser Ile Leu Lys Arg Lys Gly Thr Ser Asp Ile Ser Asp
            980                 985                 990

Glu Ser Asp Asp Ile Glu Ile Ser  Ser Lys Ser Arg Val  Arg Lys Arg
            995                 1000                1005

Ala Ser  Ser Leu Arg Phe Lys  Arg Ile Lys Glu Thr  Lys Lys Glu
    1010                1015                1020

Leu His  Asn Ser Pro Lys Thr  Met Asn Lys Thr Asn  Gln Val Tyr
    1025                1030                1035

Ala Ala  Asn Glu Asp His Asn  Ser Gln Phe Ile Asp  Asp Tyr Ser
    1040                1045                1050

Ser Ser  Asp Glu Ser Leu Ser  Val Ser His Phe Ser  Phe Ser Lys
    1055                1060                1065

Gln Ser  His Arg Pro Arg Thr  Ile Arg Asp Arg Thr  Ser Phe Ser
    1070                1075                1080

Ser Lys  Leu Pro Ser His Asn  Lys Lys Asn Ser Thr  Phe Ile Pro
    1085                1090                1095

Arg Lys  Pro Met Lys Cys Ser  Asn Glu Lys Val Val  Asn Gln Glu
    1100                1105                1110

Gln Ser  Tyr Glu Ser Met Asp  Lys Phe Leu Asp Gly  Val Gln Glu
    1115                1120                1125

Val Ala  Tyr Ile His Ser Asn  Gln Asn Val Ile Gly  Ser Ser Lys
    1130                1135                1140

Ala Glu  Asn His Met Ser Arg  Trp Ala Ala His Asp  Val Phe Glu
    1145                1150                1155

Leu Lys  Gln Phe Ser Gln Leu  Pro Ala Asn Ile Ala  Val Cys Ser
    1160                1165                1170

Ser Lys  Thr Tyr Lys Glu Lys  Val Asp Ala Asp Thr  Leu Pro His
    1175                1180                1185
```

```
Thr Lys Lys Gly Gln Gln Pro Ser Glu Gly Ser Ile Ser Leu Pro
1190                1195                1200

Leu Tyr Ile Ser Asn Pro Val Asn Gln Lys Lys Lys Val Tyr
1205                1210                1215

His Thr Asn Gln Thr Thr Phe Ile Ile Gly Glu Thr Pro Lys Gly
1220                1225                1230

Ile Arg Arg Lys Gln Phe Glu Glu Met Ala Ser Tyr Phe Asn Ser
1235                1240                1245

Ser Ser Val Asn Glu Phe Ala Lys His Ile Thr Asn Ala Thr Ser
1250                1255                1260

Glu Glu Arg Gln Lys Met Leu Arg Asp Phe Tyr Ala Ser Gln Tyr
1265                1270                1275

Pro Glu Val Lys Glu Phe Phe Val Asp Ser Val Ser Gln Phe Asn
1280                1285                1290

Asn Ser Ser Phe Glu Lys Gly Glu Gln Arg Thr Arg Lys Lys Ser
1295                1300                1305

Asp Lys Arg Glu Ser Leu Ile Lys Pro Arg Leu Ser Asp Ser Glu
1310                1315                1320

Thr Leu Ser Phe Lys Asp Ser Thr Asn Lys Ile Ser Gln Val Cys
1325                1330                1335

Ser Leu Lys Thr Tyr Lys Arg Lys Ser Val Lys Phe Gln Asn His
1340                1345                1350

Ile Ser Tyr Arg Glu Glu Val Phe Phe Asn Asp Ala Glu Thr Lys
1355                1360                1365

Lys Ser Pro Val Ser Ser Thr Gln Glu Ile Asp Ser Gly Lys Asn
1370                1375                1380

Ser Gln Ala Ser Glu Asp Thr Val Thr Ser Arg Ser Leu Asn Ser
1385                1390                1395

Glu Ser Glu Thr Arg Glu Arg Arg Leu Glu Asn Thr Met Lys Asp
1400                1405                1410

Gln Gln Asp Leu Thr Arg Thr Gly Ile Ser Arg Lys Glu Pro Leu
1415                1420                1425

Leu Lys Leu Glu Asn Lys Lys Ile Glu Asn Pro Val Leu Glu Asn
1430                1435                1440

Thr Ser Val Ile Ser Leu Leu Gly Asp Thr Ser Ile Leu Asp Asp
1445                1450                1455

Leu Phe Lys Ser His Gly Asn Ser Pro Thr Gln Leu Pro Lys Lys
1460                1465                1470

Val Leu Ser Gly Pro Met Glu Lys Ala Lys Gln Arg Pro Lys Asp
1475                1480                1485

Phe Trp Asp Ile Leu Asn Glu Gln Asn Asp Glu Ser Leu Ser Lys
1490                1495                1500

Leu Thr Asp Leu Ala Val Ile Glu Thr Leu Cys Glu Lys Ala Pro
1505                1510                1515

Leu Ala Ala Pro Phe Lys Arg Arg Glu Glu Pro Ala Thr Ser Leu
1520                1525                1530

Trp Lys Ser Asn Glu Lys Phe Leu Trp Lys Lys Phe Ser Pro Ser
1535                1540                1545

Asp Thr Asp Glu Asn Ala Thr Asn Thr Gln Ser Thr
1550                1555                1560

<210> SEQ ID NO 34
<211> LENGTH: 711
<212> TYPE: PRT
```

```
<213> ORGANISM: homo sapiens

<400> SEQUENCE: 34

Met Ser Asp Tyr Ser Thr Gly Gly Pro Pro Gly Pro Pro Pro Pro
1               5                   10                  15

Ala Gly Gly Gly Gly Ala Gly Ala Gly Gly Pro Pro
        20                  25              30

Gly Pro Pro Gly Ala Gly Asp Arg Gly Gly Gly Pro Gly Gly Gly
            35                  40                  45

Gly Pro Gly Gly Gly Ser Ala Gly Pro Ser Gln Pro Pro Gly Gly
        50                  55              60

Gly Gly Pro Gly Ile Arg Lys Asp Ala Phe Ala Asp Ala Val Gln Arg
65                  70                  75                  80

Ala Arg Gln Ile Ala Ala Lys Ile Gly Gly Asp Ala Ala Thr Thr Val
                85                  90                  95

Asn Asn Ser Thr Pro Asp Phe Gly Phe Gly Gly Gln Lys Arg Gln Leu
                100                 105                 110

Glu Asp Gly Asp Gln Pro Glu Ser Lys Lys Leu Ala Ser Gln Gly Asp
            115                 120                 125

Ser Ile Ser Ser Gln Leu Gly Pro Ile His Pro Pro Arg Thr Ser
130                 135                 140

Met Thr Glu Glu Tyr Arg Val Pro Asp Gly Met Val Gly Leu Ile Ile
145                 150                 155                 160

Gly Arg Gly Gly Glu Gln Ile Asn Lys Ile Gln Gln Asp Ser Gly Cys
                165                 170                 175

Lys Val Gln Ile Ser Pro Asp Ser Gly Gly Leu Pro Glu Arg Ser Val
                180                 185                 190

Ser Leu Thr Gly Ala Pro Glu Ser Val Gln Lys Ala Lys Met Met Leu
                195                 200                 205

Asp Asp Ile Val Ser Arg Gly Arg Gly Gly Pro Pro Gly Gln Phe His
            210                 215                 220

Asp Asn Ala Asn Gly Gly Gln Asn Gly Thr Val Gln Glu Ile Met Ile
225                 230                 235                 240

Pro Ala Gly Lys Ala Gly Leu Val Ile Gly Lys Gly Gly Glu Thr Ile
                245                 250                 255

Lys Gln Leu Gln Glu Arg Ala Gly Val Lys Met Ile Leu Ile Gln Asp
            260                 265                 270

Gly Ser Gln Asn Thr Asn Val Asp Lys Pro Leu Arg Ile Ile Gly Asp
        275                 280                 285

Pro Tyr Lys Val Gln Gln Ala Cys Glu Met Val Met Asp Ile Leu Arg
    290                 295                 300

Glu Arg Asp Gln Gly Gly Phe Gly Asp Arg Asn Glu Tyr Gly Ser Arg
305                 310                 315                 320

Ile Gly Gly Gly Ile Asp Val Pro Val Pro Arg His Ser Val Gly Val
                325                 330                 335

Val Ile Gly Arg Ser Gly Glu Met Ile Lys Lys Ile Gln Asn Asp Ala
            340                 345                 350

Gly Val Arg Ile Gln Phe Lys Gln Asp Asp Gly Thr Gly Pro Glu Lys
        355                 360                 365

Ile Ala His Ile Met Gly Pro Pro Asp Arg Cys Glu His Ala Ala Arg
    370                 375                 380

Ile Ile Asn Asp Leu Leu Gln Ser Leu Arg Ser Gly Pro Pro Gly Pro
385                 390                 395                 400
```

-continued

```
Pro Gly Gly Pro Gly Met Pro Pro Gly Gly Arg Gly Arg Gly Arg Gly
                405                 410                 415

Gln Gly Asn Trp Gly Pro Pro Gly Glu Met Thr Phe Ser Ile Pro
        420                 425                 430

Thr His Lys Cys Gly Leu Val Ile Gly Arg Gly Gly Glu Asn Val Lys
        435                 440                 445

Ala Ile Asn Gln Gln Thr Gly Ala Phe Val Glu Ile Ser Arg Gln Leu
450                 455                 460

Pro Pro Asn Gly Asp Pro Asn Phe Lys Leu Phe Ile Ile Arg Gly Ser
465                 470                 475                 480

Pro Gln Gln Ile Asp His Ala Lys Gln Leu Ile Glu Glu Lys Ile Glu
                485                 490                 495

Gly Pro Leu Cys Pro Val Gly Pro Gly Pro Gly Gly Pro Gly Pro Ala
                500                 505                 510

Gly Pro Met Gly Pro Phe Asn Pro Gly Pro Phe Asn Gln Gly Pro Pro
        515                 520                 525

Gly Ala Pro Pro His Ala Gly Gly Pro Pro His Gln Tyr Pro Pro
        530                 535                 540

Gln Gly Trp Gly Asn Thr Tyr Pro Gln Trp Gln Pro Pro Ala Pro His
545                 550                 555                 560

Asp Pro Ser Lys Ala Ala Ala Ala Ala Asp Pro Asn Ala Ala Trp
                565                 570                 575

Ala Ala Tyr Tyr Ser His Tyr Tyr Gln Gln Pro Pro Gly Pro Val Pro
                580                 585                 590

Gly Pro Ala Pro Ala Pro Ala Ala Pro Pro Ala Gln Gly Glu Pro Pro
        595                 600                 605

Gln Pro Pro Pro Thr Gly Gln Ser Asp Tyr Thr Lys Ala Trp Glu Glu
        610                 615                 620

Tyr Tyr Lys Lys Ile Gly Gln Pro Gln Gln Pro Gly Ala Pro Pro
625                 630                 635                 640

Gln Gln Asp Tyr Thr Lys Ala Trp Glu Glu Tyr Tyr Lys Lys Gln Ala
                645                 650                 655

Gln Val Ala Thr Gly Gly Gly Pro Gly Ala Pro Pro Gly Ser Gln Pro
                660                 665                 670

Asp Tyr Ser Ala Ala Trp Ala Glu Tyr Tyr Arg Gln Gln Ala Ala Tyr
        675                 680                 685

Tyr Gly Gln Thr Pro Gly Pro Gly Gly Pro Gln Pro Pro Thr Gln
        690                 695                 700

Gln Gly Gln Gln Gln Ala Gln
705                 710
```

<210> SEQ ID NO 35
<211> LENGTH: 445
<212> TYPE: PRT
<213> ORGANISM: homo sapiens

<400> SEQUENCE: 35

```
Met Arg Glu Ile Val His Ile Gln Ala Gly Gln Cys Gly Asn Gln Ile
1               5                   10                  15

Gly Ala Lys Phe Trp Glu Val Ile Ser Asp Glu His Gly Ile Asp Pro
                20                  25                  30

Thr Gly Ser Tyr His Gly Asp Ser Asp Leu Gln Leu Glu Arg Ile Asn
        35                  40                  45

Val Tyr Tyr Asn Glu Ala Thr Gly Asn Lys Tyr Val Pro Arg Ala Ile
50                  55                  60
```

Leu Val Asp Leu Glu Pro Gly Thr Met Asp Ser Val Arg Ser Gly Pro
65                  70                  75                  80

Phe Gly Gln Ile Phe Arg Pro Asp Asn Phe Val Phe Gly Gln Ser Gly
             85                  90                  95

Ala Gly Asn Asn Trp Ala Lys Gly His Tyr Thr Glu Gly Ala Glu Leu
            100                 105                 110

Val Asp Ser Val Leu Asp Val Val Arg Lys Glu Ser Glu Ser Cys Asp
            115                 120                 125

Cys Leu Gln Gly Phe Gln Leu Thr His Ser Leu Gly Gly Gly Thr Gly
            130                 135                 140

Ser Gly Met Gly Thr Leu Leu Ile Ser Lys Ile Arg Glu Glu Tyr Pro
145                 150                 155                 160

Asp Arg Ile Met Asn Thr Phe Ser Val Met Pro Ser Pro Lys Val Ser
            165                 170                 175

Asp Thr Val Val Glu Pro Tyr Asn Ala Thr Leu Ser Val His Gln Leu
            180                 185                 190

Val Glu Asn Thr Asp Glu Thr Tyr Cys Ile Asp Asn Glu Ala Leu Tyr
            195                 200                 205

Asp Ile Cys Phe Arg Thr Leu Lys Leu Thr Thr Pro Thr Tyr Gly Asp
210                 215                 220

Leu Asn His Leu Val Ser Ala Thr Met Ser Gly Val Thr Thr Cys Leu
225                 230                 235                 240

Arg Phe Pro Gly Gln Leu Asn Ala Asp Leu Arg Lys Leu Ala Val Asn
            245                 250                 255

Met Val Pro Phe Pro Arg Leu His Phe Phe Met Pro Gly Phe Ala Pro
            260                 265                 270

Leu Thr Ser Arg Gly Ser Gln Gln Tyr Arg Ala Leu Thr Val Pro Glu
            275                 280                 285

Leu Thr Gln Gln Met Phe Asp Ser Lys Asn Met Met Ala Ala Cys Asp
            290                 295                 300

Pro Arg His Gly Arg Tyr Leu Thr Val Ala Ala Ile Phe Arg Gly Arg
305                 310                 315                 320

Met Ser Met Lys Glu Val Asp Glu Gln Met Leu Asn Val Gln Asn Lys
            325                 330                 335

Asn Ser Ser Tyr Phe Val Glu Trp Ile Pro Asn Asn Val Lys Thr Ala
            340                 345                 350

Val Cys Asp Ile Pro Pro Arg Gly Leu Lys Met Ser Ala Thr Phe Ile
            355                 360                 365

Gly Asn Ser Thr Ala Ile Gln Glu Leu Phe Lys Arg Ile Ser Glu Gln
            370                 375                 380

Phe Thr Ala Met Phe Arg Arg Lys Ala Phe Leu His Trp Tyr Thr Gly
385                 390                 395                 400

Glu Gly Met Asp Glu Met Glu Phe Thr Glu Ala Glu Ser Asn Met Asn
            405                 410                 415

Asp Leu Val Ser Glu Tyr Gln Gln Tyr Gln Asp Ala Thr Ala Asp Glu
            420                 425                 430

Gln Gly Glu Phe Glu Glu Glu Gly Glu Asp Glu Ala
            435                 440                 445

METHODS AND COMPOSITIONS FOR IRREVERSIBLE ENZYME INHIBITION

CROSS REFERENCE TO RELATED APPLICATIONS

This application is a national stage entry pursuant to 35 U.S.C. § 371 of International Application No. PCT/US2020/027588, which was filed on Apr. 10, 2020, which claims priority to U.S. Patent Application No. 62/832,543, which was filed on Apr. 11, 2019, the entire contents of which are incorporated herein by reference.

TECHNICAL FIELD

The present invention relates to compounds and compositions useful as irreversible inhibitors of protein targets and to methods of using such compounds and compositions in the treatment of various diseases or conditions by irreversibly inhibiting such protein targets.

BACKGROUND

Traditional reversible inhibitors are in equilibrium with their cognate target protein(s)—continually binding, unbinding, and rebinding. On the other hand, irreversible inhibitors bind and form a permanent bond with their cognate target protein(s). As such, irreversible inhibitors may have a longer duration of action with respect to conventional inhibitors.

CDDO-Me has been shown to activate the Nrf2-Keap1 pathway in both in vitro and in vivo models through covalent binding to the key proteins. Several triterpenoids including CDDO-Me have been shown to form Michael adducts at C1 of the A ring with reactive nucleophiles, such as free cysteine thiols, on a target protein. Indeed, the proposed mechanism underlying certain effects of CDDO-Me is by the formation of these Michael adducts. This thiol-Michael reaction is intrinsically reversible and CDDO-Me has been recognized as a reversible covalent inhibitor that rapidly dissociates from its target. The protein targets and chemical mechanisms of other triterpenoids remains largely unknown.

Many diseases are associated with abnormal protein (e.g., enzyme, transcription factor, histone) activity. While reversible covalent inhibitors offer certain advantages, irreversible covalent inhibitors, which can in theory achieve complete neutralization of the target protein, may provide further advantages, including mitigation of competition by endogenous substrates for binding to target proteins and prolonged duration of action, which may provide opportunities for improved dosing regimens.

Accordingly, there remains a need to identify irreversible inhibitors of target proteins that may be useful as therapeutic agents. Identification and development of irreversible covalent inhibitors may open the door to additional or refined indications and/or improved dosing regimens.

SUMMARY OF THE INVENTION

In one aspect, this disclosure provides protein-small molecule complex comprising a protein and a bifunctional triterpenoid covalently linked to at least one amino acid residue of the protein. In certain embodiments, this disclosure provides a Kelch-Like ECH-Associated Protein 1 (Keap1) complex comprising a Keap1 protein and a bifunctional triterpenoid covalently linked to at least one amino acid residue of the Keap1 protein. In certain other embodiments, this disclosure provides a Lon protease 1 (LONP1) complex comprising a LONP1 protein and a bifunctional triterpenoid covalently linked to at least one amino acid residue of the LONP1 protein.

In one aspect, this disclosure provides a conjugate comprising a bifunctional triterpenoid covalently linked to at least one amino acid residue of a protein. In certain embodiments, the protein is human Keap1 and the bifunctional triterpenoid is covalently linked to an amino acid residue corresponding to Cys38, Tyr85, Tyr208, Cys257, Tyr263, Cys288, Lys323, or Tyr443 of SEQ ID NO: 3. In certain embodiments, the protein is human LONP1 and the bifunctional triterpenoid is covalently linked to an amino acid residue corresponding to Lys426, Tyr473, Cys520, Cys637, Tyr673, Cys682, Lys718, or Lys896 of SEQ ID NO: 4.

In one aspect, this disclosure provides a cross-linked conjugate comprising a bifunctional triterpenoid covalently linked to at least two amino acid residues of a protein or a protein complex. In certain embodiments, the bifunctional triterpenoid is covalently linked to (i) a cysteine residue and (ii) a lysine, serine, arginine, or tyrosine residue. In some such embodiments, the protein is human Keap1 and the lysine, serine, arginine, or tyrosine residue corresponds to Tyr85, Tyr208, Tyr263, Lys323, or Tyr443 of SEQ ID NO: 3 and the cysteine residue corresponds to Cys38, Cys257, or Cys288 of SEQ ID NO: 3. In other such embodiments, the protein is human LONP1 and the lysine, serine, arginine, or tyrosine residue corresponds to Lys426, Tyr473, Tyr673, Lys718, or Lys896 of SEQ ID NO: 4 and the cysteine residue corresponds to Cys520, Cys637, or Cys682 of SEQ ID NO: 4. For example, the lysine, serine, arginine, or tyrosine residue may correspond to Tyr473 of SEQ ID NO: 4 and the cysteine residue may correspond to Cys682 of SEQ ID NO: 4

In some embodiments of any aspects disclosed herein, the bifunctional triterpenoid is 1-[2-Cyano-3,12-dioxooleana-1,9(11-dien-28-oyl) (CDDO-Im) or a pharmaceutically acceptable salt thereof; 1-[2-Cyano-3,12-dioxooleana-1,9(11)-dien-28-oyl]-4(-pyridin-2-yl)-1H-imidazole (CDDO-2P-Im) or a pharmaceutically acceptable salt thereof; 1-[2-Cyano-3,12-dioxooleana-1,9(11)-dien-28-oyl]-4(-pyridin-3-yl)-1H-imidazole (CDDO-3P-Im) or a pharmaceutically acceptable salt thereof; or analogs or derivatives of the foregoing.

In some embodiments of any aspects disclosed herein, the conjugate or cross-linked conjugate is formed in vitro. In some other embodiments of any aspects disclosed herein, the conjugate or cross-linked conjugate is formed in vivo. Thus, in some embodiments of any aspects disclosed herein, a bifunctional triterpenoid is administered to a subject, preferably orally, and a conjugate or cross-linked conjugate comprising the bifunctional triterpenoid or a derivative thereof is formed in vivo.

BRIEF DESCRIPTION OF THE DRAWINGS

FIGS. 5B and 5C show the molecular function (5B) and pathway (5C) of all CDDO-2P-Im modified proteins were analyzed according to the protein class categorized by PANTHER 14.2.

DETAILED DESCRIPTION

Figure 1A:
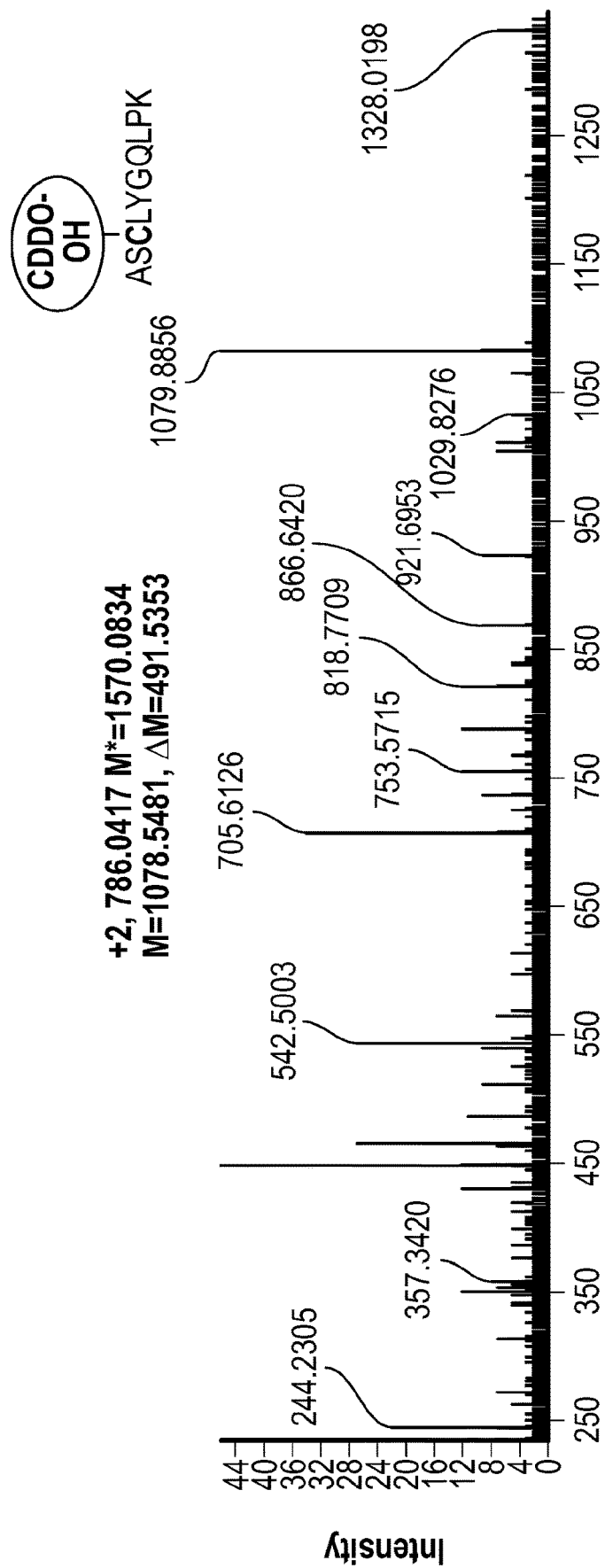
FIG. 1A depicts MS/MS spectra showing peptide [46]ASCLYGQLPK[55] from GSTP (SEQ ID NO: 1) modified by CDDO carboxylate at Cys48 with a mass addition of 491.5 amu.

This detailed description is intended only to acquaint others skilled in the art with the present invention, its principles, and its practical application so that others skilled in the art may adapt and apply the invention in its numerous forms, as they may be best suited to the requirements of a particular use. This description and its specific examples are intended for purposes of illustration only. This invention, therefore, is not limited to the embodiments described in this patent application, and may be variously modified.

A. Definitions

As used in the specification and the appended claims, unless specified to the contrary, the following terms have the meaning indicated:

The term "about" as used herein, means approximately, and in most cases within 10% of the stated value.

The term "pharmaceutically acceptable" is used adjectivally to mean that the modified noun is appropriate for use as a pharmaceutical product for human use or as a part of a pharmaceutical product for human use.

The terms "treat", "treating" and "treatment" refer to a method of alleviating or abrogating a condition, disorder, or disease and/or the attendant symptoms thereof.

B. Methods of Treatment

In one aspect, this disclosure provides a method for irreversibly inhibiting the activity of a protein in a patient or in a biological sample. The method comprises the step of administering to said patient or contacting said biological sample with a synthetic bifunctional triterpenoid compound, wherein the activity of the protein is irreversibly inhibited by covalently modifying a nucleophilic amino acid residue (e.g., a lysine, serine, arginine, tyrosine, histidine, glutamate, or aspartate) contained therein. In some embodiments, the nucleophilic amino acid is lysine, serine, arginine, or tyrosine. In some embodiments, the synthetic bifunctional triterpenoid compound is selected from the group consisting of: (a) 1-[2-Cyano-3,12-dioxooleana-1,9(11-dien-28-oyl) (CDDO-Im) or a pharmaceutically acceptable salt thereof (b) 1-[2-Cyano-3,12-dioxooleana-1,9(11)-dien-28-oyl]-4(-pyridin-2-yl)-1H-imidazole (CDDO-2P-Im) or a pharmaceutically acceptable salt thereof and (c) CDDO-AAN or a pharmaceutically acceptable salt thereof. In some preferred embodiments, the synthetic bifunctional triterpenoid compound is CDDO-2P-Im.

In some embodiments, the synthetic bifunctional triterpenoid compound is administered orally. In some embodiments, the patient is a cancer patient.

In some embodiments, the biological sample is a sample derived from a cancer patient.

In one aspect, this disclosure provides a method for treating a disease or condition mediated by a protein. The method comprises administering to a patient in need thereof a therapeutically effective amount of a synthetic bifunctional triterpenoid compound that irreversibly inhibits the protein.

In some embodiments, the synthetic bifunctional triterpenoid compound is selected from the group consisting of: 1-[2-Cyano-3,12-dioxooleana-1,9(11-dien-28-oyl) (CDDO-Im) or a pharmaceutically acceptable salt thereof and 1-[2-Cyano-3,12-dioxooleana-1,9(11)-dien-28-oyl]-4(-pyridin-2-yl)-1H-imidazole (CDDO-2P-Im) or a pharmaceutically acceptable salt thereof. In some preferred embodiments, the synthetic bifunctional triterpenoid compound is CDDO-2P-Im.

In some embodiments, the disease or condition is selected from the group consisting of cancer, cancer therapy resistance, autoimmune diseases, inflammatory diseases (e.g., Crohn's disease and other diseases associated with aberrant inflammatory responses, including neuropsychiatric disorders and, particularly, depression), neurodegenerative diseases (e.g., Alzheimer's disease (AD), Parkinson's disease (PD), amyotrophic lateral sclerosis (ALS), multiple sclerosis (MS), Huntington disease), diseases of the eye (e.g., diabetic retinopathy, macular degeneration), diseases of the lung (e.g., Chronic Obstructive Pulmonary Disease (COPD), emphysema, pulmonary fibrosis, bronchopulmonary dysplasia), diseases of the liver (e.g., chronic metabolic disease, liver injury from various toxins), atherosclerosis, chronic kidney disease (CKD), including CKD resulting from diabetes, acute renal injury, and aging. In some such embodiments, the cancer is a blood cancer, such as leukemia, lymphoma, or myeloma; in particular embodiments the blood cancer is, for example, Hodgkin or non-Hodgkin lymphoma (e.g., diffuse large B cell lymphoma or mantle cell lymphoma). In other such embodiments, the cancer involves a solid tumor, such as breast cancer, ovarian cancer, or brain cancer (e.g., medulloblastoma or glioblastoma). In some such embodiments, the cancer therapy resistance is resistance to proteasome inhibitor (PI) therapy. In some such embodiments, the cancer therapy resistance is resistance to an oral chemotherapeutic agent, such as an alkylating agent (e.g., TMZ). In some such embodiments, the cancer therapy resistance is resistance to radiation therapy.

In some embodiments, the protein is Keap1. In some embodiments, the protein is LONP1. In some embodiments, the protein is a B cell protein.

In some embodiments, the synthetic bifunctional triterpenoid compound is administered orally. In some embodiments, the patient is a cancer patient.

C. Compounds and Compositions

CDDO-Im is a synthetic triterpenoid. U.S. Pat. No. 6,974,801 and WO 2004/064723, each of which are incorporated herein by reference in their entirety, describe 1-(2-cyano-3,12-dioxooleana-1,9(11)-dien-28-oyl) imidazole (CDDO-Im), which has the chemical structure:

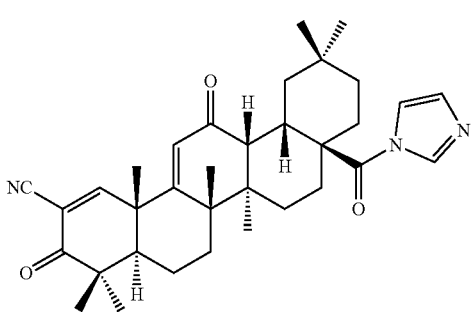

U.S. Pat. No. 9,896,475, which is incorporated herein by reference in its entirety, describes analogs and derivatives of CDDO-Im, including pyridyl analogs of CDDO-Im, which are more stable in human plasma and achieve a higher concentration in target tissues such as liver, pancreas, kidney and lungs.

Particular synthetic triterpenoids described herein include compounds having the structure of Formula A and pharmaceutically acceptable salts thereof:

Formula A

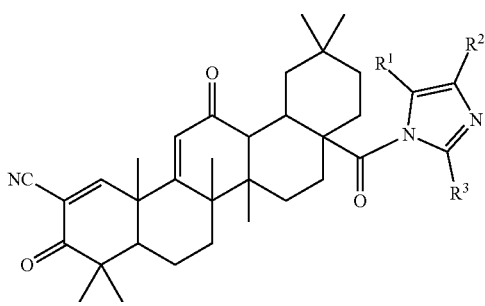

wherein one or more of $R^1$, $R^2$ or $R^3$ is independently a heteroaryl group (preferably a pyridyl group), cycloalkyl group, heterocyclyl group, carboxamide group, nitrile group, haloalkyl group, or acyl group, each of which may be substituted or unsubstituted where appropriate, and the remaining R groups are hydrogen. In a particular embodiment, $R^2$ is a substituted or unsubstituted aryl group, heteroaryl group, cycloalkyl group or heterocyclyl group, and $R^1$ and $R^3$ are hydrogen.

The term "heteroaryl" refers to a five- or six-membered aromatic ring structure, wherein at least one of the aromatic ring atoms is nitrogen, oxygen or sulfur, and wherein the monovalent group is composed of carbon, hydrogen, aromatic nitrogen, aromatic oxygen or aromatic sulfur. Non-limiting examples of aryl groups include acridinyl, furanyl, imidazoimidazolyl, imidazopyrazolyl, imidazopyridinyl, imidazopyrimidinyl, indolyl, indazolinyl, methylpyridyl, oxazolyl, phenylimidazolyl, pyridyl, pyrrolyl, pyrimidyl, pyrazinyl, quinolyl, quinazolyl, quinoxalinyl, tetrahydroquinolinyl, thienyl, triazinyl, pyrrolopyridinyl, pyrrolopyrimidinyl, pyrrolopyrazinyl, pyrrolotriazinyl, pyrroloimidazolyl, and chromenyl, wherein the point of attachment is one of the aromatic atoms. In particular embodiments, the heteroaryl is a pyridyl group.

"Cycloalkyl" means a non-aromatic mono- or multicyclic ring system including about 3 to about 10 carbon atoms, preferably about 5 to about 10 carbon atoms. Non-limiting examples of suitable monocyclic cycloalkyls include cyclopropyl, cyclopentyl, cyclohexyl, cycloheptyl and the like. Non-limiting examples of suitable multicyclic cycloalkyls include 1-decalinyl, norbornyl, adamantyl and the like.

"Heterocyclyl" or "heterocycloalkyl" means a non-aromatic saturated monocyclic or multicyclic ring system including about 3 to about 10 ring atoms, preferably about 5 to about 10 ring atoms, in which one or more of the atoms in the ring system is an element other than carbon, for example nitrogen, oxygen or sulfur, alone or in combination. Preferred heterocyclyls contain about 5 to about 6 ring atoms. The prefix aza, oxa or thia before the heterocyclyl root name means that at least a nitrogen, oxygen or sulfur atom respectively is present as a ring atom. The nitrogen or sulfur atom of the heterocyclyl can be optionally oxidized to the corresponding N-oxide, S-oxide or S,S-dioxide. Non-limiting examples of suitable monocyclic heterocyclyl rings include piperidyl, pyrrolidinyl, piperazinyl, morpholinyl, thiomorpholinyl, thiazolidinyl, 1,4-dioxanyl, tetrahydrofuranyl, tetrahydrothiophenyl, lactam, lactone, and the like. Non-limiting examples of suitable bicyclic heterocyclyl rings include decahydro-isoquinoline, decahydro-[2,6]naphthyridine, and the like.

As used herein, a "carboxamide" or "carboxamide group" refers to a —C(=O)NH$_2$ group.

The term "nitrile" or "nitrile group" is intended to refer to a —C≡N group.

As used herein, "alkyl" or "alkyl group" includes linear or branched saturated aliphatic hydrocarbon groups having the specified number of carbon atoms. $C_{1-6}$ alkyl, for example, includes $C_1$, $C_2$, $C_3$, $C_4$, $C_5$, and $C_6$ alkyl groups. Examples of alkyl include, but are not limited to, methyl, ethyl, n-propyl, isopropyl, n-butyl, isobutyl, sec-butyl, t-butyl, n-pentyl, sec-pentyl, 3-(2-methyl)butyl, 2-pentyl, 2-methylbutyl, n-hexyl, and 2-methylpentyl. In particular embodiments, an alkyl of this invention is a $C_{1-6}$ alkyl, $C_{1-5}$ alkyl, $C_{1-4}$ alkyl, $C_{1-3}$ alkyl, or $C_{1-2}$ alkyl.

The term "haloalkyl group" refers to a linear or branched alkyl group substituted by one or more halogen atoms, the same or different, optionally selected from fluorine, chlorine, bromine, and iodine. Examples of this group include fluoromethyl, difluoromethyl, trifluoromethyl, trichloromethyl, 2,2,2-trifluoroethyl, 2,2,2-trichloroethyl, 2,2,3,3-tetrafluoropropyl, 2,2,3,3,3-pentafluoropropyl.

"Acyl," as used herein alone or as part of another group, refers to a —C(=O)R radical, where R is, e.g., an aryl, alkyl, alkenyl, alkynyl, cycloalkyl, or haloalkyl group. When the R group contains a halogen, the group is termed a "haloacyl" group. An example is a trifluoroacetyl group.

The term "aryl" refers to a monovalent group with an aromatic carbon atom as the point of attachment, said carbon atom forming part of a five- or six-membered aromatic ring structure wherein the ring atoms are all carbon, and wherein the monovalent group is composed of carbon and hydrogen. Non-limiting examples of aryl groups include phenyl, methylphenyl, (dimethyl)phenyl, -ethylphenyl, propylphenyl, —$C_6H_4CH(CH_3)_2$, —$C_6H_4CH(CH_2)_2$, methylethylphenyl, vinylphenyl, naphthyl, and the monovalent group derived from biphenyl. In particular embodiments, the aryl is a phenyl group.

As used herein, "alkenyl" or "alkenyl group" refers to an unsaturated branched, straight-chain or cyclic monovalent hydrocarbon radical having at least one carbon-carbon double bond derived by the removal of one hydrogen atom from a single carbon atom of a parent alkene. The radical may be in either the cis or trans conformation about the double bond(s). Examples of alkenyl include, but are not limited to, ethenyl, propenyls, such as prop-1-en-1-yl, prop-1-en-2-yl, prop-2-en-1-yl, prop-2en-2-yl, cycloprop-1-en-1-yl; cycloprop-2-en-1-yl; butenyls such as but-1-en-1-yl, but-1-en-2-yl, 2-methyl-prop-1-en-1yl, but-2-en-1-yl, but-2-en-1-yl, but-2-en-2-yl, buta-1,3-dien1-yl, beta-1,3-dien-2-yl, cyclobut-1-en-1-yl, cyclobut-1-en3-yl, cyclobuta-1,3-dien-1-yl.

As used herein, an "alkynyl" or "alkynyl group" refers to an unsaturated branched, straight-chain or cyclic monovalent hydrocarbon radical having at least one carbon-carbon triple bond derived by the removal of one hydrogen atom from a single carbon atom of a parent alkyne. Examples of alkynyl groups include, but are not limited to, ethynyl, propynyl, butynyls, propargyl, and the like.

Any of the groups described herein may be unsubstituted or optionally substituted. When modifying a particular group, "substituted" means that the group the term modifies may, but does not have to, be substituted. Substitutions include the replacement of an available hydrogen with an alkyl, alkenyl, alkynyl, aryl, haloalkyl, haloacyl, heteroaryl, aralkyl, alkylaryl, heteroaralkyl, heteroarylalkenyl, heteroarylalkynyl, alkylheteroaryl, hydroxy, hydroxyalkyl, alkoxy, aryloxy, aralkoxy, alkoxyalkoxy, acyl, halo, nitro, cyano, cyanoalkyl, carboxy, alkoxycarbonyl, aryloxycarbonyl, aralkoxycarbonyl, alkyl sulfonyl, aryl sulfonyl, heteroarylsulfonyl, alkylthio, arylthio, heteroarylthio, aralkylthio, heteroaralkylthio, cycloalkyl, or heterocyclyl.

Any undefined valency on an atom of a structure shown in this application implicitly represents a hydrogen atom bonded to the atom.

In some embodiments of any aspects disclosed herein, a synthetic triterpenoid has the structure of Formula B and pharmaceutically acceptable salts thereof:

Formula B

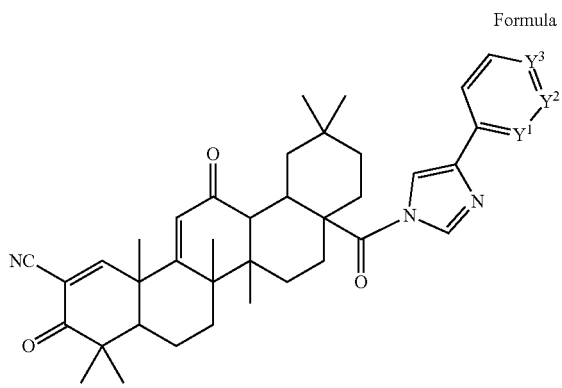

wherein one of $Y^1$, $Y^2$, or $Y^3$, is N and the remaining Y groups are each CH. In a particular embodiment, $Y^1$ is N and $Y^2$ and $Y^3$ are CH. In another particular embodiment, $Y^2$ is N and $Y^1$ and $Y^3$ are CH. In another particular embodiment, $Y^3$ is N and $Y^1$ and $Y^2$ are CH.

A particularly preferred synthetic bifunctional triterpenoid compound is 1-[2-Cyano-3,12-dioxooleana-1,9(11)-dien-28-oyl]-4(-pyridin-2-yl)-1H-imidazole (CDDO-2P-Im), which is depicted structurally as:

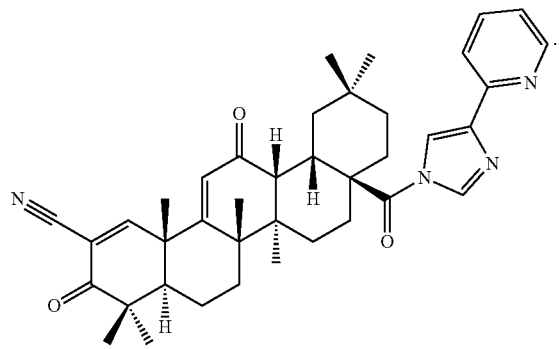

Another particularly preferred synthetic bifunctional triterpenoid is 1-[2-Cyano-3,12-dioxooleana-1,9(11)-dien-28-oyl]-4(-pyridin-3-yl)-1H-imidazole (CDDO-3P-Im), which is depicted structurally as:

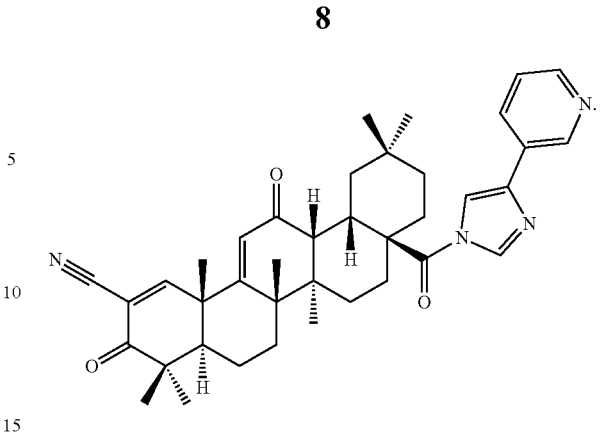

Another bifunctional triterpenoid can be prepared by reacting CDDO acid chloride with $NH_2CH_2CN$ (aminoacetonitrile) in the presence of a base. The product of this reaction is referred to herein as "CDDO-AAN."

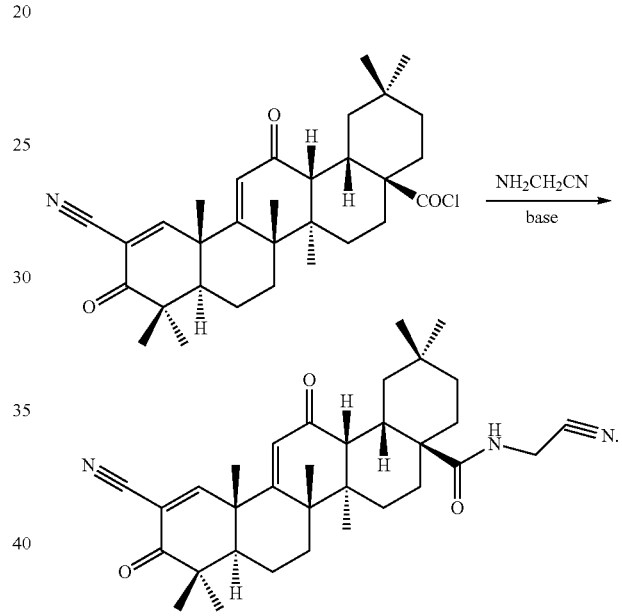

In some embodiments of any aspects disclosed herein, a synthetic bifunctional triterpenoid compound may be present in a pharmaceutical composition in the form of acid or base addition salts. Acid addition salts may be prepared by methods well known in the art, and may be formed from organic and inorganic acids. Suitable organic acids include maleic, fumaric, benzoic, ascorbic, succinic, methanesulfonic, acetic, trifluoroacetic, oxalic, propionic, tartaric, salicylic, citric, gluconic, lactic, mandelic, cinnamic, aspartic, stearic, palmitic, glycolic, glutamic, and benzenesulfonic acids. Suitable inorganic acids include hydrochloric, hydrobromic, sulfuric, phosphoric, and nitric acids. Suitable base addition salts include salts formed with organic and inorganic cations such as those chosen from the alkali and alkaline earth metals (for example, lithium, sodium, potassium, magnesium, barium and calcium), as well as the ammonium ion and substituted derivatives thereof (for example, dibenzylammonium, benzylammonium, 2-hydroxyethylammonium, and the like). Thus, the term "pharmaceutically acceptable salt" is intended to encompass any and all acceptable salt forms.

Pharmaceutical compositions disclosed herein comprise a synthetic bifunctional triterpenoid compound, preferably CDDO-2P-Im or a pharmaceutically acceptable salt thereof. In some embodiments, the pharmaceutical composition is an oral dosage form, preferably a solid oral dosage form (e.g., a tablet). In some such embodiments, the solid oral dosage form may comprise pharmaceutically acceptable excipients such as excipients that function as binders, glidants, lubricants, and fillers. Thus, a solid oral dosage form comprising a synthetic bifunctional triterpenoid compound, further optionally comprises one or more conventional pharmaceutically acceptable excipients.

D. Conjugates

In one aspect, this disclosure provides a conjugate comprising a protein having a nucleophilic residue, wherein the nucleophilic residue is covalently, and irreversibly, bonded to a synthetic bifunctional triterpenoid. Exemplary nucleophilic residues include lysine, serine, arginine, tyrosine, histidine, glutamate, and aspartate. Exemplary bifunctional triterpenoids include CDDO-Im, CDDO-2P-Im, CDDO-AAN, and derivatives thereof.

In one aspect, this disclosure provides a conjugate comprising a protein having a lysine, serine, arginine, or tyrosine residue, wherein the lysine, serine, arginine, or tyrosine residue is covalently, and irreversibly, bonded to a synthetic triterpenoid; wherein said conjugate has a structure corresponding to Formula (I):

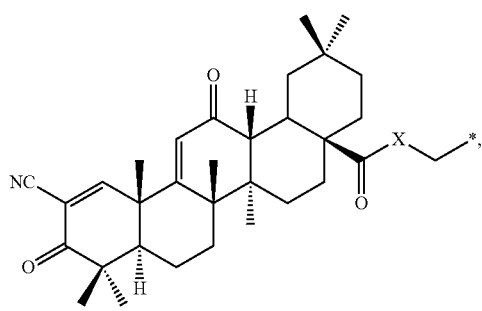

(I)

wherein * represents the point of attachment through the lysine, serine, arginine, or tyrosine residue and X represents O or N(H).

In some embodiments, X is O. In some embodiments, X is N(H).

In some embodiments, the residue bonded to the synthetic triterpenoid is a lysine residue. In some embodiments, the residue bonded to the synthetic triterpenoid is a serine residue. In some embodiments, the residue bonded to the synthetic triterpenoid is an arginine residue. In some embodiments, the residue bonded to the synthetic triterpenoid is a tyrosine residue.

Depending upon the nature of the leaving group of the bifunctional triterpenoid, * may comprise a direct bond to the amino acid residue or, alternatively a linker, such as a one, two, or three atom linker between the triterpenoid skeleton and the amino acid residue. In some such embodiments, * comprises —C(=NH)—.

In one aspect, this disclosure provides a cross-linked conjugate comprising one or more proteins, said one or more proteins having (i) a cysteine residue and (ii) a lysine, serine, arginine, or tyrosine residue, wherein the lysine, serine, arginine, or tyrosine residue is covalently, and irreversibly, bonded to a synthetic, bifunctional triterpenoid; wherein said conjugate has a structure corresponding to Formula (II):

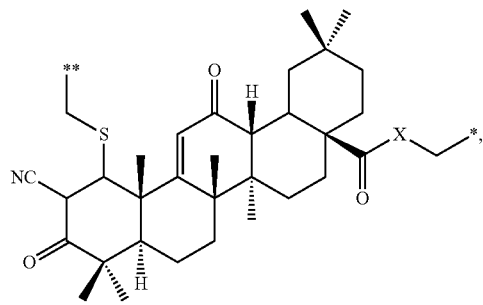

(II)

wherein * represents the point of attachment through the lysine, serine, arginine, or tyrosine residue, ** represents the point of attachment through the cysteine residue, and X represents O or N(H).

In some embodiments, the cross-linked conjugate comprises a single protein. In some embodiments, the cross-linked conjugate comprises two proteins.

In some embodiments, the cysteine residue is in the same protein as the lysine, serine, arginine, or tyrosine residue. In some such embodiments, the cysteine residue is adjacent to the lysine, serine, arginine, or tyrosine residue. In some embodiments, the cysteine residue is in a different protein from the lysine, serine, arginine, or tyrosine residue.

In some embodiments, X is O. In some embodiments, X is N(H).

In some embodiments, the residue bonded to the synthetic, bifunctional triterpenoid is a lysine residue. In some embodiments, the residue bonded to the synthetic, bifunctional triterpenoid is a serine residue. In some embodiments, the residue bonded to the synthetic, bifunctional triterpenoid is an arginine residue. In some embodiments, the residue bonded to the synthetic, bifunctional triterpenoid is a tyrosine residue.

Depending upon the nature of the leaving group of the bifunctional triterpenoid, * may comprise a direct bond to the amino acid residue or, alternatively a linker, such as a one, two, or three atom linker between the triterpenoid skeleton and the amino acid residue. In some such embodiments, * comprises —C(=NH)—.

Data presented herein show that multiple covalent adducts were detected by mass spectrometric analysis when the bifunctional triterpenoids were incubated with various proteins in vitro. Without wishing to be bound by any particular theory, it is believed that a simple Michael adduct is initially formed through conjugation of cysteine residues to the α,β unsaturated ketone located in the A ring. Further hydrolysis of the imidazole ester resulted in the CDDO carboxylic acid adduct. Due to the reversible nature of the thiol addition, only low levels of this adduct were detected. Additionally, acylation of other amino acid residues (lysine, serine, tyrosine, and arginine) could occur at the C28 carbonyl carbon of bifunctional triterpenoids. Finally, cross-linking adducts could be formed by conjugation to cysteine residues at C1 and acylation to other amino acid residues at C28. The cross-linking could either occur on the same peptide containing two adjacent reactive amino acid residues or two different peptides. The latter could potentially result in cross-linking two different proteins.

An exemplary scheme is depicted below as Scheme 1.

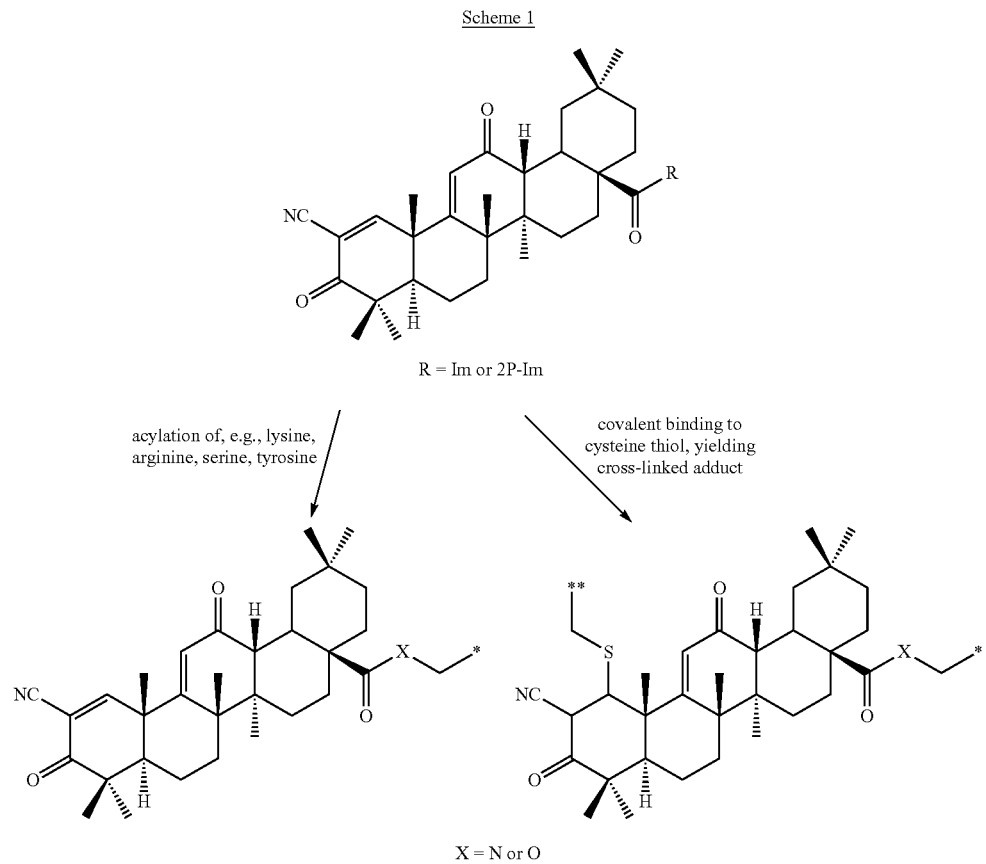

In one aspect, this disclosure provides a conjugate comprising a bifunctional triterpenoid covalently linked to at least one amino acid residue of a protein.

In one aspect, this disclosure provides a cross-linked conjugate comprising a bifunctional triterpenoid covalently linked to at least two amino acid residues of a protein or protein complex.

The following Table illustrates exemplary protein sequences modified by bifunctional triterpenoids, such as CDDO-Im, CDDO-2P-Im, and CDDO-3P-Im.

| Name | Sequence | SEQ ID NO: |
|---|---|---|
| GSTP1 (human) (P09211) | MPPYTVVYFPVRGRCAALRMLLADQGQSWKEEVVTVETWQESLKASC LYGQLPKFQDGDLTLYQSNTILRHLGRTLGLYGKDQQEAALDMVNDG VEDLRCKYISLIYTNYEAGKDDYVKALPGQLKPFETLLSQNQGGKTF IVGDQISFADYNLLDLLLIHEVLAPGCLDAFPLLSAYVGRLSARPKL KAFLASPEYVNLPINGNGKQ | 1 |
| serum albumin (human) (P02768)[a] | DAHKSEVAHRFKDLGEENFKALVLIAFAQYLQQCPFEDHVKLVNEVT EFAKTCVADESAENCDKSLHTLFGDKLCTVATLRETYGEMADCCAKQ EPERNECFLQHKDDNPNLPRLVRPEVDVMCTAFHDNEETFLKKYLYE IARRHPYFYAPELLFFAKRYKAAFTECCQAADKAACLLPKLDELRDE GKASSAKQRLKCASLQKFGERAFKAWAVARLSQRFPKAEFAEVSKLV TDLTKVHTECCHGDLLECADDRADLAKYICENQDSISSKLKECCEKP LLEKSHCIAEVENDEMPADLPSLAADFVESKDVCKNYAEAKDVFLGM FLYEYARRHPDYSVVLLLRLAKTYETTLEKCCAAADPHECYAKVFDE FKPLVEEPQNLIKQNCELFEQLGEYKFQNALLVRYTKKVPQVSTPTL VEVSRNLGKVGSKCCKHPEAKRMPCAEDYLSVVLNQLCVLHEKTPVS DRVTKCCTESLVNRRPCFSALEVDETYVPKEFNAETFTFHADICTLS EKERQIKKQTALVELVKHKPKATKEQLKAVMDDFAAFVEKCCKADDK ETCFAEEGKKLVAASQAALGL | 2 |

-continued

| Name | Sequence | SEQ ID NO: |
|---|---|---|
| KEAP1 (human) (Q14145) | MQPDPRPSGAGACCRFLPLQSQCPEGAGDAVMYASTECKAEVTPSQH GNRTFSYTLEDHTKQAFGIMNELRLSQQLCDVTLQVKYQDAPAAQFM AHKVVLASSSPVFKAMFTNGLREQGMEVVSIEGIHPKVMERLIEFAY TASISMGEKCVLHVMNGAVMYQIDSVVRACSDFLVQQLDPSNAIGIA NFAEQIGCVELHQRAREYIYMHFGEVAKQEEFFNLSHCQLVTLISRD DLNVRCESEVFHACINWVKYDCEQRRFYVQALLRAVRCHSLTPNFLQ MQLQKCEILQSDSRCKDYLVKIFEELTLHKPTQVMPCRAPKVGRLIY TAGGYFRQSLSYLEAYNPSDGTWLRLADLQVPRSGLAGCVVGGLLYA VGGRNNSPDGNTDSSALDCYNPMTNQWSPCAPMSVPRNRIGVGVIDG HIYAVGGSHGCIHHNSVERYEPERDEWHLVAPMLTRRIGVGVAVLNR LLYAVGGFDGTNRLNSAECYYPERNEWRMITAMNTIRSGAGVCVLHN CIYAAGGYDGQDQLNSVERYDVETETWTFVAPMKHRRSALGITVHQG RIYVLGGYDGHTFLDSVECYDPDTDTWSEVTRMTSGRSGVGVAVTME PCRKQIDQQNCTC | 3 |
| LONP1 (human) (P36776) | MASTGYVRLWGAARCWVLRRPMLAAAGGRVPTAAGAWLLRGQRTCD ASPPWALWGRGPAIGGQWRGFWEASSRGGGAFSGGEDASEGGAEEGA GGAGGSAGAGEGPVITALTPMTIPDVFPHLPLIAITRNPVFPRFIKI IEVKNKKLVELLRRKVRLAQPYVGVFLKRDDSNESDVVESLDEIYHT GTFAQIHEMQDLGDKLRMIVMGHRRVHISRQLEVEPEEPEAENKHKP RRKSKRGKKEAEDELSARHPAELAMEPTPELPAEVLMVEVENVVHED FQVTEEVKALTAEIVKTIRDIIALNPLYRESVLQMMQAGQRVVDNPI YLSDMGAALTGAESHELQDVLEETNIPKRLYKALSLLKKEFELSKLQ QRLGREVEEKIKQTHRKYLLQEQLKIIKKELGLEKDDKDAIEEKFRE RLKELVVPKHVMDVVDEELSKLGLLDNHSSEFNVTRNYLDWLTSIPW GKYSNENLDLARAQAVLEEDHYGMEDVKKRILEFIAVSQLRGSTQGK ILCFYGPPGVGKTSIARSIARALNREYFRFSVGGMTDVAEIKGHRRT YVGAMPGKIIQCLKKTKTENPLILIDEVDKIGRGYQGDPSSALLELL DPEQNANFLDHYLDVPVDLSKVLFICTANVTDTIPEPLRDRMEMINV SGYVAQEKLAIAERYLVPQARALCGLDESKAKLSSDVLTLLIKQYCR ESGVRNLQKQVEKVLRKSAYKIVSGEAESVEVTPENLQDFVGKPVFT VERMYDVTPPGVVMGLAWTAMGGSTLFVETSLRRPQDKDAKGDKDGS LEVIGQLGEVMKESARIAYTFARAFLMQHAPANDYLVTSHIHLHVPE GATPKDGPSAGCTIVTALLSLAMGRPVRQNLAMTGEVSLTGKILPVG GIKEKTIAAKRAGVTCIVLPAENKKDFYDLAAFITEGLEVHFVEHYR EIFDIAFPDEQAEALAVER | 4 |
| PPIA (human) (P62937) | MVNPTVFFDIAVDGEPLGRVSFELFADKVPKTAENFRALSTGEKGFG YKGSCFHRIIPGFMCQGGDFTRHNGTGGKSIYGEKFEDENFILKHTG PGILSMANAGPNTNGSQFFICTAKTEWLDGKHVVFGKVKEGMNIVEA MERFGSRNGKTSKKITIADCGQLE | 5 |

[a] The first 24 amino acid residues in P02768 comprise a signalling peptide. The HSA protein depicted in SEQ ID NO: 2 contains 585 amino acids (corresponding to 25-609 of P02768).

In certain embodiments, the protein is human Keap1 and the bifunctional triterpenoid is covalently linked to an amino acid residue corresponding to Cys38, Tyr85, Tyr208, Cys257, Tyr263, Cys288, Lys323, or Tyr443 of SEQ ID NO: 3. In some such embodiments, the bifunctional triterpenoid forms a covalent adduct with Cys288 through Michael addition and an adduct with Tyr85 through acylation.

In certain embodiments, the protein is human LONP1 and the bifunctional triterpenoid is covalently linked to an amino acid residue corresponding to Lys426, Tyr473, Cys520, Cys637, Tyr673, Cys682, Lys718, or Lys896 of SEQ ID NO: 4. In some such embodiments, the bifunctional triterpenoid forms a covalent adduct with Cys682 through Michael addition and an adduct with Tyr473 through acylation.

In certain embodiments, the protein is human PPIA and the bifunctional triterpenoid is covalently linked to an amino acid residue corresponding to Cys52, Cys62, Cys115, or Cys161 of SEQ ID NO: 5. In some such embodiments, the bifunctional triterpenoid forms a covalent adduct with Cys52 through Michael addition.

E. Examples

The protein targets and chemical mechanisms of bifunctional triterpenoids, such as CDDO-Im, have not been heretofore elucidated. Data presented herein show that bifunctional triterpenoids form multiple adducts with a variety of amino acids on model proteins such as HSA and GSTP. Further studies were carried out to identify intracellular protein targets and characterize the structure of the covalent adducts formed by a range of bifunctional triterpenoids. Data presented herein show that bifunctional triterpenoids such as CDDO-Im and CDDO-2P-Im can form (i) a simple Michael adduct with cysteine, (ii) a cross-linking adduct (e.g., between adjacent cysteine and serine/arginine/lysine residues), and (iii) an acylation adduct formed with arginine residues.

Materials and General Methods.

Triterpenoids used in the following examples included: CDDO-Me (1), CDDO-Im (2), CDDO-2P-Im (3), and CDDO-3P-Im (4).

Chemicals.

Bifunctional Triterpenoids (2-4) were prepared as previously described. CDDO-Me and HSA (97-99% pure) was purchased from Sigma-Aldrich, trypsin from Promega (Madison, Wis.), liquid chromatography-mass spectrometry (LC-MS) grade solvents from Fisher Scientific UK Ltd (Loughborough, Leicestershire), and all other standard reagents from Sigma-Aldrich.

Modification of his-GSTP by Triterpenoids.

His-GSTP was expressed in *E. coli* as described previously. Purified His-GSTP captured on nickel beads was incubated with a range of concentrations of CDDO-Im (50 nM-10 µM) in phosphate buffer, pH 7.4 for 16 h. CDDO-Me (0.5 mM) was used as a positive control. The beads were then washed 5 times with 1000 µL phosphate buffer. The protein was subjected to on-bead tryptic digestion. In brief, a suspension beads in 30 µL of 50 mM ammonium bicarbonate buffer was incubated with 20 ng of trypsin for 16 h at 37° C. and the digest was analyzed by LC-MS/MS.

Modification of HSA by Triterpenoids.

Triterpenoids were dissolved in DMSO to make up 1 mM stock solutions, followed by dilutions in phosphate buffer (10 mM, pH 7.4) and incubated with recombinant HSA (0.6 mM, 50 µL) in sealed Eppendorf tubes at 37° C. for 16 h. The molar ratios of drug to protein were 0.00001:1, 0.0001:1, 0.001:1, 0.01:1, 0.1:1, and 1:1. Protein was precipitated twice with 9 volumes of ice-cold methanol to remove free drug, resuspended in 50 µL phosphate buffer and then reduced with 10 mM dithiothreitol (15 min) and alkylated with 55 mM iodoacetamide (15 min) at room temperature. The protein was precipitated with methanol once more and finally dissolved in 100 µL 50 mM ammonium hydrogencarbonate, and 165 µg (1.25 nmol) of protein was digested with 1.6 µg trypsin overnight at 37° C.

To examine the time-dependent modification of HSA by triterpenoids, 10 µM triterpenoids was incubated with HSA (0.6 mM, 300 µL) at 37° C. Aliquots of 50 µL were removed after 10, 30, 60, and 180 minutes and processed for LC-MS/MS analysis.

Modification of Keap1 by Triterpenoids.

Triterpenoids were dissolved in DMSO to make up 1 mM stock solutions, followed by dilutions in phosphate buffer (10 mM, pH 7.4) and incubated with recombinant Keap1 proteins produced in house at 37° C. for 16 h. The final concentration of triterpenoids was 100 µM. The mixture was then purified by 1D-gel electrophoresis using an established protocol, followed by in gel-digestion. The digests were further purified by C18-ziptiping and analyzed by LC-MS/MS.

Modification of LONP by Triterpenoids.

The LONP protein (Professor John Letterio) was first purified by buffer exchange using spin filters (3K MWCO). 10 µg protein was then incubated with CDDO-2P-Im (100 µM) in phosphate buffer (10 mM, pH 7.4) at 37° C. for 16 h. The mixture was then purified by 1D-gel electrophoresis using an established protocol, followed by in gel-digestion. The digests were further purified by C18-ziptiping and analyzed by LC-MS/MS.

Modification of B Cell Intracellular Proteins by Triterpenoids.

Epstein-Barr virus-transformed B-cell lines were generated with previously described methods by incubating PBMC with supernatant from the Epstein-Barr virus-producing cell line B9-58. B cells were maintained in F1 medium at 37° C., 5% $CO_2$. Cells were plated into an 8-well plate at a concentration of $1 \times 10^6$ cells/ml and treated with triterpenoids at different concentrations (0, 1, 10 µM) for 16 hours. 200 µL cells were then plated ($1 \times 10^5$ cells/well) into a 96-well plate, [$^3$H]-thymidine (0.5 µCi/well) was then added and incubated for 16 hours. Cell was harvested and the proliferative responses were measured by [$^3$H]-thymidine incorporation. For the remaining cells, supernatants were removed for ELISA (TNFα, IL10, and IFNγ) and proteomics analysis. The cells were then washed in PBS and lysed with 2D lysis buffer (40 mM Tris base, 7M urea, 2M thiourea, 4% (w/v) CHAPS, and 1% DTT). Cell lysates were sonicated and centrifuged at 18000 rpm for 20 minutes at ° C.4. Supernatants were collected and the protein concentrations were measured by BCA assay. Proteins were denatured and processed for mass spectrometric analysis.

LC-MS/MS Analysis of Triterpenoids Protein Adducts.

The tryptic peptides were analyzed by a Triple TOF 5600 mass spectrometer (Sciex). Samples were reconstituted in 50 µL 0.1% formic acid (FA) and 2 µL of samples were delivered into the instrument using an Eksigent Nano-LC system mounted with a nanoACQUITY UPLC Symmetry C18 Trap Column and an analytical BEH C18 nanoACQUITY Column (Waters, MA, USA). A NanoSpray III source was fitted with a 10 µm inner diameter PicoTip emitter (New Objective). Samples were loaded in 0.1% formic acid onto the trap, which was then washed with 2% ACN/0.1% FA for 10 min at 2 µL/min before switching in-line with the analytical column. A gradient of 2-50% (v/v) ACN/0.1% (v/v) FA over 90 min was applied to the column at a flow rate of 300 nL/min. Spectra were acquired automatically in positive ion mode using information-dependent acquisition, using mass ranges of 400-1600 amu in MS and 100-1400 amu in MS/MS. Up to 25 MS/MS spectra were acquired per cycle (approximately 10 Hz) using a threshold of 100 counts per s, with dynamic exclusion for 12 s and rolling collision energy. Sequence coverage was determined using ProteinPilot software, v4.0 and the most recent version of the SwissProt database.

Example 1. Triterpenoid Modified-GSTP

Mass spectrometric analysis of tryptic digests in the absence of triterpenoids identified the unmodified Cys48-containing peptide 46-55 of SEQ ID NO: 1 ($^{46}$ASCLYGQLPK$^{55}$). The peptide corresponding to a doubly charged ion of m/z 568.9 was detected, and the peptide sequence was confirmed by a series of y product ions (m/z 244.2, 357.3, 542.4, 705.5, 818.7, 978.7, and 1065.8) on the MS/MS spectra (data not shown).

LC-MS/MS analysis of the tryptic digests of CDDO-Im treated GSTP revealed multiple types of adducts, including a simple Michael adduct formed with cysteine, a cross-linking adduct, and an acylation adduct formed with arginine residues (Table 1). A simple Michael addition of cysteine to CDDO-Im followed by the hydrolysis of the imidazole ester resulted in an adduct with a mass addition of 491.5 amu. FIG. 1A shows a representative MS/MS spectrum for a doubly charged ion at m/z 786.04, corresponding to the tryptic peptide corresponding to residues 46-55 of SEQ ID NO: 1 ($^{46}$ASCLYGQLPK$^{55}$) with an additional mass of 491.5 amu. The peptide sequence was confirmed by partial singly charged y and b series ions. The modification site was confirmed by the presence of b3* (m/z 753.57), b4* (m/z 866.64), b5* (m/z 1029.8276), and b8*(m/z 1328.0198), all with adduction of 491.5 amu. The presence of a fragment ion of m/z 464.4492 and 447.4189 that derived from CDDO carboxylic acid provided further evidence of the modification. This adduct was only detected on Cys48, no other sites were identified.

Figure 1B:
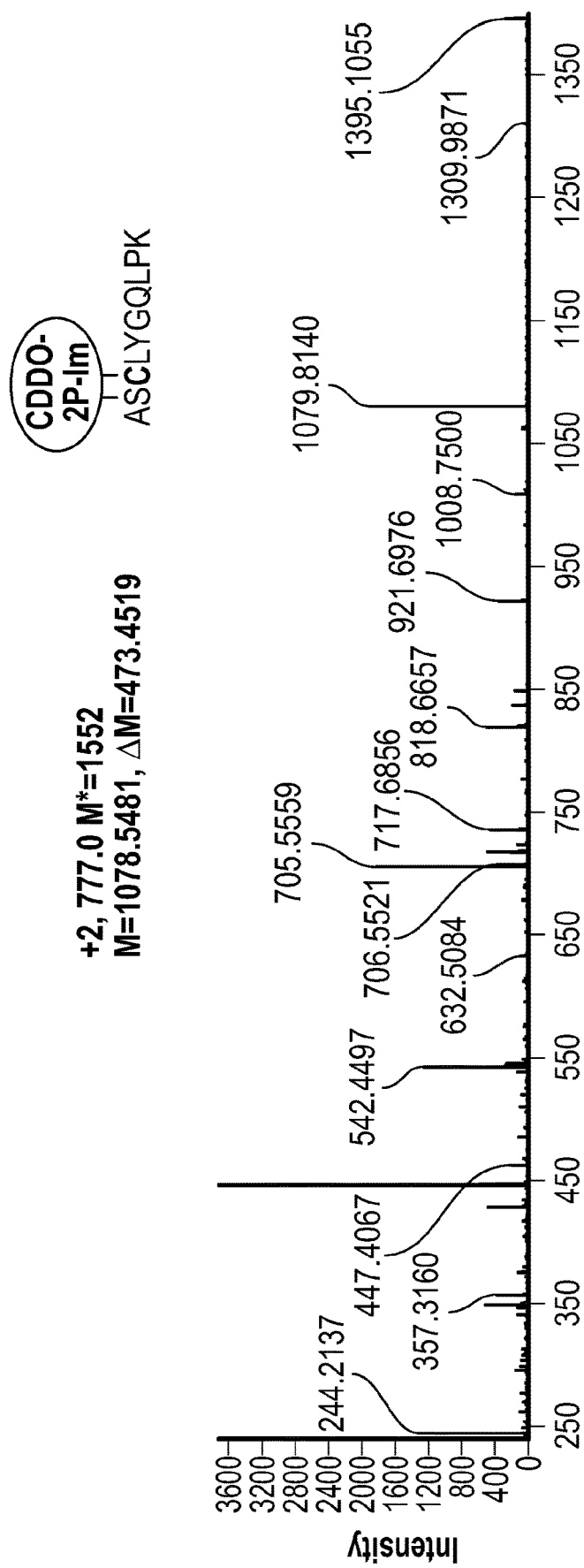
FIG. 1B depicts MS/MS spectra showing cross-linking adducts formed between Ser47 and Cys48 on peptide [46]ASCLYGQLPK[55] from GSTP (SEQ ID NO: 1) with a mass addition of 473.3 amu.

Cross-linking adducts are anticipated due to the presence of the bifunctional groups on CDDO-Im. An abundant doubly charged ion at m/z 777.0 was detected, corresponding to the tryptic peptide corresponding to residues 46-55 of SEQ ID NO: 1 ($^{46}$ASCLYGQLPK$^{55}$) with an additional mass of 473.5 amu. The cross-linking adduct could be formed by reaction of CDDO-Im with Cys48 and the adjacent serine residue in the sequence $^{46}$ASCLYGQLPK$^{55}$ (residues 46-55 of SEQ ID NO: 1). A typical MS/MS spectrum representing the tryptic peptide $^{46}$ASCLYGQLPK$^{55}$ (residues 46-55 of SEQ ID NO: 1) with a mass addition of 473.5 amu is shown in FIG. 1B. The peptide sequence was confirmed by a series of y product ions, and the cross-linking was evidenced by the presence of b2*(m/z 632.5084, Ser47) and y8* (m/z 1395.1055, Cys48), both with mass increment of 473.5 amu. The cross-linking adducts were also detected on multiple sites including Arg14-Cys15 and Arg101-Cys102 (Table 1). Similar to the modifications observed with Ser47, a stable adduct derived from an arginine residue was also detected (Arg187, $^{184}$LSARPK$^{189}$) when high concentration of CDDO-Im was used (500 µM).

TABLE 1

CDDO-Im modified GSTP peptides detected in vitro[a]

| Amino acid | Peptide | sequence of SEQ ID NO: 1[b] | m/z | RT |
|---|---|---|---|---|
| Cys15 | 13-19 | GR*C*AALR | 407.2529 | 43.04 |
| Cys15 | 15-19 | C*AALR | 503.8094 | 44.87 |
| Cys48 | 46-55 | AS*C*LYGQLPK | 776.958 | 46.82 |
| Cys102 | 83-103 | DQQEAALDMVNDGVEDLR*C*K | 706.238 | 47.398 |
| Arg187 | 184-189 | LSAR*PK | 572.9 | 45.57 |

[a]CDDO-Im (50 nM-10 µM) was incubated with GSTP in phosphate buffer, pH 7.4 for 16 h.
[b]The modified amino acid was labelled with *.

Figure 1C:
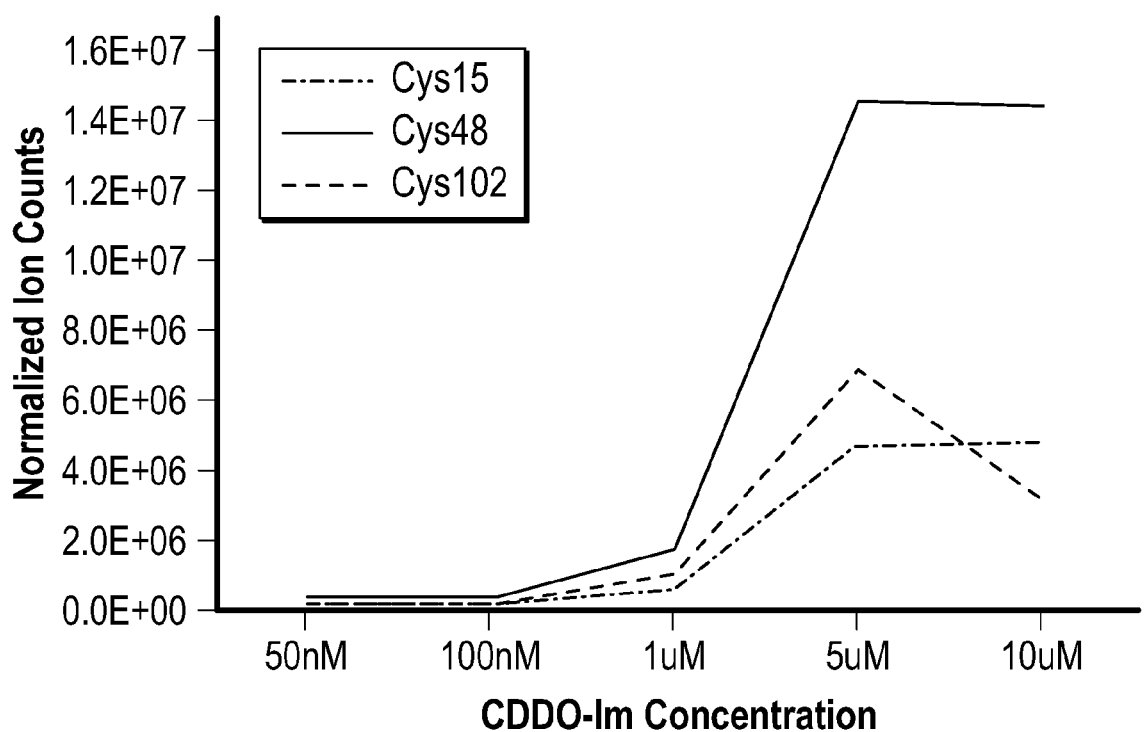
FIGS. 1C and 1D show binding of CDDO-Im and CDDO-2P-Im, respectively, to GSTP at increasing drug concentrations following a 16 hour incubation at 37° C. CDDO-2P-Im most preferentially binds to Cys48 and, in comparison, to CDDO-Im, binding does not plateau above 5 μM.

Covalent binding of CDDO-Im to GSTP was concentration-dependent with adducts being detectable at the lowest concentration of CDDO-Im (50 nM). See FIG. 1C. The crosslinking adducts appeared to be the major adducts formed between CDDO-Im and GSTP, likely due to the adduct stabilization through acylation at C28.

Figure 1D:
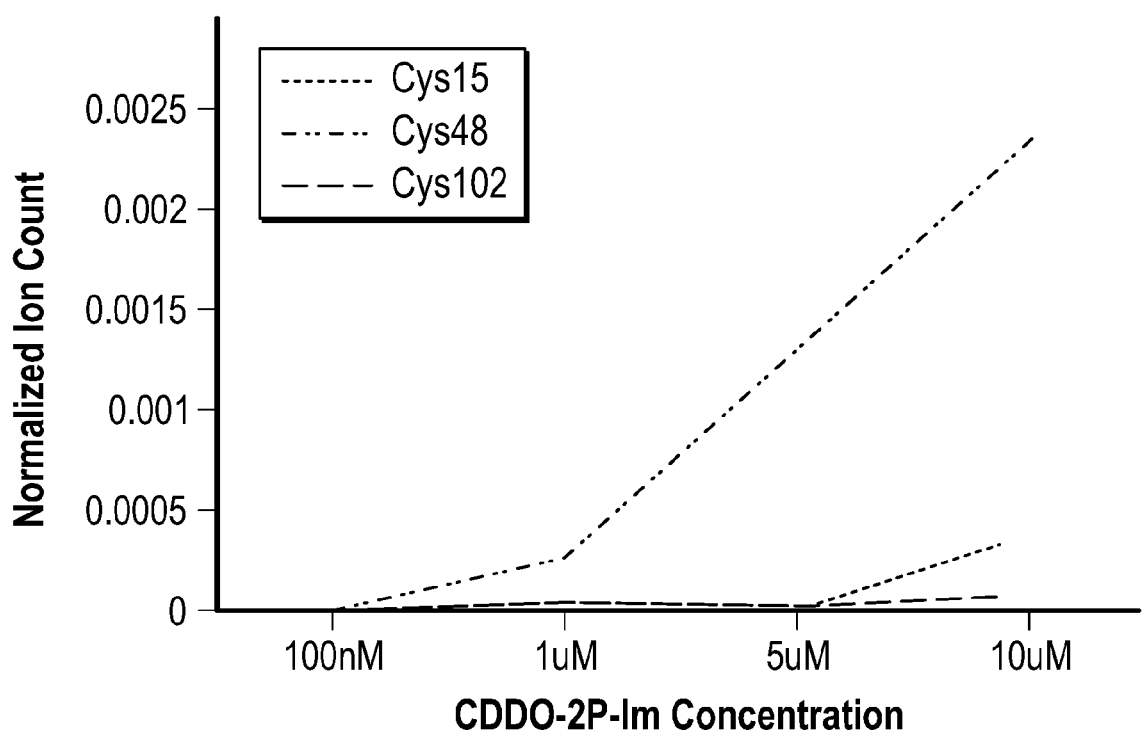

CDDO-2P-Im was found to bind to GSTP in a similar manner. See FIG. 1D. These data demonstrate that CDDO-2P-Im has potential to not only form simple Michael adducts through conjugation of cysteine residues to the α,β unsaturated ketone located in the A ring, but also to for crosslinking adducts (e.g., via acylation of nucleophilic residues on the same or different peptides).

Example 2. Triterpenoid Modified-HSA

LC-MS/MS analysis of the tryptic digests revealed 23 CDDO-modified peptides, including peptides containing lysine (9), arginine (2), serine (7) or tyrosine (5) residues after incubation at the highest concentration of CDDO-2P-Im (500 µM) (Table 2).

Figure 2A:
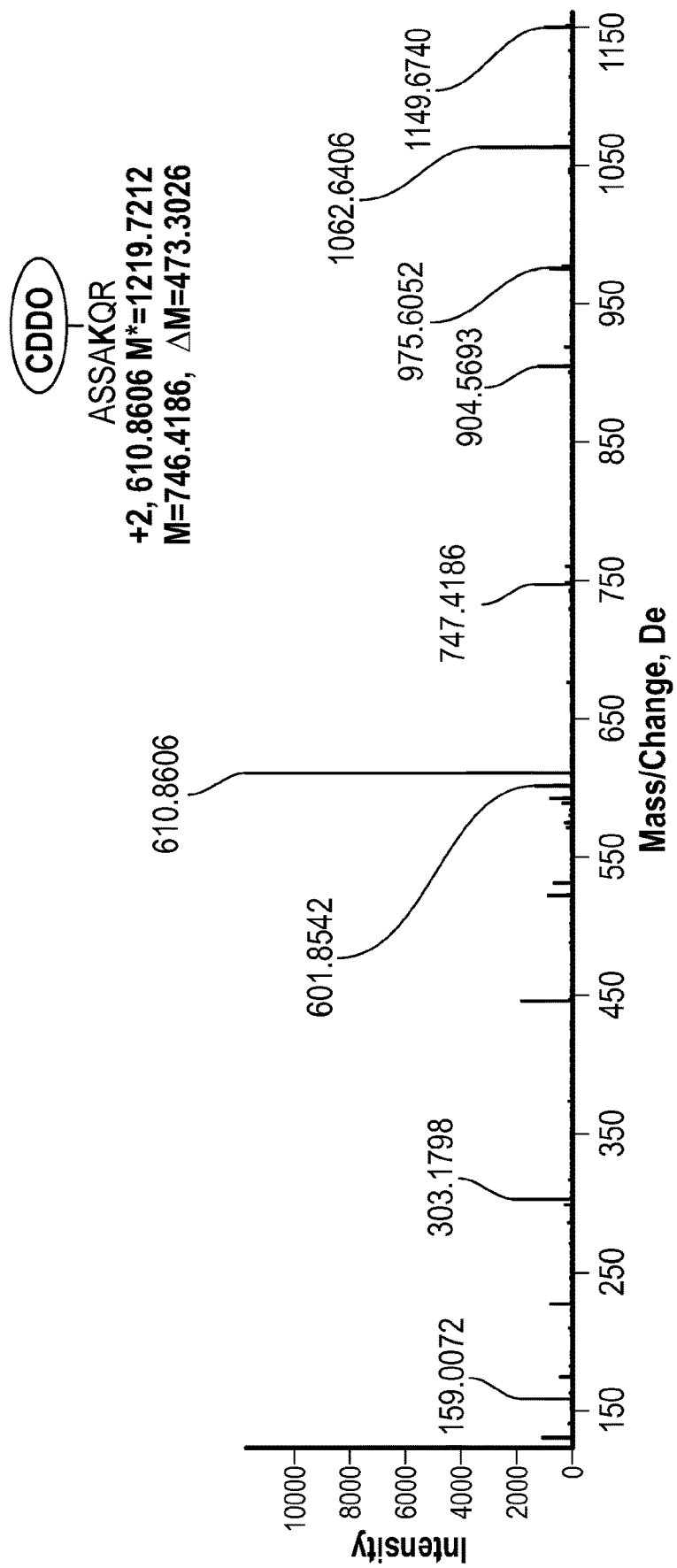
FIG. 2A depicts MS/MS spectra showing an acylation of Lys195 of peptide $^{191}$ASSAKQR$^{197}$ from a human HSA protein (SEQ ID NO: 2) modified by CDDO-2P-Im. Similar adducts were also detected on Ser193, Tyr319, and Arg142.

A typical MS/MS spectrum representing the tryptic peptide corresponding to 191-197 of SEQ ID NO: 2 ([191]ASSAK*QR[197]) with a mass addition of 473.3 amu is shown in FIG. 2A. A missed cleavage at the proposed site of covalent binding and the presence of y3*(m/z 904.57), y4* (m/z 975.57), y5* (m/z 1062.64), and y6* (m/z 1149.67) ions provided firm evidence of acylation at Lys195. Similar to the modifications observed with lysine, stable adducts derived from serine, tyrosine, and arginine were also detected on multiple sites (Table 2).

The modification of HSA by CDDO-Im was concentration- and time-dependent. A semi-quantitative analysis of modification at each site was performed by determining the area under the curve for the extracted masses of the modified peptides, followed by normalization of the ion intensity using the total ion count for the sample. A concentration- and time-dependent increase in normalized ion counts was observed for each modified peptide.

TABLE 2

Triterpenoid modified HSA peptides detected in vitro[a]

| Amino acid | Peptide | sequence of SEQ ID NO: 2[b] | m/z | RT |
|---|---|---|---|---|
| K137 | 137-144 | K*YLYEIAR | 764.9434 | 82.06 |
| K195 | 191-197 | ASSAK*QR | 610.8541 | 68.57 |
| K199 | 198-205 | LK*CASLQK | 710.9154 | 74.6 |
| K413 | 411-414 | YTK*K | 506.8073 | 72.22 |
| K432 | 429-436 | NLGK*VGSK | 638.3876 | 77.25 |
| K524 | 522-525 | QIK*K | 495.3224 | 72.87 |
| K525 | 525-534 | K*QTALVELVK | 801.4988 | 82.61 |
| K536 | 535-538 | HK*PK | 491.8 | 66.39 |
| K541 | 539-545 | ATK*EQLK | 645.8875 | 73.81 |
| R186 | 182-190 | LDELR*DEGK | 516.6239 | 67.25 |
| R222 | 219-225 | LSQR*FPK | 674.75 | 80.01 |
| S193 | 191-195 | ASS*AK | 468.7725 | 81.83 |
| S202 | 200-205 | CAS*LQK | 561.8137 | 75.9 |
| S220 | 219-222 | LS*QR | 488.796 | 72.97 |

TABLE 2-continued

Triterpenoid modified HSA peptides detected in vitro[a]

| Amino acid | Peptide | sequence of SEQ ID NO: 2[b] | m/z | RT |
|---|---|---|---|---|
| S232 | 226-233 | AEFAEVS*K | 677.3669 | 79.01 |
| S435 | 433-436 | VGS*K | 432.2647 | 73.52 |
| S470 | 467-472 | TPVS*DR | 574.3217 | 71.09 |
| S489 | 485-500 | RPCFS*ALEVDETYVPK | 776.4013 | 81 |
| Y140 | 138-145 | YLY*EIAR | 700.8973 | 94.19 |
| Y161 | 160-162 | RY*K | 470.2868 | 76.7 |
| Y319 | 318-323 | NY*AEAK | 584.815 | 83.05 |
| Y353 | 352-359 | TY*ETTLEK | 729.3921 | 85.8 |
| Y411 | 411-413 | Y*TK | 442.2242 | 72.97 |

[a]Triterpenoids (500 µM CDDO-Im, CDDO-2P-Im, or CDDO-3P-Im) were incubated with HSA in phosphate buffer, pH 7.4 for 16 h.
[b]The modified amino acid was labelled with *.

Example 3. Triterpenoid Modified-Keap1

Figure 3A:
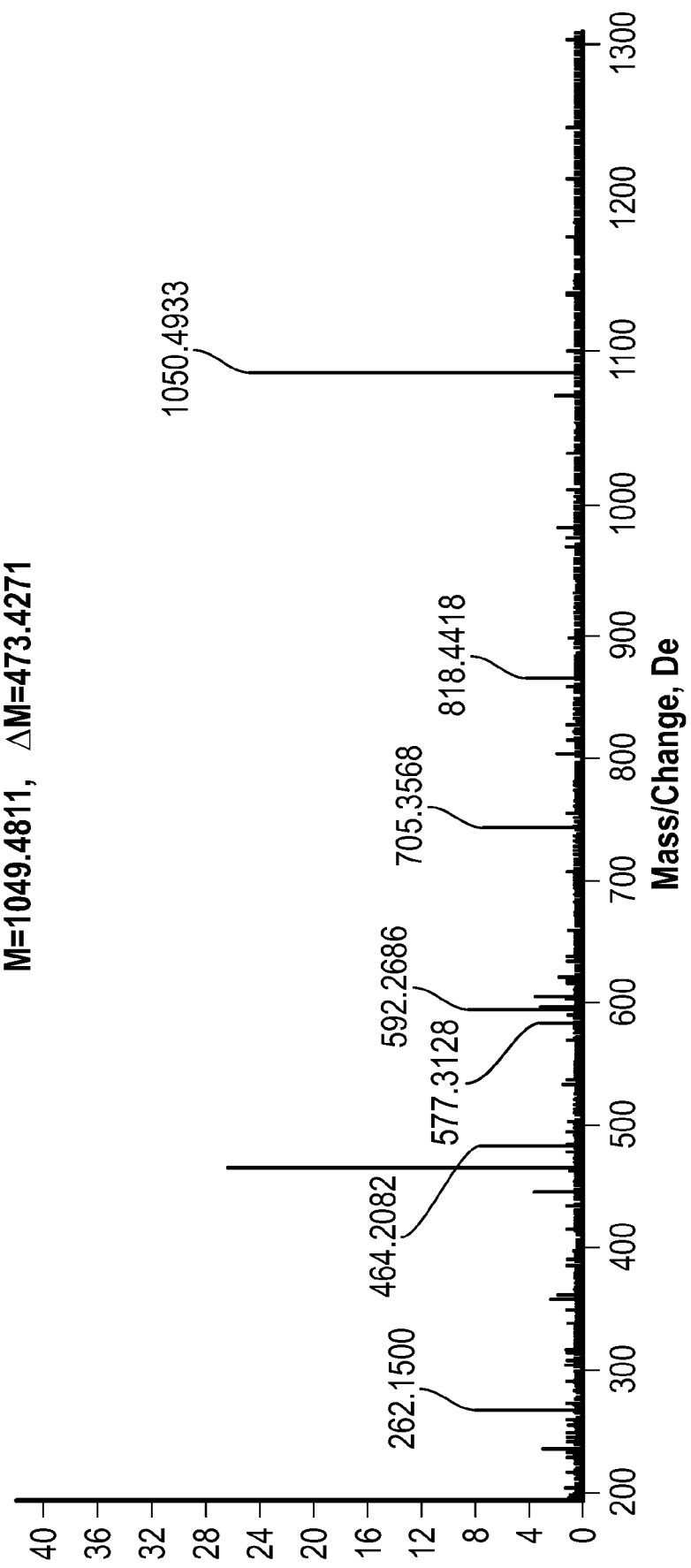
FIGS. 3A and 3B depict representative MS/MS spectra showing that CDDO-2P-Im forms a covalent adduct with Cys288 of peptide $^{288}$CEILQSDSR$^{296}$ from Keap1 (SEQ ID NO: 3) through Michael addition (3A) and an adduct with Tyr85 of peptide $^{85}$YQDAPAAQFMAHK$^{97}$ from Keap1 (SEQ ID NO: 3) through acylation (3B).
Figure 3B:
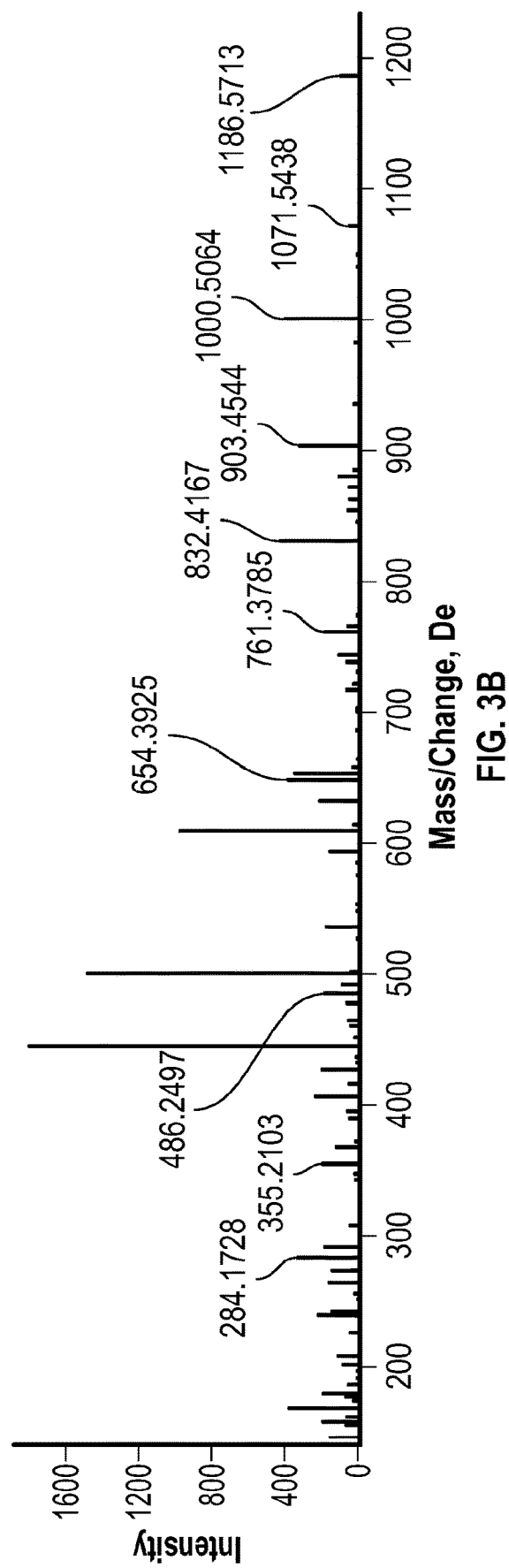

LC-MS/MS analysis of the tryptic digests of CDDO-2P-Im treated recombinant Keap1 protein revealed multiple types of adducts, including a Michael adduct formed with cysteine and acylation adducts formed with tyrosine and lysine (Table 3). The Michael addition of CDDO-2P-Im to Cys288 followed by acylation to the N-terminus amino group resulted in an adduct with a mass addition of 473.4 amu. FIG. 3A shows a MS/MS spectrum of a doubly charged ion at m/z 762.454, corresponding to the tryptic peptide CELLQSDSR with an additional mass of 473.4 amu. The peptide sequence was confirmed by partial singly charged y and b series ions. The modification site was confirmed by the presence of b1* (m/z 577.3128). The presence of a fragment ion of m/z 446.307 derived from CDDO-2P-Im provided further evidence of the modification. This adduct was also detected at Cys38 and Cys257; however, modification of Cys151 that was reported previously was not detected. Recently, modification of Cys257 and Cys288 on the protein Keap1 by an endogenous metabolite has enabled Nrf2 to increase the expression of downstream genes with antioxidant and anti-inflammatory capacities (Mills et al, Nature 556, 113-117, 2018). Our finding that CDDO-2P-Im alkylated these key cysteine residues on the Keap1 may provide therapeutic opportunities to use CDDO-2P-im to treat inflammatory diseases. Interestingly, acylation on multiple amino acids including tyrosine and lysine residues were also detected when Keap1 was treated with 100 µM CDDO-2P-Im. Although it is not clear whether modification at these sites on the Keap1 protein affects its activity, our finding provided novel mechanisms how bifunctional triterpenoids interact with the Keap1 protein.

CDDO-2P-Im covalently bound to human Keap1 protein in vitro. A total of 8 binding sites were identified when CDDO-2P-Im was incubated with Keap1 protein at the concentration of 100 µM.

TABLE 3

CDDO-2P-Im modified Keap1 peptides detected in vitro[a]

| Amino acid | Peptide sequence of SEQ ID NO: 3[b] | m/z |
|---|---|---|
| Cys38 | 34-39 ASTEC*K | 556.1458 |
| Tyr85 | 85-97 Y*QDAPAAQFMAHK | 651.9981 |
| Tyr208 | 205-216 EYIY*MHFGEVAK | 654.0048 |
| Cys257 | 255-260 YDC*EQR | 643.801 |
| Tyr263 | 262-269 FY*VQALLR | 742.4025 |
| Cys288 | 288-296 C*EILQSDSR | 762.4541 |
| Lys323 | 321-326 APK*VGR | 550.864 |
| Tyr443 | 443-447 Y*EPER | 583.812 |

[a]CDDO-2P-Im (100 µM) was incubated with Keap1 in phosphate buffer, pH 7.4 for 16 h.
[b]The modified amino acid was labelled with *.

Example 4. Triterpenoid Modified-LONP1

LONP plays a crucial role in maintaining the mitochondria functions, and LONP expression levels has been associated with many human diseases. Bifunctional triterpenoids inhibit LONP; providing therapeutic opportunities to use them to treat cancer. To probe the molecular and chemical mechanisms underlying the LONP inhibition caused by triterpenoids, LONP was incubated with CDDO-2p-Im at 100 µM. LC-MS/MS analysis of the tryptic digests revealed 8 CDDO-2p-Im modified peptides, including peptides containing lysine (3), cysteine (3), and tyrosine (2) residues (Table 4).

Figure 4A:
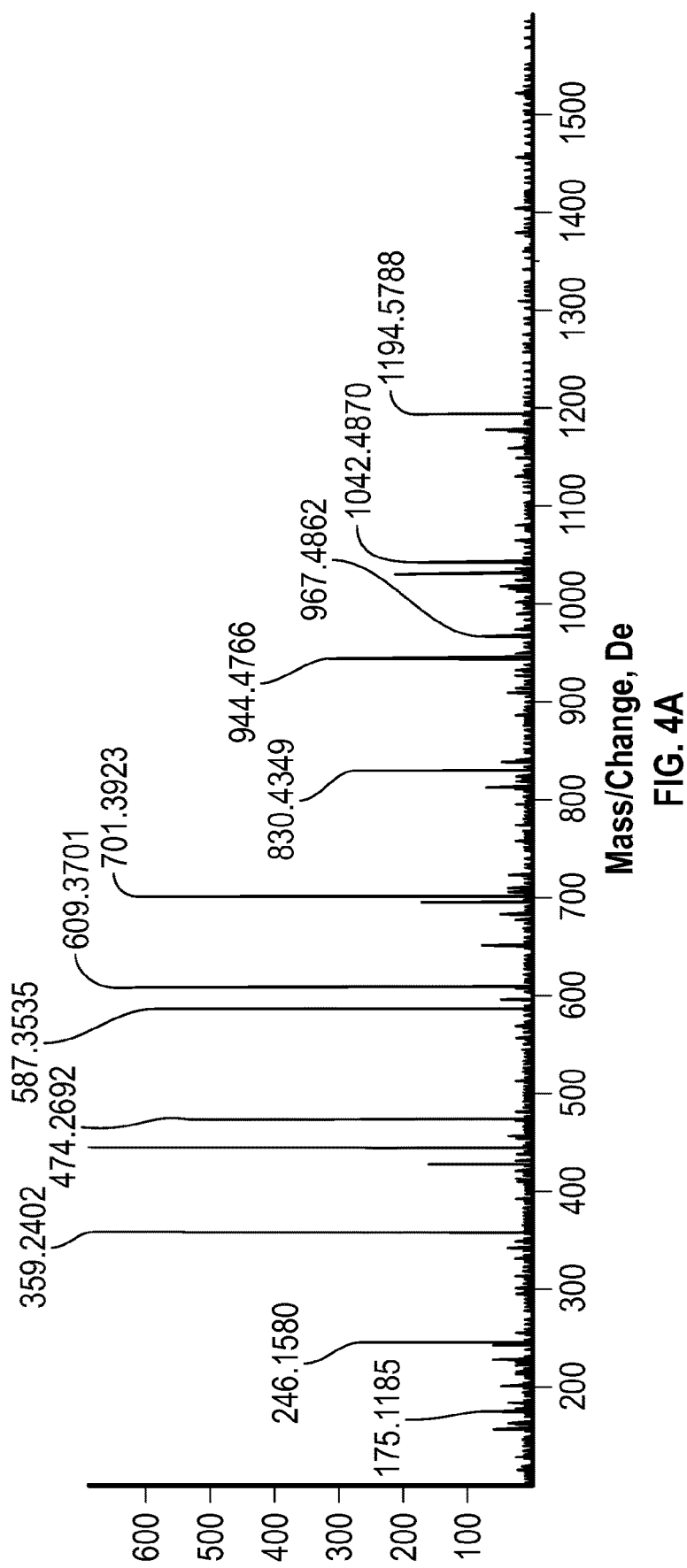
FIGS. 4A and 4B depict representative MS/MS spectra showing that CDDO-2P-Im forms a covalent adduct with Tyr473 of peptide $^{473}$YSNENLDLAR$^{482}$ from LONP1 (SEQ ID NO: 4) through acylation (4A) and an adduct with Cys682 of peptide $^{680}$ALCGLDESK$^{688}$ from LONP1 (SEQ ID NO: 4) through Michael addition (4B).
Figure 4B:
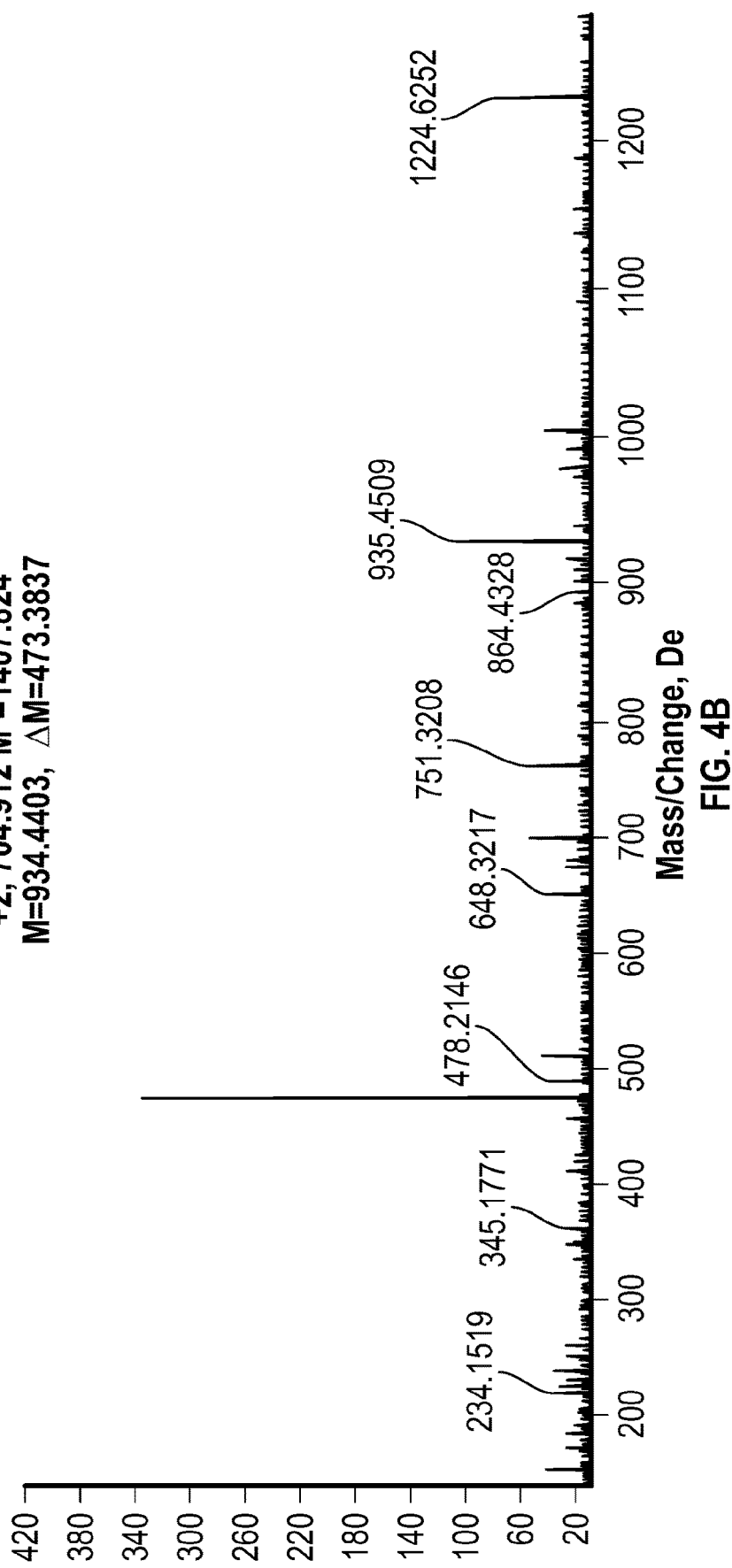
Figure 5A:
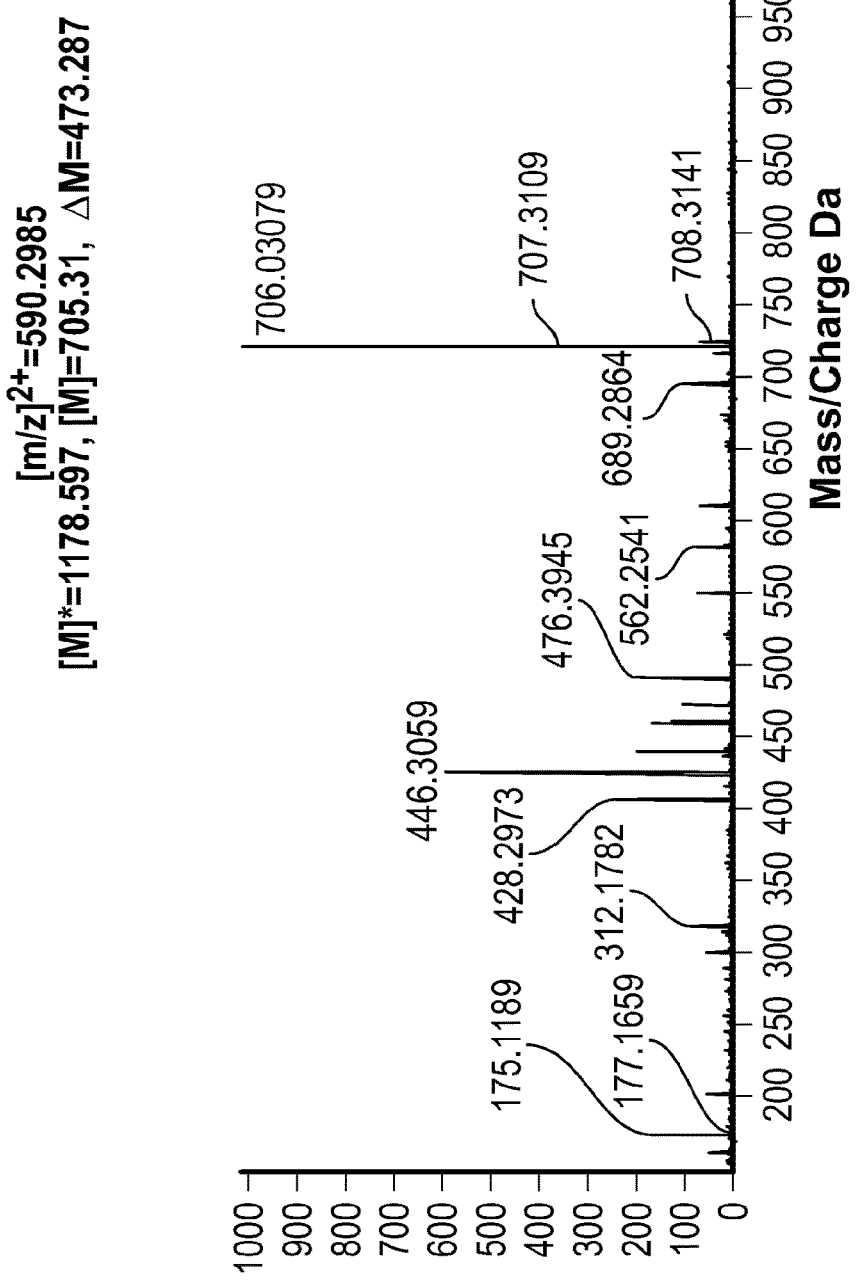
FIG. 5A. depict representative MS/MS spectra showing that CDDO-2P-Im forms a Michael adduct with Cys52 of peptide $^{50}$GSCFHR$^{55}$ from human peptidyl-prolyl cis-trans isomerase A (PPIA_HUMAN, P62937; SEQ ID NO: 5).

A typical MS/MS spectrum representing the tryptic peptide YSNENLDLAR with a mass addition of 473.3 amu is shown in FIG. 4A. The presence of tyrosine immonium ion (m/z 609.37) provided firm evidence of acylation at Tyr473. Similar to the cysteine modifications observed on the Keap1 protein, 3 cysteine residues (Cys520, Cys637, and Cys682) on the LONP were modified by CDDO-2P-Im through Michael addiction (FIG. 4B). Cys520 is close to the ATP binding site (523-530); covalent modification of Cys520 by CDDO-2P-Im may prevent ATP binding and therefore inhibit LONP protease activity. In addition, modification of Lys896, which is close to one of the LONP active sites (Ser855 and Lys898) may also demolish LONP protease activity.

CDDO-2P-Im covalently bound to human LONP protein in vitro.

TABLE 4

CDDO-2P-Im modified LONP peptides detected in vitro[a]

| Amino acid | Peptide sequence of SEQ ID NO: 4[b] | m/z |
|---|---|---|
| Lys426 | 425-432 LK*ELVVPK | 700.002 |
| Tyr473 | 473-482 Y*SNENLDLAR | 834.402 |
| Cys520 | 518-529 ILC*FYGPPGVGK | 862.512 |
| Cys637 | 633-652 VLFIC*TANVTDTIPEPLRDR | 916.201 |
| Tyr673 | 673-679 Y*LVPQAR | 660.411 |
| Cys682 | 680-688 ALC*GLDESK | 704.912 |
| Lys718 | 715-721 QVEK*VLR | 672.914 |
| Lys896 | 889-898 ILPVGGIK*EK | 764.001 |

[a]CDDO-2P-Im (100 μM) was incubated with Keap1 in phosphate buffer, pH 7.4 for 16 h.
[b]The modified amino acid was labelled with *.

Example 5. Additional Triterpenoid Modified-Intracellular Proteins

Human B cells were treated with triterpenoids for 16 h to examine the effects of these compounds on the cellular functions. Treatment of cells with triterpenoid inhibited B cell proliferation. To analyze the underlying mechanisms and identify downstream mediators, a proteomics analysis was initiated to identify intracellular proteins that are targeted by triterpenoids. LC-MS/MS analysis of the tryptic digests of CDDO-2P-Im treated B cells revealed multiple proteins can be targets by CDDO-2P-Im.

A total of 32 proteins were identified when B cells were treated with 10 μM CDDO-2P-Im for 16 hours (Table 5), in which Peptidylprolyl isomerase A (PPIA) appeared to be a highly specific target for CDDO-2P-Im. PPIA contains 4 active cysteine residues, all modified by CDDO-2P-Im (FIGS. 3A, B and C). PPIA catalyzes the cis-trans isomerization of proline imidic peptide bonds and accelerate protein folding. It plays an important role in regulating many biological processes including intracellular signaling, protein transport, transcription, inflammation, and apoptosis. PPIA is highly involved in acute and chronic inflammatory diseases. Thus, selective inhibition of PPIA may provide effective therapeutics for such inflammatory diseases.

In order to determine the cellular processes, molecular functions, and pathways that CDDO-2P-Im modified proteins are involved, those 32 modified proteins were analyzed by PANTHER (Protein Analysis Through Evolutionary Relationships, version 14.2). Molecular function analysis revealed that CCDO-2P-Im preferentially targeted proteins involved in binding, catalytic activity, and structural molecule activity (FIG. 3D). In addition, pathway analysis indicated that cytoskeletal regulation by Rho GTPase and Huntington disease were among the most significant pathways associated with CDDO-2P-Im modified proteins (FIG. 3E).

CDDO-2P-Im covalently bound to multiple cellular proteins in human B cells.

TABLE 5

CDDO-2P-Im modified B cell proteins detected in vitro[a]

| Accession No./Name | SEQ ID No. | Position | Peptide Sequence[b] | m/z | RT |
|---|---|---|---|---|---|
| P62937\|PPIA | 5 | 50-55 | GSC*FHR | 590.299 | 40.66 |
| | 5 | 50-55 | Ac-GSC*FHR | 611.803 | 43.84 |
| | 5 | 56-69 | IIPGFMC*QGGDFTR | 672.344 | 46.93 |
| | 5 | 156-165 | ITIADC*GQLE | 768.405 | 47.99 |
| | 5 | 92-118 | HTGPGILSMANAGPNTNGSQFFIC*TAK | 802.656 | 44.56 |
| | 5 | 155-165 | KITLADC*GQLE | 832.449 | 44.85 |
| O00299\|CLIC1 | 6 | 21-29 | IGNC*PFSQR | 747.89 | 45.02 |
| Q96NY7\|CLIC6 | 7 | 484-492 | | | |
| O14841\|OPLA | 8 | 497-501 | C*AIAR | 503.789 | 42.1 |
| O60423\|AT8B3 | 9 | 865-871 | RLSLLC*R | 675.908 | 45.66 |
| P05023\|AT1A1 | 10 | 424-430 | IAGLC*NR | 610.343 | 44.73 |
| P07437\|TBB5 | 11 | 298-306 | NMMAAC*DPR | 741.351 | 44.83 |
| P07737\|PROF1 | 12 | 117-136 | EGVHGGLINKKC*YEMASHLR | 543.891 | 36.21 |
| P08865\|RSSA | 13 | 156-166 | YVDIAIPC*NNK | 861.954 | 44.89 |
| P09382\|LEG1 | 14 | 50-74 | FNAHGDANTIVC*NSKDGGAWGTEQR | 781.126 | 36.97 |
| | 14 | 2-21 | Ac-ACGLVASNLNLKPGEC*LRVR | 810.768 | 48.6 |
| | 14 | 3-21 | CGLVASNLNLKPGEC*LRVR | 821.427 | 48.74 |
| P09429\|HMGB1 | 15 | 30-48 | KHPDASVNFSEFSKKC*SER | 534.676 | 35.27 |
| | 15 | 31-48 | HPDASVNFSEFSKKC*SER | 636.07 | 36.76 |

TABLE 5-continued

CDDO-2P-Im modified B cell proteins detected in vitro[a]

| Accession No./Name | SEQ ID No. | Position | Peptide Sequence[b] | m/z | RT |
|---|---|---|---|---|---|
| P09651\|ROA1 | 16 | 167-179 | YHTVNGHNC*EVRK | 508.264 | 32.51 |
|  | 16 | 167-178 | YHTVNGHNC*EVR | 476.241 | 35.52 |
| P22314\|UBA1 | 17 | 628-635 | SIPIC*TLK | 674.395 | 47.15 |
| P23528\|COF1 | 18 | 35-45 | AVLFC*LSEDKK | 575.986 | 44.43 |
|  | 18 | 128-146 | LTGIKHELQANC*YEEVKDR | 680.612 | 35.83 |
| P31146\|COR1A | 19 | 13-29 | HVFGQPAKADQC*YEDVR | 609.808 | 37.15 |
| P43243\|MATR3 | 20 | 170-192 | C*RDDSFFGETSHNYHKFDSEYER | 669.305 | 35.24 |
| P46782\|RS5 | 21 | 64-71 | AQC*PIVER | 694.883 | 42.88 |
| P52790\|HXK3 | 22 | 99-104 | TGAS*LR | 539.296 | 41.92 |
| P54577\|SYYC | 23 | 514-520 | LGSISC*K | 590.834 | 42.92 |
| P61978\|HNRPK | 24 | 140-148 | GSDFDC*ELR | 757.863 | 44.23 |
| P63220\|RS21 | 25 | 16-22 | KC*SASNR | 413.555 | 35.62 |
| P68363\|TBA1B | 26 | 339-352 | RSIQFVDWC*PTGFK | 719.714 | 46.18 |
|  | 26 | 340-352 | SIQFVDWC*PTGFK | 1001.01 | 49.13 |
| P84103\|SRSF3 | 27 | 70-75 | TLCGC*R | 591.804 | 43.9 |
| Q00839\|HNRPU | 28 | 603-609 | AVVVC*PK | 594.854 | 43.94 |
| Q06830\|PRDX1 | 29 | 169-190 | HGEVC*PAGWKPGSDTIKPDVQK | 706.875 | 35.87 |
| Q12802\|AKP13 | 30 | 1548-1552 | C*SVLR | 525.804 | 42.59 |
| Q15365\|PCBP1 | 31 | 102-115 | LVVPATQC*GSLIGK | 930.041 | 46.29 |
| Q5IR90\|Q5IR90 | 32 | 245-250 | C*PLVLK | 573.35 | 46.07 |
| Q5T890\|ER6L2 | 33 | 804-808 | C*GFSK | 507.767 | 43.16 |
| Q92945\|FUBP2 | 34 | 436-442 | C*GLVIGR | 595.852 | 45.83 |
| Q9BVA1\|TBB2B | 35 | 351-359 | TAVC*DIPPR | 722.896 | 44.13 |

[a]CDDO-2P-Im (100 µM) was incubated with B cells for 16 h.
[b]The modified amino acid was labelled with *.

---

The invention claimed is:
1. A cross-linked conjugate comprising a bifunctional triterpenoid covalently linked to at least two amino acid residues of a protein.
2. The cross-linked conjugate of claim 1, wherein the protein is human LONP1 and the bifunctional triterpenoid is covalently linked to an amino acid residue corresponding to Lys426, Tyr473, Cys520, Cys637, Tyr673, Cys682, Lys718, or Lys896 of SEQ ID NO: 4.
3. The cross-linked conjugate of claim 1, wherein the protein is human Keap1 and the bifunctional triterpenoid is covalently linked to an amino acid residue corresponding to Cys38, Tyr85, Tyr208, Cys257, Tyr263, Cys288, Lys323, or Tyr443 of SEQ ID NO: 3.
4. The cross-linked conjugate of claim 1, wherein said conjugate has a structure corresponding to Formula (II):

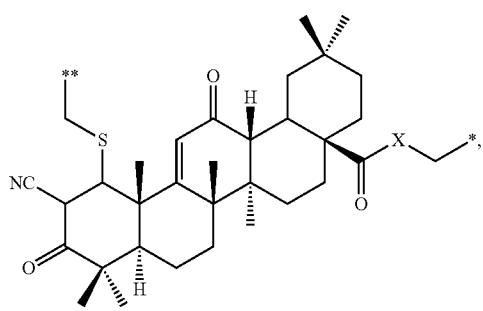

wherein * represents the point of attachment through a lysine, serine, arginine, or tyrosine residue, ** represents the point of attachment through a cysteine residue, and X represents O or N(H).
5. A method for irreversibly inhibiting the activity of a protein in a patient or in a biological sample comprising the step of administering to said patient or contacting said biological sample with 1-[2-Cyano-3,12-dioxooleana-1,9(11)-dien-28-oyl]-4(-pyridin-2-yl)-1H-imidazole (CDDO-2P-Im) or a pharmaceutically acceptable salt thereof, wherein the activity of the protein is irreversibly inhibited by covalently modifying a nucleophilic amino acid residue contained therein, wherein the protein is human GSTP, human Keap1, human LONP1, or human PPIA.
6. The method of claim 5, wherein the nucleophilic amino acid residue is a lysine, serine, arginine, or tyrosine residue.
7. The method of claim 5, wherein the protein is human LONP1.
8. The method of claim 5, wherein the patient is a cancer patient.
9. A method of treating a disease or condition mediated by a protein, comprising administering to a patient in need thereof a therapeutically effective amount of a compound that irreversibly inhibits the protein, wherein the compound is 1-[2-Cyano-3,12-dioxooleana-1,9(11)-dien-28-oyl]-4(-pyridin-2-yl)-1H-imidazole (CDDO-2P-Im) or a pharmaceutically acceptable salt thereof, wherein the disease or condition is a neurodegenerative disease and wherein the protein is human GSTP, human Keap1, human LONP1, or human PPIA.
10. The method of claim 9, wherein the protein is human LONP1.
11. A conjugate comprising a protein having a nucleophilic residue, wherein the nucleophilic residue is covalently, and irreversibly, bonded to a synthetic triterpenoid; wherein said conjugate has a structure corresponding to Formula (I):

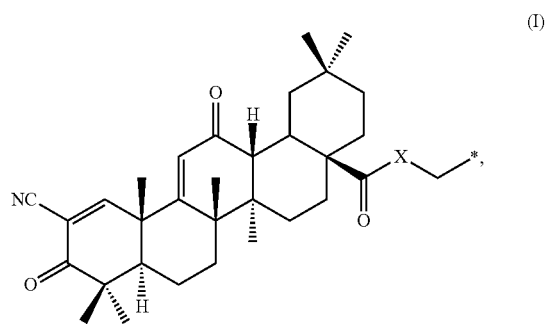

wherein * represents the point of attachment through the nucleophilic residue and X represents O or N(H).
12. The conjugate of claim 11, wherein the nucleophilic residue is selected from the group consisting of lysine, serine, arginine, and tyrosine.
13. The conjugate of claim 11, wherein the protein is human LONP1.
14. A cross-linked conjugate comprising one or more proteins, said one or more proteins having (i) a cysteine residue and (ii) a lysine, serine, arginine, or tyrosine residue, wherein the lysine, serine, arginine, or tyrosine residue is covalently, and irreversibly, bonded to a synthetic, bifunctional triterpenoid; wherein said conjugate has a structure corresponding to Formula (II):

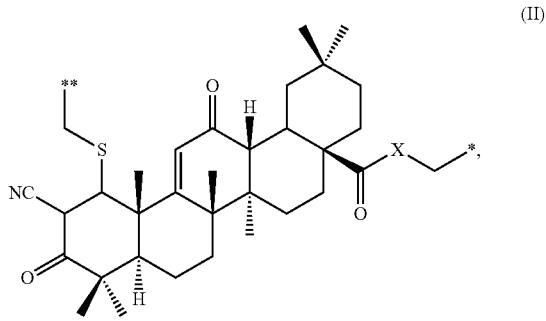

wherein * represents the point of attachment through the lysine, serine, arginine, or tyrosine residue, ** represents the point of attachment through the cysteine residue, and X represents O or N(H).
15. The cross-linked conjugate of claim 14, wherein the one or more proteins comprise human LONP1 the lysine, serine, arginine, or tyrosine residue corresponds to Lys426, Tyr473, Tyr673, Lys718, or Lys896 of SEQ ID NO: 4 and the cysteine residue corresponds to Cys520, Cys637, or Cys682 of SEQ ID NO: 4.
16. The cross-linked conjugate of claim 14, wherein the one or more proteins comprise human LONP1 the lysine, serine, arginine, or tyrosine residue corresponds to Tyr473 of SEQ ID NO: 4 and the cysteine residue corresponds to Cys682 of SEQ ID NO: 4.
17. The method of claim 5, wherein the irreversible inhibition is mediated by formation of a conjugate having a structure corresponding to Formula (I) or a cross-linked conjugate having a structure corresponding to Formula (II):

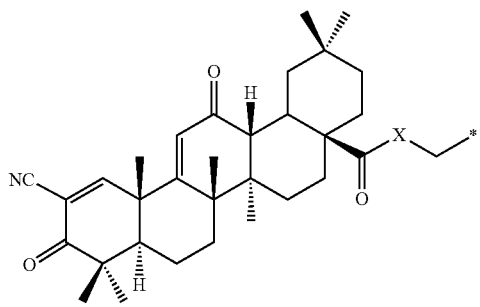

(I)

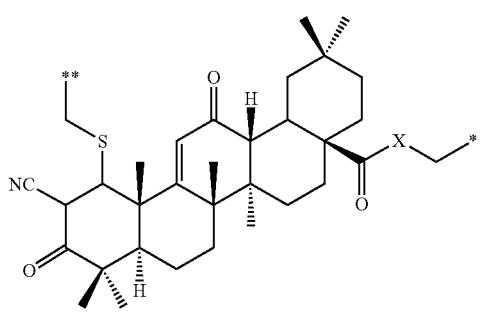

(II)

wherein * represents the point of attachment through a lysine, serine, arginine, or tyrosine residue, ** represents the point of attachment through the cysteine residue, and X represents O or N(H).

18. The method of claim 9, wherein the irreversible inhibition is mediated by formation of a conjugate having a structure corresponding to Formula (I) or a cross-linked conjugate having a structure corresponding to Formula (II):

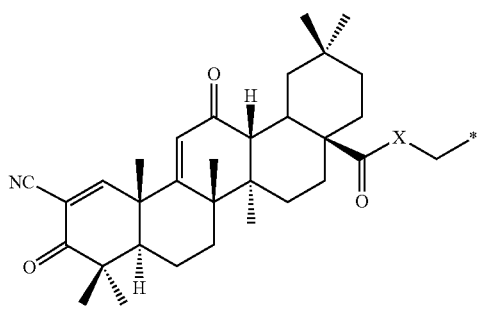

(I)

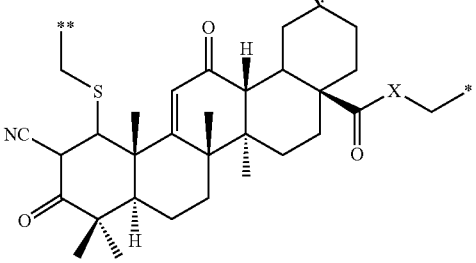

(II)

wherein * represents the point of attachment through a lysine, serine, arginine, or tyrosine residue, ** represents the point of attachment through the cysteine residue, and X represents O or N(H).

19. The cross-linked conjugate of claim 1, wherein the protein is a human protein.

20. The cross-linked conjugate of claim 19, wherein the human protein is human GSTP, human Keap1, human LONP1, or human PPIA.

21. The cross-linked conjugate of claim 19, wherein the cross-linked conjugate is formed in vivo by contacting the human protein with 1-[2-Cyano-3,12-dioxooleana-1,9(11)-dien-28-oyl]-4(-pyridin-2-yl)-1H-imidazole (CDDO-2P-Im) or a pharmaceutically acceptable salt thereof.

22. The conjugate of claim 11, wherein the protein is a human protein.

23. The conjugate of claim 22, wherein the human protein is human GSTP, human Keap1, human LONP1, or human PPIA.

24. The conjugate of claim 22, wherein the conjugate is formed in vivo by contacting the human protein with 1-[2-Cyano-3,12-dioxooleana-1,9(11)-dien-28-oyl]-4(-pyridin-2-yl)-1H-imidazole (CDDO-2P-Im) or a pharmaceutically acceptable salt thereof.

25. The cross-linked conjugate of claim 14, wherein the protein is a human protein.

26. The cross-linked conjugate of claim 25, wherein the human protein is human GSTP, human Keap1, human LONP1, or human PPIA.

27. The cross-linked conjugate of claim 25, wherein the cross-linked conjugate is formed in vivo by contacting the human protein with 1-[2-Cyano-3,12-dioxooleana-1,9(11)-dien-28-oyl]-4(-pyridin-2-yl)-1H-imidazole (CDDO-2P-Im) or a pharmaceutically acceptable salt thereof.

* * * * *